(12) United States Patent
Ouchi et al.

(10) Patent No.: US 9,832,732 B2
(45) Date of Patent: Nov. 28, 2017

(54) TERMINAL, BASE STATION, AND COMMUNICATION METHOD WHICH SET A TRANSMISSION POWER OF AN UPLINK SIGNAL

(71) Applicant: Sharp Kabushiki Kaisha, Osaka-shi, Osaka (JP)

(72) Inventors: Wataru Ouchi, Osaka (JP); Kimihiko Imamura, Osaka (JP); Daiichiro Nakashima, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 136 days.

(21) Appl. No.: 14/356,614

(22) PCT Filed: Nov. 7, 2012

(86) PCT No.: PCT/JP2012/078773
§ 371 (c)(1),
(2) Date: May 7, 2014

(87) PCT Pub. No.: WO2013/069656
PCT Pub. Date: May 16, 2013

(65) Prior Publication Data
US 2014/0295909 A1 Oct. 2, 2014

(30) Foreign Application Priority Data
Nov. 7, 2011 (JP) .................................. 2011-242968

(51) Int. Cl.
*H04W 52/14* (2009.01)
*H04B 7/005* (2006.01)
(Continued)

(52) U.S. Cl.
CPC .......... *H04W 52/146* (2013.01); *H04B 7/005* (2013.01); *H04B 7/216* (2013.01);
(Continued)

(58) Field of Classification Search
CPC ............. H04W 52/146; H04W 52/225; H04W 52/242; H04W 52/245; H04W 52/248; H04W 52/325; H04W 52/362; H04W 52/367; H04W 52/40; H04W 52/58; H04W 72/042; H04B 7/024
See application file for complete search history.

(56) References Cited

U.S. PATENT DOCUMENTS

2002/0196766 A1* 12/2002 Hwang ................. H04W 52/56
370/342
2011/0195735 A1 8/2011 Irmer et al.
(Continued)

FOREIGN PATENT DOCUMENTS

WO 2010/146971 A1 12/2010
WO 2011/099613 A1 8/2011

OTHER PUBLICATIONS

Official Communication issued in International Patent Application No. PCT/JP2012/078773, dated Jan. 22, 2013.
(Continued)

*Primary Examiner* — Yuwen Pan
*Assistant Examiner* — Zhitong Chen
(74) *Attorney, Agent, or Firm* — Keating & Bennett, LLP

(57) ABSTRACT

In a communication system in which a base station and a terminal communicates, the base station and the terminal communicates efficiently. There is provided the terminal which communicates with the base station, the terminal including: a reception unit 605 which detects a transmission power control (TPC) command in a downlink control information (DCI) format and obtains a power correction value from the TPC command; and a transmission power control unit 6015 which sets transmission power of an uplink signal based on a power correction value obtained from a first TPC command when the terminal is in a first state and sets transmission power of the uplink signal based on a power correction value obtained from a second TPC command when the terminal is in a second state.

6 Claims, 35 Drawing Sheets

(51) Int. Cl.
| | |
|---|---|
| H04W 52/04 | (2009.01) |
| H04B 7/216 | (2006.01) |
| H04W 52/24 | (2009.01) |
| H04W 72/04 | (2009.01) |
| H04W 52/40 | (2009.01) |
| H04B 7/02 | (2017.01) |
| H04B 7/024 | (2017.01) |

(52) U.S. Cl.
CPC ......... *H04W 52/04* (2013.01); *H04W 52/242* (2013.01); *H04W 52/245* (2013.01); *H04W 52/40* (2013.01); *H04W 72/042* (2013.01); *H04B 7/024* (2013.01)

(56) References Cited

U.S. PATENT DOCUMENTS

| | | |
|---|---|---|
| 2011/0250899 A1 | 10/2011 | Vajapeyam et al. |
| 2012/0087334 A1 | 4/2012 | Suzuki et al. |
| 2012/0093117 A1 | 4/2012 | Suzuki et al. |
| 2013/0039305 A1 | 2/2013 | Kishiyama et al. |
| 2013/0077569 A1* | 3/2013 | Nam ................... H04W 52/288 370/328 |

OTHER PUBLICATIONS

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", Mar. 2010, 104 pages.

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)", Mar. 2011, 76 pages.

* cited by examiner

FIG. 20

EUTRA MEASUREMENT RESULT LIST (MeasResultListEUTRA)
├── PHYSICAL CELL ID (PhysCellID)
├── MEASUREMENT RESULT (measResult)
├── PHYSICAL CELL ID (PhysCellID)
├── MEASUREMENT RESULT (measResult)
├── PHYSICAL CELL ID (PhysCellID)
├── MEASUREMENT RESULT (measResult)
⋮

FIG. 21

SECOND MEASUREMENT REPORT
├── CSI-RS MEASUREMENT INDEX (CSI-RS ANTENNA PORT INDEX)
├── MEASUREMENT RESULT
├── CSI-RS MEASUREMENT INDEX (CSI-RS ANTENNA PORT INDEX)
├── MEASUREMENT RESULT
├── CSI-RS MEASUREMENT INDEX (CSI-RS ANTENNA PORT INDEX)
├── MEASUREMENT RESULT
⋮

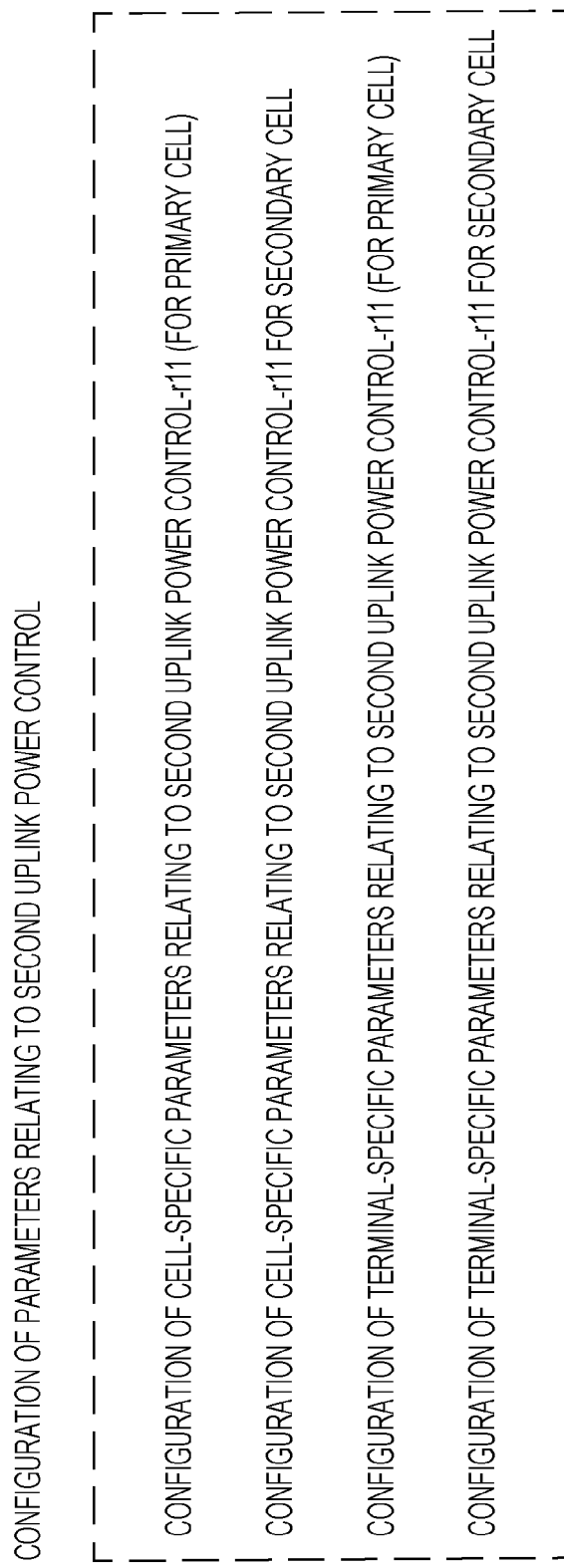

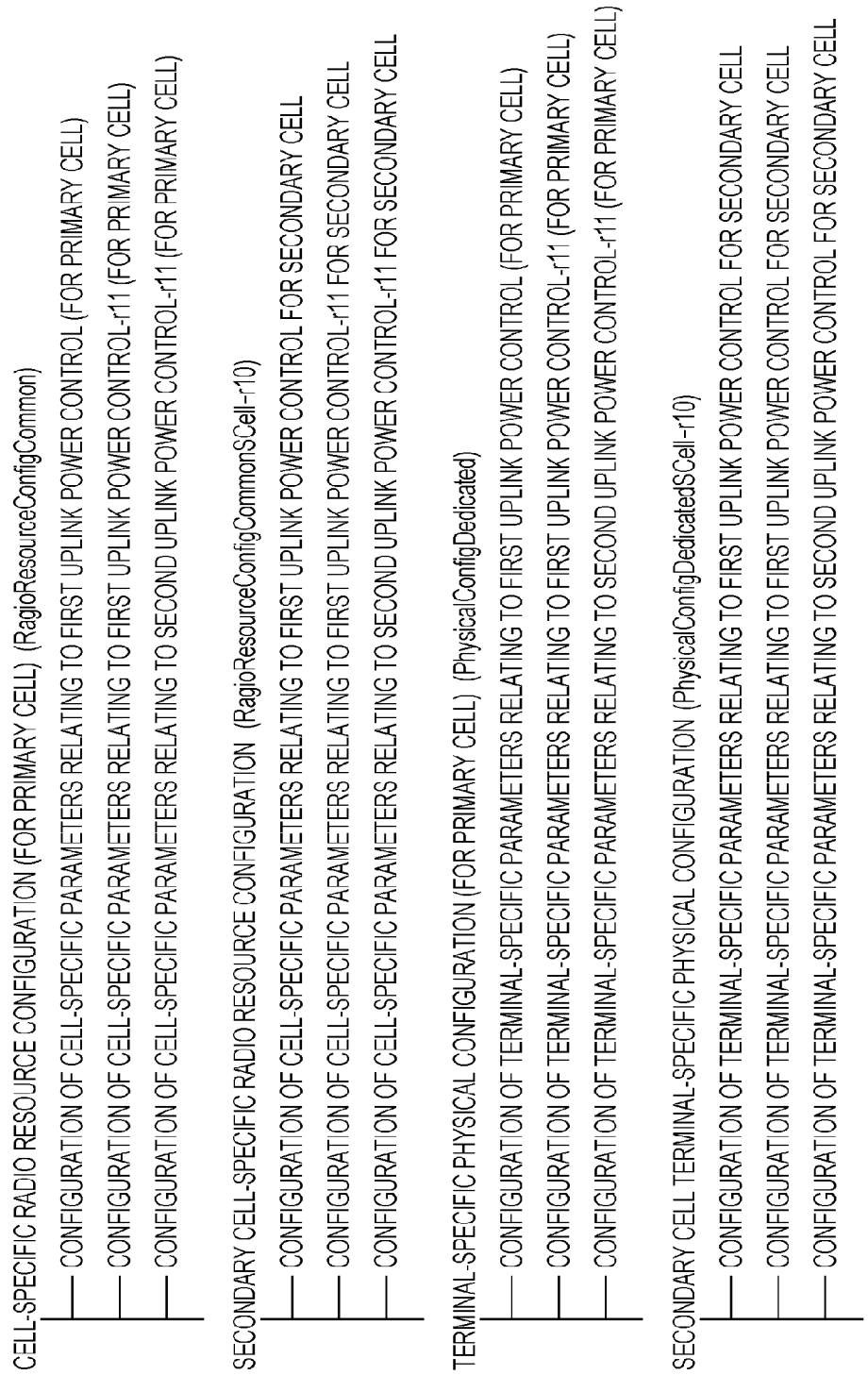

FIG. 29

EXAMPLE OF CONFIGURATION OF CELL-SPECIFIC PARAMETERS RELATING TO SECOND UPLINK POWER CONTROL-r11 (FOR PRIMARY CELL)

- RELEASE
- SETUP
  - p0-NominalPUSCH
  - α
  - p0-NominalPUCCH
  - deltaFList-PUCCH
  - deltaPreambleMsg3

: INCLUDING ALL INFORMATION ELEMENTS
: INCLUDING AT LEAST ONE ELEMENT
: INCLUDING NO ELEMENT (RELEASE)

EXAMPLE OF CONFIGURATION OF CELL-SPECIFIC PARAMETERS RELATING TO SECOND UPLINK POWER CONTROL-r11 FOR SECONDARY CELL

- RELEASE
- SETUP
  - p0-NominalPUSCH
  - α

: INCLUDING ALL INFORMATION ELEMENTS
: INCLUDING AT LEAST ONE ELEMENT
: INCLUDING NO ELEMENT (RELEASE)

FIG. 30

EXAMPLE OF CONFIGURATION OF TERMINAL-SPECIFIC PARAMETERS RELATING TO FIRST UPLINK POWER CONTROL-r11 (FOR PRIMARY CELL)
└── PATH LOSS REFERENCE RESOURCE

EXAMPLE OF CONFIGURATION OF TERMINAL-SPECIFIC PARAMETERS RELATING TO FIRST UPLINK POWER CONTROL-r11 FOR SECONDARY CELL
└── PATH LOSS REFERENCE RESOURCE

EXAMPLE OF CONFIGURATION OF TERMINAL-SPECIFIC PARAMETERS RELATING TO SECOND UPLINK POWER CONTROL-r11 (FOR PRIMARY CELL)
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── filterCoefficient
    ├── pSRS-Offset-Ap
    ├── deltaTxD-OffsetListPUCCH
    └── PATH LOSS REFERENCE RESOURCE

- INCLUDING ALL INFORMATION ELEMENTS
- INCLUDING AT LEAST ONE ELEMENT
- INCLUDING NO ELEMENT (RELEASE)

EXAMPLE OF CONFIGURATION OF TERMINAL-SPECIFIC PARAMETERS RELATING TO SECOND UPLINK POWER CONTROL-r11 FOR SECONDARY CELL
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── pSRS-Offset-Ap
    ├── filterCoefficient
    ├── pathlossReference(-r11)
    └── PATH LOSS REFERENCE RESOURCE

- INCLUDING ALL INFORMATION ELEMENTS
- INCLUDING AT LEAST ONE ELEMENT
- INCLUDING NO ELEMENT (RELEASE)

FIG. 31

PATH LOSS REFERENCE RESOURCE
└─ MEASUREMENT TARGET ─── INDEX ASSOCIATED WITH CELL-SPECIFIC REFERENCE SIGNAL ANTENNA PORT 0 OR CSI-RS ATENNA PORT INDEX (OR CSI-RS MEASUREMENT INDEX)

FIG. 34

TERMINAL-SPECIFIC PUCCH CONFIGURATION-v11x0 (PUCCH-ConfigDedicated-v11x0)
└── UplinkPowerControl TERMINAL-SPECIFIC PUSCH CONFIGURATION-v11x0 (PUSCH-ConfigDedicated-v11x0)
└── UplinkPowerControl TERMINAL-SPECIFIC SRSUL CONFIGURATION-v11x0 (SoundingRS-UL-ConfigDedicated-v11x0)
└── UplinkPowerControl APERIODIC SRS CONFIGURATION-r11 (SRS-ConfigAp-r11)
└── UplinkPowerControl RACH CONFIGURATION v11x0 (RACH ConfigDedicated v11x0)
├── powerRampingStep
└── preambleInitialReceivedTargetPower

FIG. 35

| TPC Command Field | Accumulated $\delta_{PUSCH, c}$ [dB] | Absolute $\delta_{PUSCH, c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH, c}$ [dB] | Absolute $\delta_{PUSCH, c}$ [dB] |
|---|---|---|
| 0 | -7 | -10 |
| 1 | -5 | -7 |
| 2 | -3 | -4 |
| 3 | -1 | -1 |
| 4 | 0 | 1 |
| 5 | 1 | 4 |
| 6 | 3 | 7 |
| 7 | 5 | 10 |
| 8 | 7 | 13 |

(b) SECOND TPC COMMAND FIELD

FIG. 36

| TPC Command Field | Accumulated $\delta_{PUSCH, c}$ [dB] | Absolute $\delta_{PUSCH, c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH, c}$ [dB] | Absolute $\delta_{PUSCH, c}$ [dB] |
|---|---|---|
| 0 | -3 | -4 |
| 1 | -1 | -1 |
| 2 | 0 | 4 |
| 3 | 1 | 7 |

(b) SECOND TPC COMMAND FIELD

TERMINAL, BASE STATION, AND COMMUNICATION METHOD WHICH SET A TRANSMISSION POWER OF AN UPLINK SIGNAL

TECHNICAL FIELD

The present invention relates to a terminal, a base station, a method, and an integrated circuit.

BACKGROUND ART

In a communication system such as WCDMA (Wideband Code Division Multiple Access), LTE (Long Term Evolution), or LTE-A (LTE-Advanced) by 3GPP (Third Generation Partnership Project) or Wireless LAN or WiMAX (Worldwide Interoperability for Microwave Access) by IEEE (The Institute of Electrical and Electronics Engineers), a base station (cell, transmitter station, transmission apparatus, eNodeB) and a terminal (mobile terminal, receiver station, mobile station, reception apparatus, User Equipment (UE)) are respectively provided with a plurality of transmit/receive antennas and spatial-multiplex data signals by using a MIMO (Multi Input Multi Output) technique to realize high-speed data communication.

In order to realize the data communication between the base station and the terminal in such a communication system, the base station performs various kinds of control on the terminal. Therefore, the base station provides control information to the terminal by using a predetermined resource and thus performs downlink and uplink data communication. For example, the base station realizes the data communication by providing resource assignment information, data signal modulation and coding information, data signal spatial multiplexing number information, transmission power control information and the like to the terminal. For such control information, it is possible to use a method disclosed in NPL 1.

In addition, it is possible to use various methods as a communication method using the MIMO technique in the downlink, and for example, a multi user MIMO scheme in which the same resource is assigned to different terminals or a Cooperative Multipoint, Coordinated Multipoint (COMP) scheme in which a plurality of base stations cooperate to perform data communication can be used.

FIG. 37 is a diagram illustrating an example in which the multi user MIMO scheme is performed. In FIG. 37, a base station 3701 performs data communication with a terminal 3702 through a downlink 3704 and performs data communication with a terminal 3703 through a downlink 3705. Here, the terminal 3702 and the terminal 3703 perform data communication based on the multi user MIMO. In the downlink 3404 and the downlink 3705, the same resource is used. The resource is configured of resources in a frequency direction and a time direction. In addition, the base station 3701 controls beams with respect to each of the downlink 3704 and the downlink 3705 by using a pre-coding technique or the like and thus maintains mutual orthogonality or reduces the same channel interference. Accordingly, the base station 3701 can realize the data communication with the terminal 3702 and the terminal 3703 by using the same resource.

FIG. 38 is a diagram illustrating an example in which the downlink CoMP scheme is performed. FIG. 38 shows a case where a macro base station 3801 with wider coverage and a RRH (Remote Radio Head) 3802 with narrower coverage than that of the macro base station 3801 construct a radio communication system using a heterogeneous network configuration. Here, a configuration in which the coverage of the macro base station 3801 includes a part or an entirety of the coverage of the RRH 3802 will be considered. In the example shown in FIG. 38, the macro base station 3801 and the RRH 3802 construct the heterogeneous network configuration and cooperate to perform data communication with a terminal 3804 through a downlink 3805 and a downlink 3806, respectively. The macro base station 3801 is connected with the RRH 3802 via a connection 3803 and can transmit and receive control signals and data signals to and from the RRH 3802. For the connection 3803, it is possible to use wired connection such as an optical fiber or radio connection using a relay technique. Here, it is possible to improve total spectral efficiency (transmission capacity) in a coverage area constructed by the macro base station 3801 by a part or an entirety of the macro base station 3801 and the RRH 3802 respectively using the same frequency (resource).

The terminal 3804 can perform single cell communication with the base station 3801 or the RRH 3802 when positioned near the base station 3801 or the RRH 3802. Furthermore, the terminal 3804 is to prepare a counter measure for the same channel interference from the macro base station 3801 when positioned near an end (cell edge) of the coverage constructed by the RRH 3802. A method for reducing or suppressing interference of the cell edge region with respect to the terminal 3804 by using the COMP scheme, in which the macro base station 3801 and the RRH 3802 cooperate, as multi cell communication (cooperative communication, multi point communication, CoMP) between the macro base station 3801 and the RRH 3802 has been reviewed. As such a CoMP scheme, a method disclosed in NPL 2 has been examined.

FIG. 39 is a diagram illustrating an example in which the uplink CoMP scheme is performed. FIG. 39 shows a case where a macro base station 3901 with wide coverage and a RRH (Remote Radio Head) 3902 with narrower coverage than that of the macro station construct a radio communication system using the heterogeneous network configuration. Here, a configuration in which the coverage of the macro base station 3901 includes a part or an entirety of the coverage of the RRH 3902 will be considered. In the example shown in FIG. 39, the macro base station 3901 and the RRH 3902 construct the heterogeneous network configuration and cooperate to perform data communication with a terminal 3904 via an uplink 3905 and an uplink 3906, respectively. The macro base station 3901 is connected with the RRH 3902 via connection 3903 and can transmit and receive reception signals, control signals, and data signals to and from the RRH 3902. For the connection 3803, it is possible to use wired connection such as an optical fiber or radio connection using the relay technique. Here, it is possible to improve total spectral efficiency (transmission capacity) in a coverage area constructed by the macro base station 3901 by a part or an entirety of the macro base station 3901 and the RRH 3902 respectively using the same frequency (resource).

The terminal 3904 can perform single cell communication with the base station 3901 or the RRH 3902 when positioned near the base station 3901 or the RRH 3902. In such a case, if the terminal 3904 is positioned near the base station 3901, then the base station 3901 receives and demodulates a signal received via the uplink 3905. Alternatively, if the terminal 3904 is positioned near the RRH 3902, then the RRH 3902 receives and demodulates a signal received via the uplink 3906. Furthermore, if the terminal 3904 is positioned near an end (cell edge) of the coverage constructed by the RRH 3902 or near an intermediate point between the base station 3901 and the RRH 3902, then the macro base station 3901 receives the signal received via the uplink 3905, the RRH 3902 receives the signal received via the uplink 3906, the macro base station 3901 and the RRH 3902 then transmit and receive the signals received from the terminal 3904 via the connection 3903, synthesize the signals received from the terminal 3904, and demodulate the synthesized signal. An improvement in performance of the data communication by such processing is expected. This is a method called synthesized reception (JR: Joint Reception), and it is possible to improve the performance of the data communication in the cell edge region or the region near the intermediate point between the macro base station 3901 and the RRH 3902 by using the CoMP scheme in which the macro base station 3901 and the RRH 3902 cooperate as uplink multi cell communication (cooperative communication, multi point communication, CoMP).

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), March 2011, 3GPP TS 36.212 V10.1.0 (2011-03)

NPL 2: 3rd Generation Partnership Project; Technical Specification Group Radio Access Network; Further Advancements for E-UTRA Physical Layer Aspects (Release 9), March 2010, 3GPP TR 36.814 V9.0.0 (2010-03)

SUMMARY OF INVENTION

Technical Problem

However, it is possible to perform appropriate resource assignment and expect an improvement in throughput of an entire system by a terminal transmitting an uplink signal with appropriate uplink transmission power in a communication system in which cooperative communication is available, such as the CoMP scheme.

The present invention was made in view of the aforementioned circumstances, and an object thereof is to provide a terminal, a base station, a method, and an integrated circuit which allow the terminal to set appropriate uplink transmission power in a communication system in which the base station and the terminal communicate.

Solution to Problem (1) The present invention was achieved in order to solve the aforementioned problems, and according to an aspect of the present invention, there is provided a terminal which performs communication with a base station, the terminal including: a reception unit, which performs demodulation processing on a transmission power control (TPC) command included in a downlink control information (DCI) format as a first TPC command and obtains a power correction value from the first TPC command when the DCI format has been detected in a first state, and which performs demodulation processing on both the first TPC command and a second TPC command included in the DCI format and obtains power correction values from the first TPC command and the second TPC command when the DCI format has been detected in a second state.

(2) According to an aspect of the present invention, there is provided a terminal which performs communication with a base station, the terminal including: a reception unit, which performs demodulation processing on a transmission power control (TPC) command included in a downlink control information (DCI) format as a first TPC command and obtains a power correction value from the first TPC command when the DCI format has been detected in a first state, which performs demodulation processing on the TPC command as the first TPC command and obtains a power correction value from the first TPC command when the DCI format has been detected in a first control channel region in a second state, and which performs demodulation processing on the TPC command as the first TPC command and a second TPC command and obtains power correction values thereof when the DCI format has been detected in a second control channel region as a region different from the first control channel region in the second state.

(3) According to an aspect of the present invention, there is provided a terminal which performs communication with a base station, the terminal including: a reception unit, which performs demodulation processing on a transmission power control (TPC) command included in a downlink control information (DCI) format as a first TPC command and obtains a power correction value from the first TPC command when the DCI format has been detected in a first state, which performs demodulation processing on the TPC command as the first TPC command and obtains a power correction value from the first TPC command when the DCI format has been detected in a downlink subframe included in a first subframe subset in a second state, and which performs demodulation processing on the TPC command as first and second TPC commands and obtains power correction values from the first and second TPC commands when the DCI format has been detected in a downlink subframe included in a second subframe subset in the second state.

(4) According to an aspect of the present invention, there is provided a terminal which performs communication with a base station, the terminal including: a reception unit, which performs demodulation processing on a transmission power control (TPC) command included in a downlink control information (DCI) format as a first TPC command and obtains a power correction value from the first TPC command when the DCI format has been detected in a primary cell and a secondary cell in a first state, which performs demodulation processing on the TPC command included in the DCI format as the first TPC command and obtains a power correction value from the first TPC command when the DCI format has been detected in the primary cell in a second state, and which performs demodulation processing on the TPC command included in the DCI format as the first and second TPC commands and obtains power correction values from the first and second TPC commands when the DCI format has been detected in the secondary cell in the second state.

(5) According to an aspect of the present invention, there is provided a terminal which performs communication with a base station, the terminal including: a reception unit, which performs demodulation processing on a transmission power control (TPC) command included in a downlink control information (DCI) format and obtains a power correction value from the TPC command when the DCI format has been detected in a first state, which performs demodulation processing on the TPC command included in the DCI format and obtains a power correction value from the TPC command when the DCI format has been detected in a second state and the DCI format is an uplink grant, and which determines that not only a first TPC command but also a second TPC command are included in the TPC command included in the DCI format, performs demodulation processing thereon, and obtains power correction values from the first TPC command and the second TPC command when the DCI format has been detected in the second state and the DCI format is a downlink assignment.

(6) According to an aspect of the present invention, a power correction value of a physical uplink shared channel (PUSCH) is obtained from the first TPC command, and a power correction value of a sounding reference signal (SRS) is obtained from the second TPC command in the terminal as described above.

(7) According to an aspect of the present invention, a power correction value of a physical uplink control channel (PUCCH) is obtained from the first TPC command, and a power correction value of a sounding reference signal (SRS) is obtained from the second TPC command in the terminal as described above.

(8) According to an aspect of the present invention, the first state is a state where only a piece of configuration information relating to a channel-state information reference signal (CSI-RS) has been set, and the second state is a state where two or more pieces of configuration information relating to the CSI-RS have been set in the terminal as described above.

(9) According to an aspect of the present invention, the first state is a state where a downlink control signal can be detected only in a first control channel region, and the second state is a state where the downlink control signal can be detected in first and second control channel regions in the terminal as described above.

(10) According to an aspect of the present invention, when a transmission request by an SRS request is included in the DCI format, SRS transmission power is calculated based on a power correction value obtained from a TPC command of the PUSCH in the first state, and the SRS transmission power is calculated based on a power correction value obtained from a TPC command of the SRS in the second state in the terminal as described above.

(11) According to an aspect of the present invention, there is provided a communication system which performs communication between a base station and a terminal, the base station providing a DCI format including a first and/or second transmission power control (TPC) command to the terminal, the terminal performing demodulation processing on the TPC command included in the DCI format as the first TPC command and obtaining a power correction value from the first TPC command when the DCI format has been detected in a first state, the terminal performing demodulation processing on both the first TPC command and the second TPC command included in the DCI format and obtaining power correction values from the first TPC command and the second TPC command when the DCI format has been detected in a second state.

(12) According to an aspect of the present invention, there is provided a communication system which performs communication between a base station and a terminal, the base station providing a DCI format including a first and/or second transmission power control (TPC) command to the terminal, the terminal performing demodulation processing on the TPC command included in the DCI format as the first TPC command and obtaining a power correction value from the first TPC command when the DCI format has been detected in a first state, the terminal performing demodulation processing on the TPC command as the first TPC command and obtaining a power correction value from the first TPC command when the DCI format has been detected in a first control channel region in a second state, the terminal performing demodulation processing on the TPC command as the first TPC command and a second TPC command and obtaining power correction values thereof when the DCI format has been detected in a second control channel region as a region different from the first control channel region in the second state.

(13) According to an aspect of the present invention, there is provided a communication system which performs communication between a base station and a terminal, the base station providing a DCI format including a first and/or second transmission power control (TPC) command to the terminal, the terminal performing demodulation processing on the TPC command included in the DCI format as the first TPC command and obtaining a power correction value from the first TPC command when the DCI format has been detected in the first state, terminal performing demodulation processing on the TPC command as the first TCP command and obtaining a power correction value from the first TPC command when the DCI format has been detected in a downlink subframe included in a first subframe subset in a second state, the terminal performing demodulation processing on the TCP command as the first and second TPC commands and obtaining power correction values from the first and second TPC commands when the DCI format has been detected in a downlink subframe included in a second subframe subset in the second state.

(14) According to an aspect of the present invention, there is provided a communication system which performs communication between a base station and a terminal, the base station providing a DCI format including a first and/or second transmission power control (TPC) command to the terminal, the terminal performing demodulation processing on the TPC command included in the DCI format as the first TPC command and obtaining a power correction value from the first TPC command when the DCI format has been detected in a primary cell and a secondary cell in a first state, the terminal performing demodulation processing on the TPC command included in the DCI format as the first TPC command and obtaining a power correction value from the first TPC command when the DCI format has been detected in the primary cell in a second state, the terminal performing demodulation processing on the TPC command included in the DCI format as the first and second TPC commands and obtaining power correction values from the first and second TPC commands when the DCI format has been detected in the secondary cell in the second state.

(15) According to an aspect of the present invention, there is provided a communication system which performs communication between a base station and a terminal, the base station providing a DCI format including a first and/or second transmission power control (TPC) command to the terminal, the terminal performing demodulation processing on the TPC command included in the DCI format and obtaining a power correction value from the TPC command when the DCI format has been detected in a first state, the terminal performing demodulation processing on the TPC command included in the DCI format and obtaining a power correction value from the TPC command when the DCI format has been detected in a second state and the DCI format is an uplink grant, the terminal determining that not only the first TPC command but also the second TPC command are included in the TPC command included in the DCI format, performing demodulation processing thereon, and obtaining power correction values from the first TPC command and the second TPC command when the DCI format has been detected in the second state and the DCI format is a downlink assignment.

(16) According to an aspect of the present invention, a power correction value of a physical uplink shared channel (PUSCH) is obtained from the first TPC command, and a power correction value of a sounding reference signal (SRS) is obtained from the second TPC command in the communication system as described above.

(17) According to an aspect of the present invention, a power correction value of a physical uplink control channel (PUCCH) is obtained from the first TPC command, and a power correction value of a sounding reference signal (SRS) is obtained from the second TPC command in the communication system as described above.

(18) According to an aspect of the present invention, the first state is a state where only one piece of configuration information relating to a channel-state information reference signal (CSI-RS) has been set, and the second state is a state where two or more pieces of configuration information relating to the CSI-RS have been set in the communication system as described above.

(19) According to an aspect of the present invention, the first state is a state where a downlink control signal can be detected only in a first control channel region, and the second state is a state where the downlink control signal can be detected in first and second control channel regions in the communication system.

(20) According to an aspect of the present invention, when a transmission request by an SRS request is included in the DCI format, SRS transmission power is calculated based on a power correction value obtained from a TPC command of the PUSCH in the first state, and the SRS transmission power is calculated based on a power correction value obtained from a TPC command of the SRS in the second state in the communication system as described above.

(21) According to an aspect of the present invention, there is provided a communication method performed between a base station and a terminal, the method including: causing the base station to provide a DCI format including a first and/or second transmission power control (TPC) command to the terminal, and causing the terminal to perform demodulation processing on the TPC command included in the DCI format as the first TPC command and obtain a power correction value from the first TPC command when the DCI format has been detected in a first state, or causing the terminal to perform demodulation processing on both the first TPC command and the second TPC command included in the DCI format and obtain power correction values from the first TPC command and the second TPC command when the DCI format has been detected in a second state.

(22) According to an aspect of the present invention, there is provided a base station which communicates with a terminal, the base station including: a transmission unit which provides a downlink control information (DCI) format including a first transmission power control (TPC) command to the terminal in a first state and provides a DCI format including the first TPC command and a second TPC command to the terminal in a second state.

With such a configuration, the base station can dynamically perform uplink transmission power control appropriate for the base station or the RRH on the terminal.

Advantageous Effects of Invention

According to the present invention, the terminal can appropriately configure uplink transmission power in the communication system in which the base station and the terminal communicate.

BRIEF DESCRIPTION OF DRAWINGS

FIG. 20 is a diagram illustrating a detail of an EUTRA measurement result list.

FIG. 21 is a diagram illustrating a detail of a second measurement report.

FIG. 27 is a diagram illustrating an example of second parameter configuration relating to uplink power control according to the embodiment of the present application.

FIG. 28 is a diagram illustrating an example of first parameter configuration relating to uplink power control and second parameter configuration relating to uplink power control included in radio resource configuration.

FIG. 29 is a diagram illustrating an example of second parameter configuration relating to cell-specific uplink power control.

FIG. 30 is a diagram illustrating an example of first parameter configuration relating to terminal-specific uplink power control and second parameter configuration relating to terminal-specific uplink power control.

FIG. 31 is a diagram illustrating an example of the pathloss reference resource.

FIG. 33 is a diagram illustrating another example (Another Example 2) of the pathloss reference resource.

FIG. 34 illustrates an example of parameters relating to the uplink power control to be configured for each uplink physical channel according to a seventh embodiment of the present invention.

FIG. 35 is a diagram illustrating an example in which the numbers of bits or indexes configuring a first TPC command field and a second TPC command field are different.

FIG. 36 is a diagram illustrating a case where the first TPC command field and the second TPC command field are managed based on different tables.

DESCRIPTION OF EMBODIMENTS

First Embodiment

Hereinafter, description will be given of a first embodiment of the present invention. A communication system according to the first embodiment is provided with a macro base station (a base station, a transmission apparatus, a cell, a transmission spot, a transmit antenna group, a transmit antenna port group, a receive antenna port group, a reception spot, a component carrier, an eNodeB, a transmission point, a reception point, a point, a transmission/reception point, a reference spot, and a reference point), a Remote Radio Head (an RRH, a remote antenna, a distributed antenna, a base station, a transmission apparatus, a cell, a transmission spot, a transmit antenna group, a transmit antenna port group, a reception spot, a component carrier, an eNodeB, a transmission point, a reception point, a point, a transmission/reception point, a reference spot, and a reference point), and a terminal (a terminal apparatus, a mobile terminal, a mobile station, a reception point, a reception terminal, a reception apparatus, a third communication apparatus, a transmit antenna port group, a transmission spot, a receive antenna group, a receive antenna port group, a UE, a transmission point, a reception point, a point, and a transmission/reception point). In downlink communication, the macro base station and the RRH function as transmission points (TPs), and the terminal functions as a reception point (RP: Reception Point). In uplink communication, the macro base station and the RRH function as reception points, and the terminal functions as a transmission point. In addition, the downlink transmission point and the uplink reception point can be pathloss reference points (Pathloss Reference Points, Reference Points) for downlink pathloss measurement. Moreover, the reference point for pathloss measurement can be configured independently of the transmission point and the reception point. Furthermore, the base station 101, the RRH 103, the downlink transmission point, and the uplink reception point which are connected to the terminal 102 are collectively referred to as a reference point in some cases. In addition, the base station 101 or the RRH 103 can configure a component carrier (carrier component) corresponding to a serving cell for the terminal 102.

Figure 1:
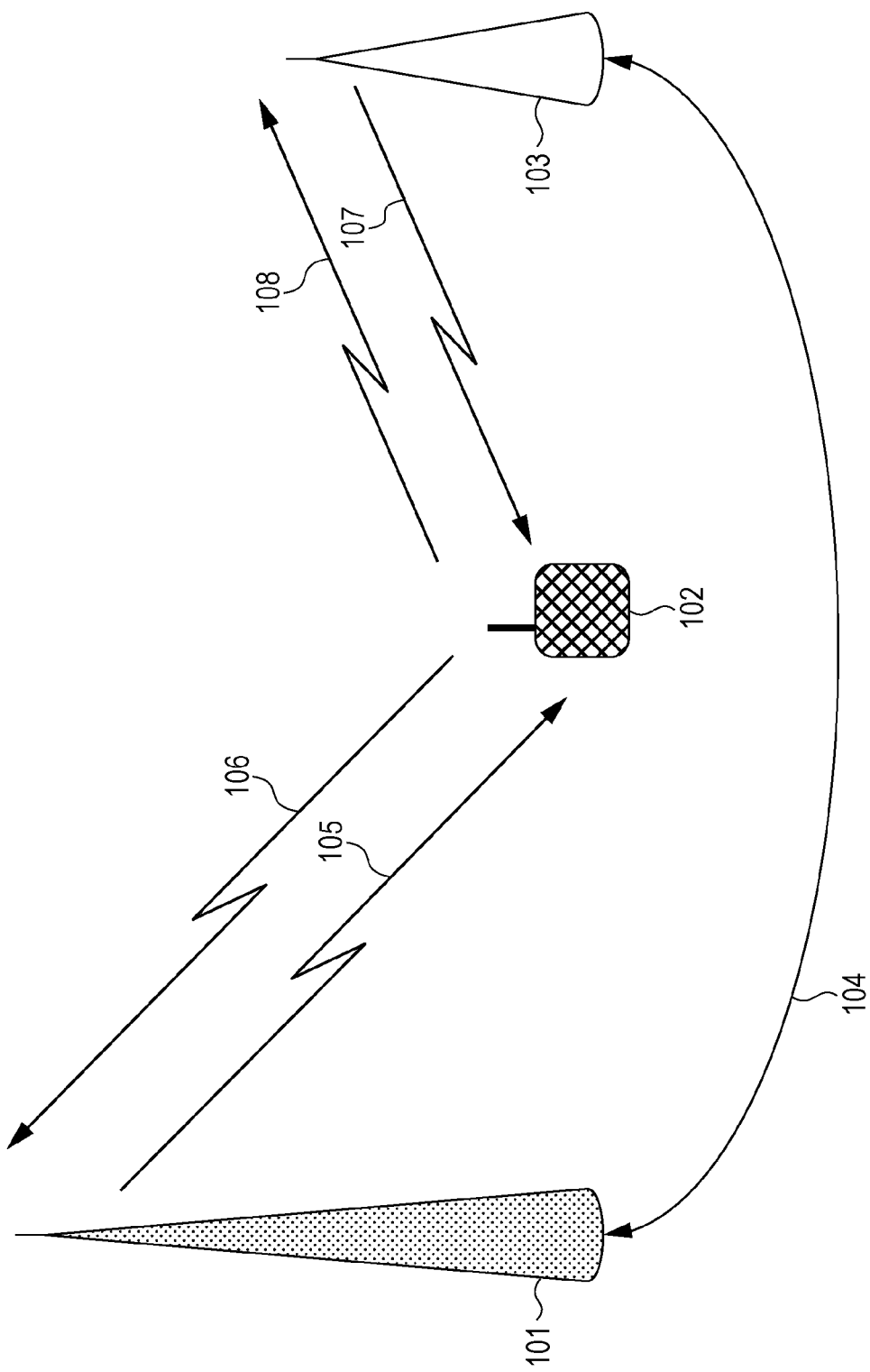
FIG. 1 is a diagram schematically illustrating a communication system which performs data transmission according to the first embodiment of the present invention.

FIG. 1 is a diagram schematically illustrating a communication system which performs data transmission according to the first embodiment of the present invention. In FIG. 1, the base station (macro base station) 101 transmits and receives control information and information data via a downlink 105 and an uplink 106 in order to perform data communication with the terminal 102. Similarly, the RRH 103 transmits and receives control information and information data via a downlink 107 and an uplink 108 in order to perform data communication with the terminal 102. For a connection 104, it is possible to use wired connection such as an optical fiber or radio connection using a relay technique. Here, it is possible to improve total spectral efficiency (transmission capacity) in a coverage area constructed by the macro base station 101 by a part or an entirety of the macro base station 101 and the RRH 103 using the same frequency (resource). Such a network constructed between adjacent stations (between the macro base station and the RRH, for example) by using the same frequency is called a single frequency network (SFN: Single Frequency Network). In FIG. 1, the base station 101 provides a cell ID to be used for a cell-specific reference signal (CRS: Cell-specific Reference Signal) or for a terminal-specific reference signal (DL DMRS: Downlink Demodulation Reference Signal), UE-RS: UE-specific Reference Signal) which will be described later. In addition, the RRH 103 can also provide a cell ID. The cell ID provided by the RRH 103 is the same as that provided by the base station 101 in some cases and is different in other cases. Moreover, the base station 101 described below represents the base station 101 and the RRH 103 shown in FIG. 1 in some cases. Furthermore, description about operations between the base station 101 and the RRH 103 provided below may be description about operations between a macro base station and an RRH.

Figure 2:
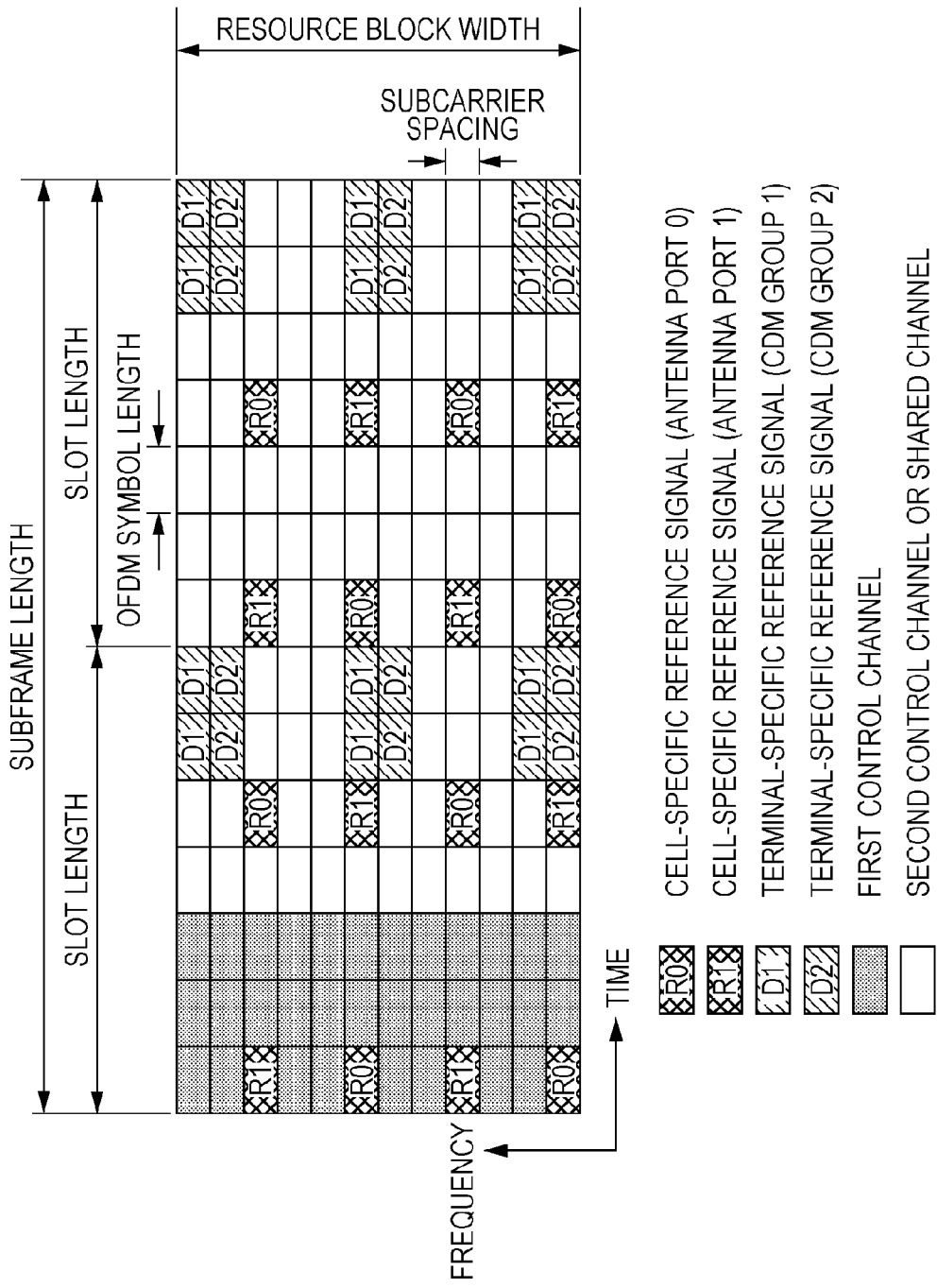
FIG. 2 is a diagram illustrating an example of a single resource block pair which is mapped by a base station 101.

FIG. 2 is a diagram illustrating an example of a single resource block which is mapped by the base station 101 and/or the RRH 103 via the downlink 105 or the downlink 107. FIG. 2 illustrates two resource blocks (resource block pair), a resource block is configured of twelve subcarriers in a frequency direction and of seven OFDM symbols in a time direction. Each subcarrier in an OFDM symbol is referred to as a resource element (RE: Resource Element). The resource block pairs are aligned in the frequency direction, and the number of the resource block pairs can be configured for each base station 101. For example, the number of the resource block pairs can be configured to 6 to 110. A width in the frequency direction at that time is referred to as a system bandwidth. In addition, a time direction of a resource block pair is referred to as a subframe. Seven subsequent OFDM symbols in the time direction in each subframe are respectively referred to as a slot. In the following description, a resource block pair will be simply referred to as a resource block (RB: Resource Block).

R0 and R1 among the hatched resource elements respectively represent cell-specific reference numbers (CRS) of antenna ports 0 and 1. Here, although FIG. 2 shows a cell-specific reference signal in a case of two antenna ports, it is possible to change the number of antenna ports, and for example, it is possible to map a cell-specific reference signal for one antenna port or four antenna ports. In addition, the cell-specific reference signal can be configured for a maximum of four antenna ports (antenna ports 0 to 3). In other words, the cell-specific reference signal can be transmitted from at least one of the antenna ports 0 to 3.

In addition, the base station 101 and the RRH 103 assign R0 and R1 to different resource elements in some cases and assign R0 and R1 to the same resource element in other cases. For example, when the base station 101 and the RRH 103 assign R0 and R1 to different resource elements and/or different signal sequences, the terminal 102 can individually calculate respective received power (reception signal power) by using the cell-specific reference signal. It is possible to perform the aforementioned configuration when the cell IDs provided by the base station 101 and the RRH 103 are different, in particular. In another example, only the base station 101 assigns R0 and R1 to a part of the resource elements, and the RRH 103 does not assign R0 and R1 to any resource element in some cases. In such a case, the terminal 102 can calculate the received power of the macro base station 101 from the cell-specific reference signal. It is possible to perform the aforementioned configuration when the cell ID is provided only by the base station 101, in particular. In another example, when the base station 101 and the RRH 103 assign R0 and R1 to the same resource element and the same sequence is transmitted from the base station 101 and the RRH 103, the terminal 102 can calculate synthesized received power by using the cell-specific reference signal. It is possible to perform the aforementioned configuration when the cell IDs provided by the base station 101 and the RRH 103 are the same, in particular.

In the description of the embodiment of the present invention, calculation of power includes calculation of a power value, setting of power includes configuring a power value, measurement of power includes measurement of a power value, and reporting of power includes reporting of a power value. As described above, the expression "power" appropriately includes the meaning of "a power value".

D1 and D2 among the hatched resource elements represent terminal-specific reference signals (DL DMRS, UE-RS) of CDM (Code Division Multiplexing) group 1 and CDM group 2, respectively. In addition, terminal-specific reference signals of the CDM group 1 and the CDM group 2 are respectively code-division-multiplexed by an orthogonal code such as Walsh code. Moreover, the terminal-specific reference signals of the CDM group 1 and the CDM group 2 are mutually frequency-division-multiplexed (FDM: Frequency Division Multiplexing). Here, the base station 101 can map the terminal-specific reference signals up to eight ranks by using eight antenna ports (antenna ports 7 to 14) in accordance with a control signal or a data signal to be mapped for a specific resource block pair. In addition, the base station 101 can change the CDM spreading code length and the number of resource elements to be mapped in accordance with the number of ranks up to which the terminal-specific reference signals are mapped.

For example, a terminal-specific reference signal in a case where the number of ranks is one or two is configured, as the antenna ports 7 and 8 and, to have two-chip spreading code length, and is mapped in the CDM group 1. A terminal-specific reference signals in a case where the number of ranks is three or four is configured to have a two-chip spreading code length as the antenna ports 9 and 10 in addition to the antenna ports 7 and 8 and is further mapped in the CDM group 2. A terminal-specific reference signal in a case where the number of ranks is five to eight is configured to have four-chip spreading code length as the antenna ports 7 to 14 and is mapped in the CDM group 1 and the CDM group 2.

In addition, the orthogonal code corresponding to each antenna port in the terminal-specific reference signal is multiplexed with a scramble code. The scramble code is generated based on a cell ID and a scramble ID provided by the base station 101. For example, the scramble code is generated from a pseudo noise sequence generated based on the cell ID and the scramble ID which are provided by the base station 101. For example, the scramble ID is a value indicated by 0 or 1. In addition, information indicating the scramble ID and the antenna port to be used can be jointcoded and indexed.

A region configured by the top first to third OFDM symbols among the hatched resource elements in FIG. 2 is configured as a region where a first control channel (PD-CCH: Physical Downlink Control Channel) is arranged. In addition, the base station 101 can configure the number of OFDM symbols for each subframe in the region where the first control channel is arranged. In addition, a region configured by resource elements which are shown in all white represents a region where a second control channel (E-PDCCH) or a shared channel (PDSCH: Physical Downlink Shared Channel) (physical data channel) is arranged. Moreover, the base station 101 can configure a region where the second control channel or the shared channel is arranged for each resource block pair. Furthermore, the numbers of ranks of the control signal mapped in the second control channel and of the data signal mapped in the shared channel can be configured differently from the number of ranks of the control signal mapped in the first control channel.

Here, the number of resource blocks can be changed in accordance with a frequency bandwidth (system bandwidth) used in the communication system. For example, the base station 101 can use 6 to 110 resource blocks in the system band, and the unit is also referred to as a component carrier (CC: Component Carrier, Carrier Component). Furthermore, the base station 101 can configure a plurality of component carriers by frequency aggregation (carrier aggregation) for the terminal 102. For example, the base station 101 can configure a single component carrier at 20 MHz for the terminal 102, configure five component carriers in a contiguous and/or non-contiguous manner in the frequency direction, and set the bandwidth available for the total communication system to 100 MHz. In addition, when the carrier aggregation is configured, the terminal 102 recognizes an added serving cell as a secondary cell and recognizes a serving cell configured during initial connection or handover as a primary cell. Alternatively, when information relating to the primary cell and information relating to the secondary cell are provided by the base station 101, the terminal 102 configures the information of the respective cells.

Here, in relation to the control information, modulation processing, error correction coding processing, and the like are performed by using a predetermined modulation scheme and a coding scheme, and a control signal is generated. The control signal is transmitted and received via a first control channel (first physical control channel) or a second control channel (second physical control channel) which is different from the first control channel. However, the physical control channel described herein is a type of a physical channel and is a control channel defined in a physical frame.

In addition, from one point of view, the first control channel is a physical control channel using the same transmission port (also referred to as an antenna port) as that of the cell-specific reference signal. In addition, the second control channel is a physical control channel using the same transmission port as that of the terminal-specific reference signal. The terminal 102 demodulates the control signal to be mapped in the first control channel by using the cell-specific reference signal and demodulates the control signal to be mapped in the second control channel by using the terminal-specific reference signal. The cell-specific reference signal is a reference signal common to all the terminals 102 in the cell and is inserted into all the resource blocks in the system band, and therefore, the cell-specific reference signal is a reference signal available for any terminal 102. For this reason, the first control channel can demodulate any terminal 102. In contrast, the terminal-specific reference signal is a reference signal inserted only into an assigned resource blocks, and it is possible to adaptively perform beam forming processing in the same manner as the data signal. For this reason, the second control channel can achieve a gain of adaptive beam forming. In addition, the first control channel is also referred to as a physical downlink control channel (PDCCH: Physical Downlink Control Channel). The second control channel is also referred to as an enhanced physical downlink control channel (E-PDCCH: Enhanced PDCCH).

From another point of view, the first control channel is a physical control channel on the OFDM symbols positioned at a front part of the physical subframe and can be arranged in the entire system bandwidth (Component Carrier, (CC: Component Carrier, Carrier Component)) of these OFDM symbols. In addition, the second control channel is a physical control channel on the OFDM symbols positioned behind the first control channel in the physical subframe and can be arranged in a part of a band within the system bandwidth of these OFDM symbols. Since the first control channel is arranged on the control channel-dedicated OFDM symbols positioned at the front part of the physical subframe, the first control channel can perform reception and demodulation earlier than the OFDM symbols for the physical data channel which are positioned behind. In addition, it is possible to receive signals from the terminal 102 which monitors only control channel-dedicated OFDM symbols (monitoring). Moreover, the resources used for the first control channel may be spread and arranged in the entire CC, and therefore, it is possible to randomize inter-cell interference with respect to the first control channel. In contrast, the second channel is arranged on the OFDM symbols at the rear position for the shared channel (physical data channel) which is generally received by the terminal 102 currently in communication. In addition, the base station 101 can orthogonally multiplex (multiplex without any interference) between the second control channels or between the second control channel and the physical data channel by frequency-division-multiplexing the second control channel.

From another point of view, the first control channel is a cell-specific physical control channel and is a physical channel which can be obtained by both the terminal 102 in an idle state (a stand-by state, a pausing state, a non-connected state) and the terminal 102 in a connected state (connected state, access state). In addition, the second control channel is a terminal-specific physical control channel and is a physical channel which can be obtained only by the terminal 102 in the connected state. Here, the idle state means a state where data transmission and reception are not immediately performed, such as a state where the base station 101 does not accumulate information on Radio Resource Control (RRC) (RRC_IDLE state). In contrast, the connected state means a state where data transmission and reception can immediately be performed, such as a state where the terminal 102 holds information on the network (RRC_CONNECTED state). The first control channel is a channel which can be received by the terminal 102 without depending on terminal-specific RRC signaling (RRC signal). The second control channel is a channel configured by the terminal-specific RRC signaling and is a channel which can be received by the terminal 102 by the terminal-specific RRC signaling. That is, the first control channel is a channel which can be received by any terminal due to configuration which is limited in advance, and the second control channel is a channel which allows the terminal-specific configuration to be easily changed. In addition, the RRC signaling is referred to as higher layer signaling (Higher layer signaling) or dedicated signaling (Dedicated Signaling) in some cases.

Figure 3:
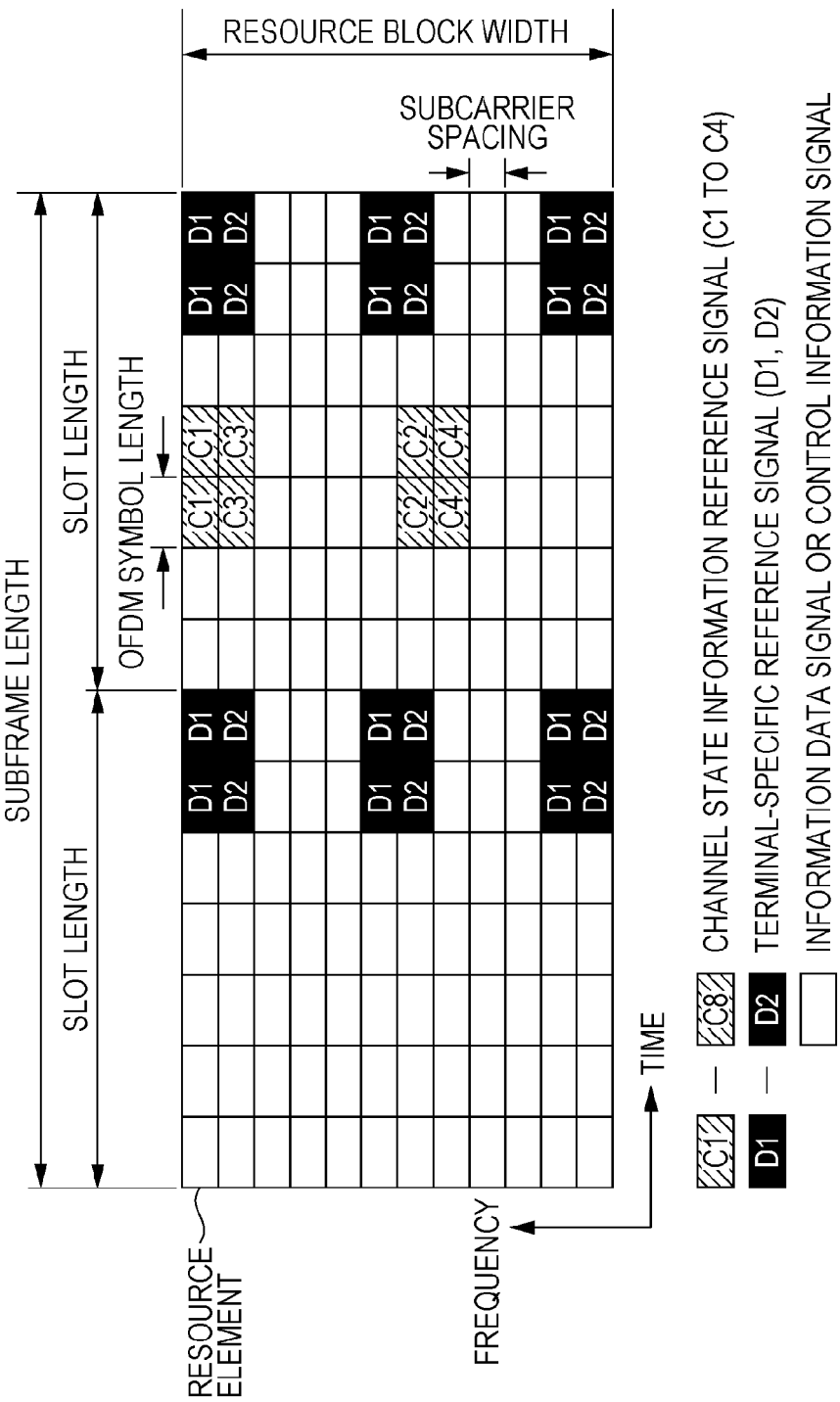
FIG. 3 is a diagram illustrating another example of a single resource block pair mapped by the base station 101.

FIG. 3 is a diagram showing a resource block pair in which channel-state information reference signal (CSI-RS) for eight antenna ports are mapped. FIG. 3 shows a case where the channel-state information reference signals when the number of antenna ports (the number of CIS ports) in the base station is eight are mapped. In addition, FIG. 3 shows two resource blocks in a subframe.

Among the blacked out or hatched resource elements in FIG. 3, terminal-specific reference signals (reference signal for data signal demodulation) of the CDM groups 1 and 2 are represented as D1 and D2, and channel-state information reference signals of the CDM groups 1 to 4 are represented as C1 to C4. Furthermore, a data signal or a control signal is mapped in the resource elements other than the resource elements in which the aforementioned reference signals are mapped.

In relation to the channel-state information reference signals, a two-chip orthogonal code (Walsh code) is used for each CDM group, channel-state information reference signal ports (CSI ports (an antenna port, a resource grid)) are assigned to the respective orthogonal codes, and every two CSI ports are code-division-multiplexed (CDM: Code Division Multiplexing). Furthermore, the respective CDM groups are frequency-division-multiplexed. By using four CDM groups, the channel-state information reference signals of the eight antenna ports of the CSI ports 1 to 8 (antenna ports 15 to 22) are mapped. In the CDG group C1 of the channel-state information reference signal, for example, the channel-state information reference signals at the CSI ports 1 and 2 (antenna ports 15 and 16) are subjected to CDM and mapped. In the CDM group C2 of the channel-state information reference signal, the channel-state information reference signals at the CSI ports 3 and 4 (antenna ports 17 and 18) are subjected to CDM and mapped. In the CDM group C3 of the channel-state information reference signal, the channel-state information reference signals at the CSI ports 5 and 6 (antenna ports 19 and 20) are subjected to CDM and mapped. In the CDM group C4 of the channel-state information reference signals, the channel-state information reference signals at the CSI ports 7 and 8 (antenna ports 21 and 22) are subjected to CDM and mapped.

When the number of antenna ports in the base station 101 is eight, the base station 101 can set the number of layers (the number of ranks, the spatial multiplexing order, the number of DMRS ports) of the data signal or the control signal to a maximum of eight, and for example, the number of layers of the data signal can be set to two, and the number of layers of the control signal can be set to one. As the terminal-specific reference signals (DL DMRS, UE-RS), a two-chip or four-chip orthogonal code is used for each CDM group depending on the number of layers, and CDM is performed on every two layers or every four layers. Furthermore, the respective CDM groups of the terminal-specific reference signals are frequency-division-multiplexed. By using two CDM groups, the eight-layer terminal-specific reference signals at the DMRS ports 1 to 8 (antenna ports 7 to 14) are mapped.

Furthermore, the base station 101 can transmit the channel-state information reference signal when the number of antenna ports is 1, 2, or 4. The base station 101 can transmit the channel-state information reference signal for one antenna port or for two antenna ports by using the CDM group C1 of the channel-state information reference signal shown in FIG. 3. The base station 101 can transmit the channel-state information reference signal for four antenna ports by using the CDM groups C1 and C2 of the channel-state information reference signal shown in FIG. 3.

In addition, the base station 101 and the RRH 103 respectively assign different resource elements to some of C1 and C4 in some cases or assign the same resource elements to some of C1 to C4 in other cases. When the base station 101 and the RRH 103 respectively assign different resource elements or different signal sequences to some of C1 to C4, for example, the terminal 102 can individually calculate received power (received signal power) and channel state of the base station 101 and the RRH 103. In another example, when the base station 101 and the RRH 103 assign the same resource element to some of C1 to C4 and transmit the same sequence therefrom, the terminal 102 can calculate synthesized received power by using the channel-state information reference signal.

Figure 4:
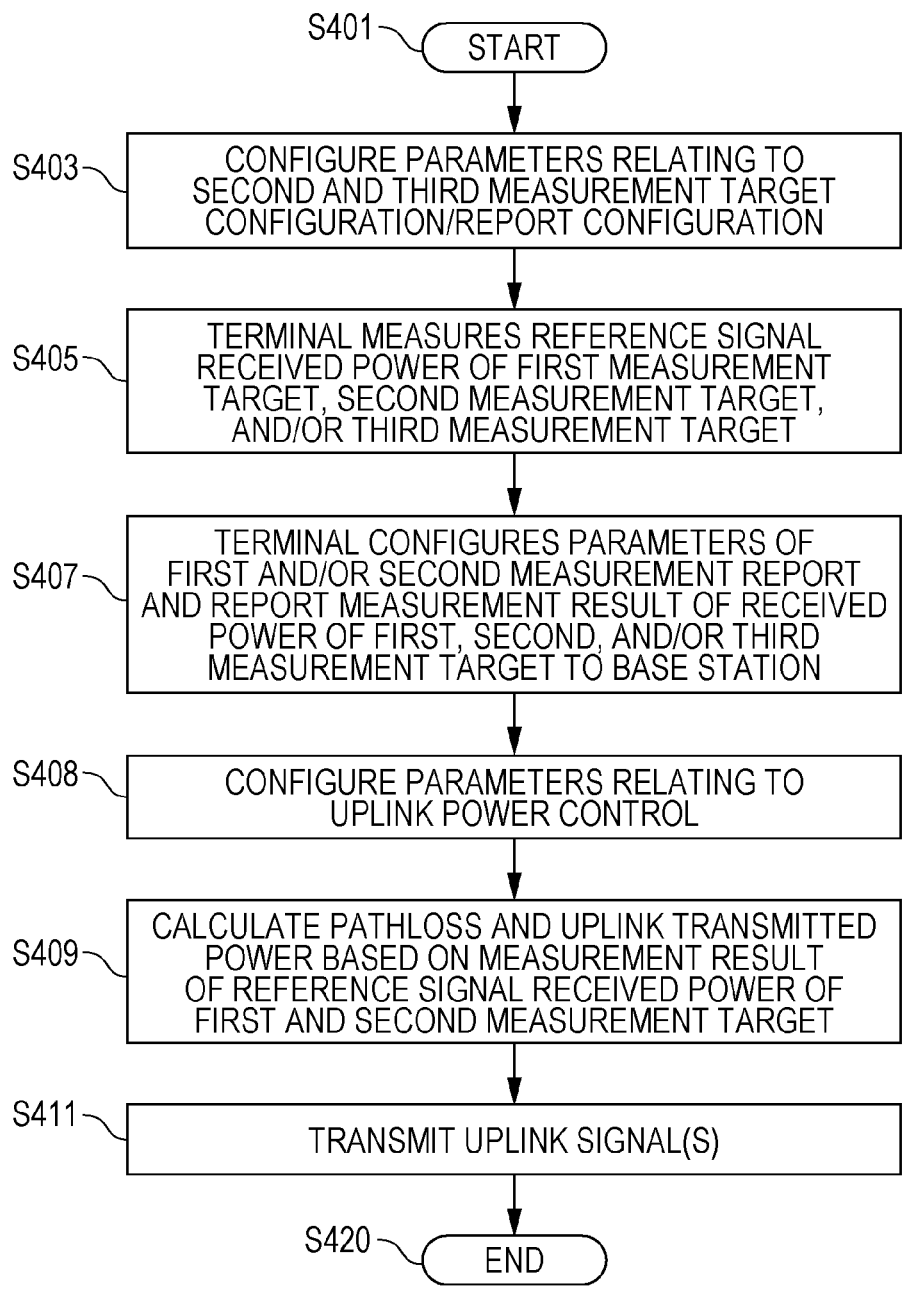
FIG. 4 is a flowchart illustrating a detail of uplink signal transmission processing by a terminal according to a first embodiment of the present invention.
Figure 15:
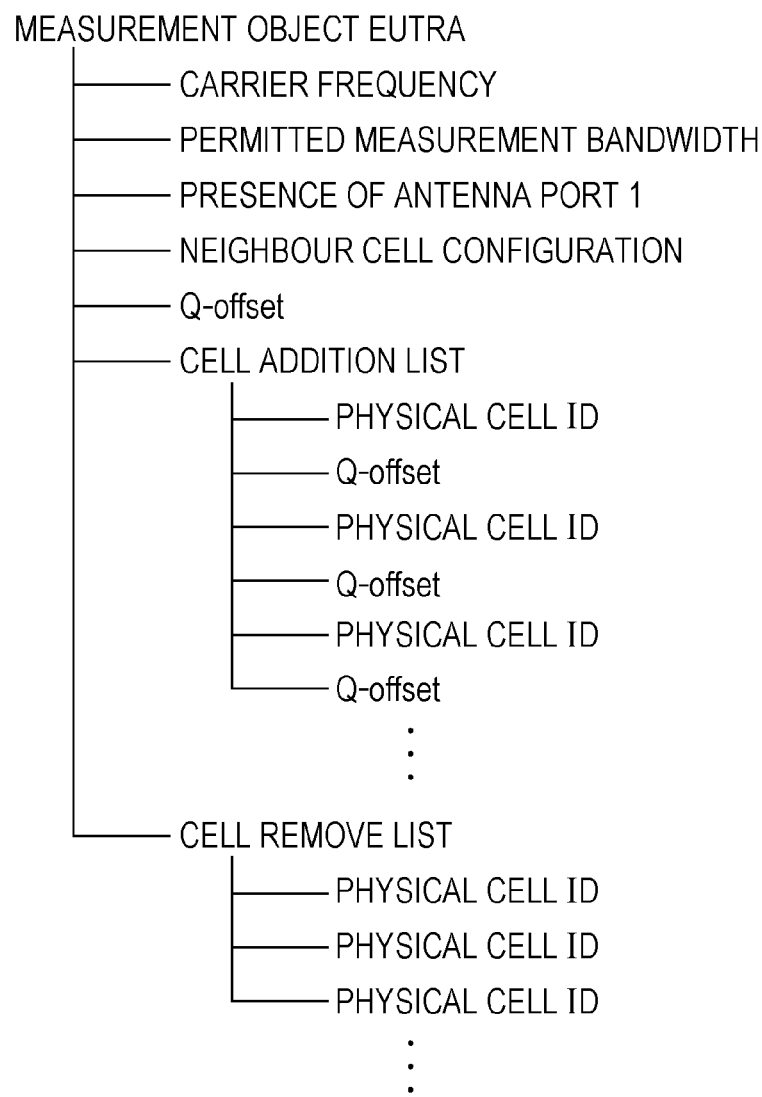
FIG. 15 is a diagram illustrating a detail of a measurement object EUTRA.

Next, the flowchart in FIG. 4 shows a state where the terminal 102 measures reference signals (cell-specific reference signal, channel-state information reference signal), reports received power to the base station 101, calculates pathloss based on the measurement result, calculates uplink transmission power based on the calculated pathloss, and transmits an uplink signal with the calculated uplink transmission power. In Step S403, the base station 101 performs parameter configuration for the terminal 102 in relation to measurement and report of the reference signal. Parameters in relation to second measurement target configuration, second report configuration, third measurement target configuration, and third report configuration can be configured in Step S403. In addition, each of the cell-specific reference signal and the channel-state information reference signal is a type of the downlink reference signal. Although not shown in the drawing, first measurement target configuration is made in advance in the terminal 102, and a measurement target (first measurement target) in first measurement target configuration can constantly be a cell-specific reference signal at the antenna port 0 or can be cell-specific reference signals at the antenna ports 0 and 1. That is, there is a possibility that a specific reference signal and an antenna port designated in advance are targeted in the first measurement target configuration. In contrast, there is a possibility that the channel information reference signal is targeted in the second measurement target configuration performed by the base station 101 and a resource (antenna port) as a measurement target thereof can be configured. Furthermore, the number of resources as second measurement targets may be one or two or more. Detailed description of these parameters will be given later. In addition, the third measurement target configuration performed by the base station 101 can include configuration for measuring a reference signal transmitted from a non-connected cell as will be described later. For example, reference signals as a measurement target of the third measurement target configuration (third measurement target) can be a cell-specific reference signal which is constantly transmitted from the antenna port 0 or cell-specific reference signals transmitted from the antenna port 0 and the antenna port 1. That is, there is a possibility in that a predesignated specific reference signal of a non-connected cell and a reference signal transmitted from a specific antenna port are targeted. In addition, the non-connected cell described herein can mean a cell in a state where a parameter has not been configured by the RRC. From another point of view, the cell-specific reference signal which is transmitted from the non-connected cell can be generated by using a physical ID (physical cell ID) which is different from that of the cell-specific reference signal transmitted from the connected cell. Here, by the base station 101 providing information on a physical ID (physical cell ID), a carrier frequency (center frequency), and the like to the terminal 102 in third measurement target configuration, it is possible to measure reception signal power of the cell-specific reference signal from the cell to which the terminal 102 is not connected (the cell for which the RRC parameter has not been configured) (see FIG. 15). In addition, the second report configuration and the third report configuration include configuration relating to a timing at which the terminal 102 transmits a trigger event or the like in the measurement report of the measurement result.

Next, description will be given of Step S405. In Step S405, the terminal 102 measures reference signal received power as a first measurement target configured in the first measurement target configuration when the aforementioned first measurement target configuration is performed, or measures reference signal received power as a second measurement target configured in the second measurement target configuration when the aforementioned second measurement target configuration is performed. In addition, the terminal 102 measures reference signal received power as a third measurement target configured in the third measurement target configuration when the third measurement target configuration is performed. Next, description will be given of Step S407. Parameters relating to the first measurement report and/or the second measurement report can be configured in Step S407. Here, the first measurement report can relate to reception signal power of a measurement target configured in the aforementioned first measurement target configuration and/or third measurement target configuration. In contrast, the second measurement report can relate to reception signal power of a measurement target configured in the aforementioned second measurement target configuration. Moreover, the aforementioned second measurement report is associated with one or some of a plurality of measurement results of the reference signal received power (RSRP: Reference Signal Received Power) as the second measurement target configured in the second measurement target configuration. In addition, there is a possibility in that information indicating which of the resource measurement results among the second measurement targets is to be regarded as a report target is also configured in the aforementioned second measurement report. Information on which of the aforementioned resource measurement results is to be regarded as a report target may be provided by indexes relating to the CSI ports 1 to 8 (antenna ports 15 to 22) or by an index relating to a frequency time resource. With such a configuration, the measurement result of the reference signal received power as the first measurement target and/or the third measurement target configured in the first measurement target configuration and/or the third measurement target configuration is reported when the aforementioned first measurement report is configured, and one measurement result or at least one of one or more measurement results of the reference signal received power as the second measurement target configured in the second measurement target configuration is reported when the aforementioned second measurement report is configured in Step S407. Moreover, there is a possibility in that information indicating which of the resource measurement results among the second measurement targets is to be regarded as a report target is also configured in the second measurement target as described above.

Next, description will be given of Step S408. In Step S408, parameters relating to uplink power control can be configuration (uplink power control, TPC command, and the like). The parameter configuration can include parameter configuration for using one of first pathloss based on the received signal power measured and reported by the aforementioned first measurement target configuration and the first measurement report and second pathloss based on the received signal power measured and reported by the aforementioned second measurement target configuration and the second measurement report for pathloss used in configuring uplink transmission power. Detailed description of these parameters will be given later.

Next, description will be given of Step S409. In Step S409, uplink transmission power is calculated. Downlink pathloss between the base station 101 (or the RRH 103) and the terminal 102 is used for configuring the uplink transmission power, and the downlink pathloss is calculated from the received signal power of the cell-specific reference signal measured in Step S405, namely the measurement result of the first measurement target or the received signal power of the channel-state information reference signal, namely the measurement result of the second measurement target. In addition, since reference signal transmission power is also used for calculating pathloss, the aforementioned second measurement target configuration can include information relating to the reference signal transmitted power. Accordingly, the terminal 102 holds the first pathloss obtained based on the reference signal received power as the first measurement target configured in the first measurement target configuration and the second pathloss obtained based on the reference signal received power as the second measurement target configured in the second measurement target configuration. The terminal 102 calculates the uplink transmission power by using one of the first pathloss and the second pathloss in accordance with the parameter configuration relating to the uplink power control configured in Step S403. Next, description will be given of Step S411. In Step S411, uplink signal(s) are transmitted based on the transmission power value obtained in Step S409.

Figure 5:
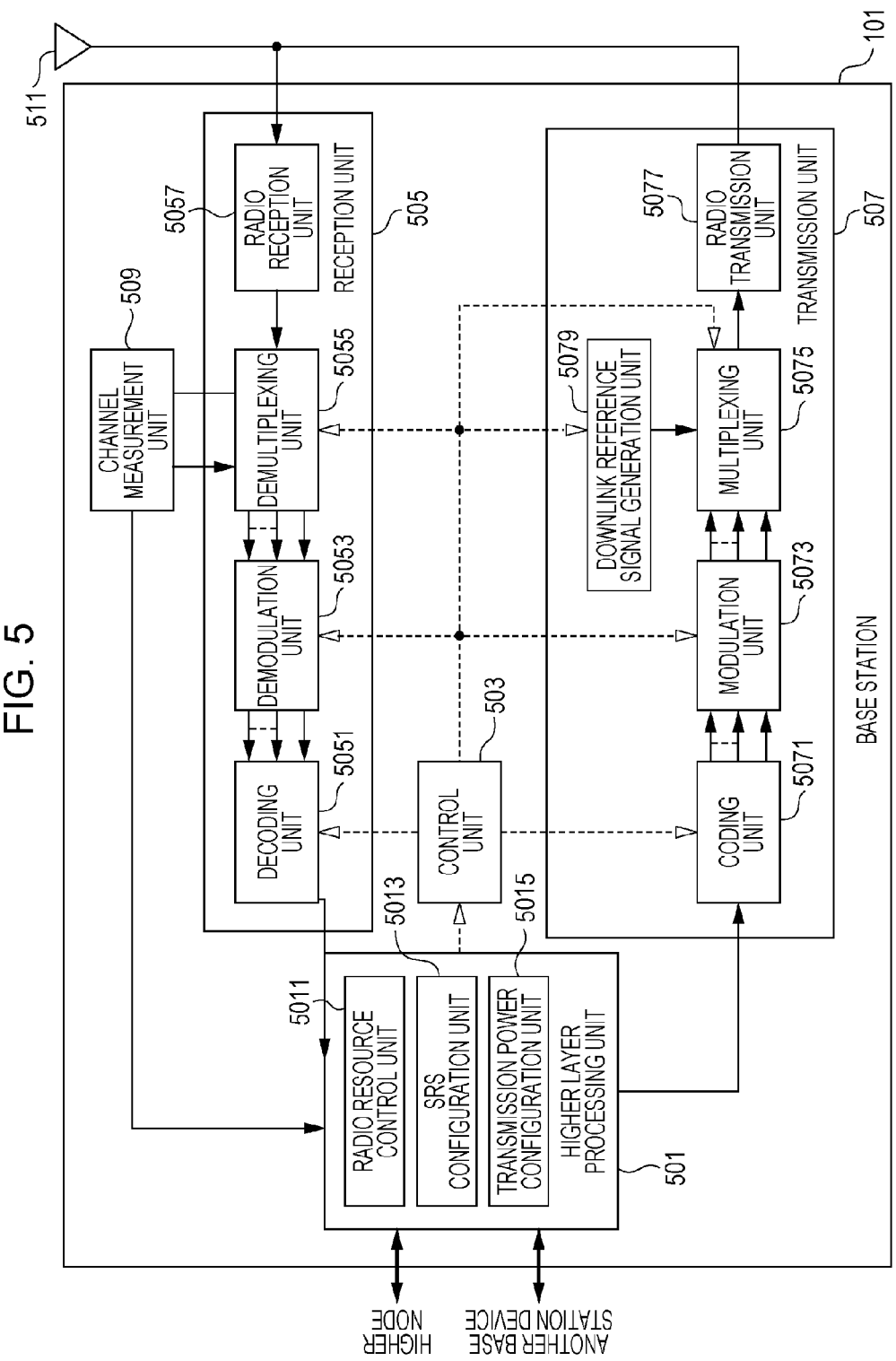
FIG. 5 is a block diagram schematically illustrating a configuration of the base station 101 according to the first embodiment of the present invention.

FIG. 5 is a block diagram schematically illustrating a configuration of the base station 101 according to the present invention. As shown in the drawing, the base station 101 includes a higher layer processing unit 501, a control unit 503, a reception unit 505, a transmission unit 507, a channel measurement unit 509, and a transmit/receive antenna 511. In addition, the higher layer processing unit 501 includes a radio resource control unit 5011, an SRS configuration unit 5013, and a transmission power configuration unit 5015. Moreover, the reception unit 505 includes a decoding unit 5051, a demodulation unit 5053, a demultiplexing unit 5055, and a radio reception unit 5057. Furthermore, the transmission unit 507 includes a coding unit 5071, a modulation unit 5073, a multiplexing unit 5075, a radio transmission unit 5077, and a downlink reference signal generation unit 5079.

The higher layer processing unit 501 processes a packet data convergence protocol (PDCP: Packet Data Convergence Protocol) layer, a radio link control (RLC: Radio Link Control) layer, and a radio resource control (RRC: Radio Resource Control) layer.

The radio resource control unit 5011 included in the higher layer processing unit 501 generates information arranged in each channel of the downlink or obtains the information from a higher node, and outputs the information to the transmission unit 507. In addition, the radio resource control unit 5011 assigns a radio resource, in which the terminal 102 arranges a physical uplink shared channel (PUSCH: Physical Uplink Shared Channel) as uplink data information, from among the uplink radio resources. In addition, the radio resource control unit 5011 determines a radio resource, in which a physical downlink shared channel (PDSCH: Physical Downlink Shared Channel) as the downlink data information is arranged, from among the downlink radio resources. The radio resource control unit 5011 generates downlink control information indicating assignment of the radio resources and transmits the downlink control information to the terminal 102 via the transmission unit 507. The radio resource control unit 5011 assigns a radio resource with satisfactory channel quality with priority based on an uplink channel measurement result input from the channel measurement unit 509 when the radio resource control unit 5011 assigns the radio resource in which PUSCH is arranged. Here, the downlink control information is formed in various formats in accordance with a purpose. In addition, the downlink control information formats used in PUSCH scheduling and transmission power control are referred to as uplink grants in some cases. Moreover, the downlink control information formats used in PUSCH scheduling and the transmission power control are referred to as downlink grants (downlink assignment) in some cases. In addition, these downlink control information formats are transmitted from the base station to the terminal in the physical downlink control channel. Moreover, there is also a downlink control information format capable of controlling a plurality of terminals based on PUSCH/PUSCH transmission power control commands.

The higher layer processing unit 501 generates control information for controlling the reception unit 505 and the transmission unit 507 based on uplink control information (UCI: Uplink Control Information) provided in the physical uplink control channel (PUCCH: Physical Uplink Control Channel) from the terminal 102, a buffer state provided by the terminal 102, and various kinds of configuration information for the terminal 102 configured by the radio resource control unit 5011, and outputs the control information to the control unit 503. In addition, the UCI includes at least one of Ack/Nack, a channel quality information (CQI: Channel Quality Indicator), and a scheduling request (SR: Scheduling Request).

The SRS configuration unit 5013 configures a sounding subframe which is a subframe in which the terminal 102 reserves a radio resource for transmitting a sounding reference signal (SRS: Sounding Reference Signal) and a bandwidth of the radio resource reserved for transmitting the SRS in the sounding subframe, generates information relating to the configuration as system information (SI: System Information), and broadcast-transmits the system information in the PDSCH via the transmission unit 507. In addition, the SRS configuration unit 5013 configures a subframe for periodically transmitting a periodic SRS (P-SRS: Periodic SRS) to each terminal 102, a frequency band, and a cyclic shift amount used in a CAZAC (Constant Amplitude Zero Auto-Correlation) sequence of the periodic SRS, generates a signal including the information relating to the configuration as a radio resource control (RRC: Radio Resource Control) signal, and provides the signal in the PDSCH to each terminal 102 via the transmission unit 507. In addition, the P-SRS is also referred to as a trigger type 0 SRS (Trigger type 0 SRS, Type 0 triggered SRS) in some cases.

In addition, the SRS configuration unit 5013 configures a frequency band at which an aperiodic SRS (A-SRS: Aperiodic SRS) is transmitted to each terminal 102 and a cyclic shift amount used in a CAZAC sequence of the aperiodic SRS, generates a signal including the information relating to the configuration, and provides the signal in the PDSCH to each terminal 102 via the transmission unit 507. Moreover, the SRS configuration unit generates an SRS request indicating that the SRS configuration unit requests the terminal 102 to transmit the aperiodic SRS and provides the SRS request in the PDCH to the terminal 102 via the transmission unit 507 when the SRS configuration unit requests the terminal 102 to transmit the aperiodic SRS. In addition, the SRS request is included in a downlink control information format (DCI format, Downlink Control Information Format), and the DCI format is provided in the PDSCH to the terminal 102. Moreover, the DCI format including the SRS request includes an uplink grant or downlink assignment. A plurality of DCI formats are prepared, and the SRS request is included in at least one of the plurality of DCI formats. For example, the SRS request may be included in a DCI format 0 which is an uplink grant. Alternatively, the SRS request may be included in a DCI format 1A which is downlink assignment. Alternatively, the SRS request may be included in a DCI format 4 which is an uplink grant for MIMO. Alternatively, the SRS request which is applied only to TDD may be included in a DCI format 2B/2C for DLMIMO. In addition, the SRS request may be controlled by one-bit information. That is, it is possible to control whether to transmit the aperiodic SRS (A-SRS) by one-bit information. When the base station 101 configures the SRS request to '0', for example, it is possible to control the terminal 102 not to transmit the A-SRS. When the base station 101 configures the SRS request to '1', it is possible to control the terminal 102 to transmit the A-SRS. Alternatively, the SRS request may be controlled by two-bit information. That is, it is also possible to associate various SRS parameters (or a parameter set) with an index represented by two-bit information in addition to the information indicating whether to transmit the A-SRS. Here, the various SRS parameters may include transmission band width (srs-BandwidthAp-r10). In addition, the various SRS parameters may include the number of antenna ports for the ASRS (srs-AntennaPortAp-r10). Moreover, the various SRS parameters may include the cyclic shift of the SRS (cyclicShifAp-r10). The various SRS parameters may include a transmission comb which is a frequency offset in a comb-like arrangement (transmissionCombAp-r10). The various SRS parameters may include a frequency position (freqDomainPositinoAp-r10). In addition, the various SRS parameters may include a hopping bandwidth (srs-HoppingBandwidthAp-r10). Moreover, the various SRS parameters may include a number of times of SRS transmission (durationAp-r10). Furthermore, these various SRS parameters may be configured so as to be included in an SRS parameter set. That is, an SRS parameter set may be configured of the various SRS parameters. If it is assumed that the information represented by two bits can be represented by indexes from 0 to 3, it is possible to control the terminal 102 not to transmit the A-SRS when the SRS request is configured to the index '0'. It is possible to control the terminal 102 to transmit an A-SRS generated by an 'SRS parameter set 1' when the SRS request is configured to the index '1'. It is possible to control the terminal 102 to transmit an A-SRS generated by an 'SRS parameter set 2' when the SRS request is configured to the index '2'. It is possible to control the terminal 102 to transmit an A-SRS generated by an 'SRS parameter set 3' when the SRS set is configured to the index '3'. The aforementioned respective SRS parameter sets are demultiplexing such that at least one SRS parameter value (or an index associated with the SRS parameter) among the various SRS parameters included therein is a different value. In addition, the A-SRS is also referred to as a trigger type 1 SRS (Trigger type 1 SRS, Type 1 triggered SRS) in some cases. The SRS request is also referred to as SRS request in some cases.

The transmission power configuration unit 5015 configures transmission power of the PUSCH, the PUSCH, the periodic SRS, and the aperiodic SRS. Specifically, the transmission power configuration unit 5015 configures transmission power of the terminal 102 such that the PUSCH and the like meet predetermined channel quality in consideration of interference with an adjacent base station in accordance with information indicating an amount of interference from the adjacent base station, information which is provided from the adjacent base station and indicates an amount of interference applied to the adjacent base station 101, quality of a channel input from the channel measurement unit 509, and the like, and transmits information indicating the configuration to the terminal 102 via the transmission unit 507.

Specifically, the transmission power configuration unit 5015 configures $P_{O\_PUSCH}$, α, a power offset for a periodic SRS $P_{SRS\_OFFSET}$ (0) (first SRS power offset parameter (pSRS-Offset)), and a power offset for a periodic SRS $P_{SRS\text{-}OFFSET}$(1) (second SRS power offset parameter (pSRS-offsetAp-r10)), generates a signal including information which indicates the configuration as a radio resource control signal in Equation (1) which will be described later, and provides the signal in the PDSCH to each terminal 102 via the transmission unit 507. In addition, the transmission power configuration unit 5015 configures a TPC command for calculating f in Equations (1) and (4), generates a signal indicating the TPC command, and provides the signal in the PDCCH to each terminal 102 via the transmission unit 507. In addition, a described herein is a coefficient which is used with a pathloss value for configuring transmission power in Equations (1) and (4) and represents a degree of pathloss compensation, in other words, α is a coefficient (an attenuation coefficient, pathloss compensation coefficient) which determines a degree of power to be increased or decreased in accordance with pathloss. Generally, α is a value from zero to one, power compensation in accordance with pathloss is not performed when α is zero, or transmission power of the terminal 102 is increased or decreased such that the pathloss does not affect the base station 101 when α is one. In consideration of a state of the terminal 102, the TPC command of the SRS is configured, and a signal indicating the TPC command is generated and provided in the PDCCH to each terminal 102 via the transmission unit 507. In addition, a DCI format including the TPC command is generated and provided in the PDCCH to each terminal 102 via the transmission unit 507.

The control unit 503 generates control signals for controlling the reception unit 505 and the transmission unit 507 based on control information from the higher layer processing unit 501. The control unit 503 outputs the generated control signals to the reception unit 505 and the transmission unit 507 and controls the reception unit 505 and the transmission unit 507.

The reception unit 505 separates, demodulates, and decodes the signal received from the terminal 102 via the transmit/receive antenna 511 in accordance with the control signal input from the control unit 503 and outputs the decoded information to the higher layer processing unit 501. The radio reception unit 5057 converts (down-converts) an uplink signal received via the transmit/receive antenna 511 into a signal at an intermediate frequency (IF: Intermediate Frequency), cancels unnecessary frequency components, controls an amplification level such that a signal level is appropriately maintained, orthogonally demodulates the signal based on an in-phase component and an orthogonal component of the received signal, and converts the orthogonally demodulated analog signal into a digital signal. The radio reception unit 5057 cancels a part corresponding to a guard interval (GI: Guard Interval) from the converted digital signal. The radio reception unit 5057 performs fast Fourier transform (FFT: Fast Fourier Transform) on the signal from which the guard interval has been canceled, extracts a signal in a frequency domain, and outputs the signal to the demultiplexing unit 5055.

The demultiplexing unit 5055 separates the signal input from the radio reception unit 5057 into PUCCH, PUSCH, UL DMRS, and SRS signals. In addition, the separation is performed based on radio resource assignment information which is determined in advance by the base station 101 and provided to each terminal 102. Moreover, the demultiplexing unit 5055 compensates for channels of the PUCCH and the PUSCH from a channel estimation value input from the channel measurement unit 509. In addition, the demultiplexing unit 5055 outputs the separated UL DMRS and the SRS to the channel measurement unit 509.

The demodulation unit 5053 performs inverse discrete Fourier Transform (IDFT: Inverse Discrete Fourier Transform) on the PUSCH, obtains modulation symbols, and demodulates a received signal for each of the modulation symbols of the PUCCH and the PUSCH by using a predetermined modulation scheme such as binary phase shift keying (BPSK: Binary Phase Shift Keying), quadrature phase shift keying (QPSK: Quadrature Phase Shift Keying), 16 quadrature amplitude modulation (16QAM: 16 Quadrature Amplitude Modulation), 64 quadrature amplitude modulation (64QAM: 64 Quadrature Amplitude Modulation), or the like or a modulation scheme, the information of which is provided as the downlink control information from the base station 101 to each terminal 102.

The decoding unit 5051 decodes coding bits of the demodulated PUCCH and the PUSCH by a predetermined coding rate of a predetermined coding scheme or by a coding rate, the information of which is provided as the uplink grant (UL grant) from the base station 101 to the terminal 102, and outputs decoded data information and uplink control information to the higher layer processing unit 501.

The channel measurement unit 509 measures channel estimation values, channel quality, and the like from uplink demodulation reference signals UL DMRS and the SRS input from the demultiplexing unit 5055, and outputs the channel estimated values, the channel quality, and the like to the demultiplexing unit 5055 and the higher layer processing unit 501.

The transmission unit 507 generates a downlink reference signal in accordance with the control signal input from the control unit 503, encodes and modulates the data information and the downlink control information input from the higher layer processing unit 501, multiplex the PDCCH, the PDSCH, and the downlink reference signal, and transmits the signal to the terminal 102 via the transmit/receive antenna 511.

The coding unit 5071 performs coding such as turbo coding, convolution coding, or block coding on the downlink control information and the data information input from the higher layer processing unit 501. The modulation unit 5073 modulates a coding bit by a modulation scheme such as QPSK, 16QAM, or 64QAM. The downlink reference signal generation unit 5079 generates, as a downlink reference signal, a sequence which is obtained by a predetermined rule based on a cell identifier (Cell ID) for identifying the base station 101 and is known to the terminal 102. The multiplexing unit 5075 multiplexes the respective modulated channels and the generated downlink reference signal.

The radio transmission unit 5077 performs inverse fast Fourier transform (IFFT: Inverse Fast Fourier Transform) on the multiplexed modulation symbol, performs modulation based on the OFDM scheme, adds a guard interval to the OFDM symbol after the OFDM modulation, generates a base band digital signal, converts the base band digital signal into an analog signal, generates an in-phase component and an orthogonal component at the intermediate frequency from the analog signal, cancels unnecessary frequency components for the intermediate frequency band, converts (up-converts) the intermediate frequency signal into a high frequency signal, cancels unnecessary frequency components therefrom, amplifies power, outputs the signal to the transmit/receive antenna 511 and transmits the signal. In addition, a case where the RRH 103 also has a configuration similar to that of the base station 101 will be considered although not shown in the drawing.

Figure 6:
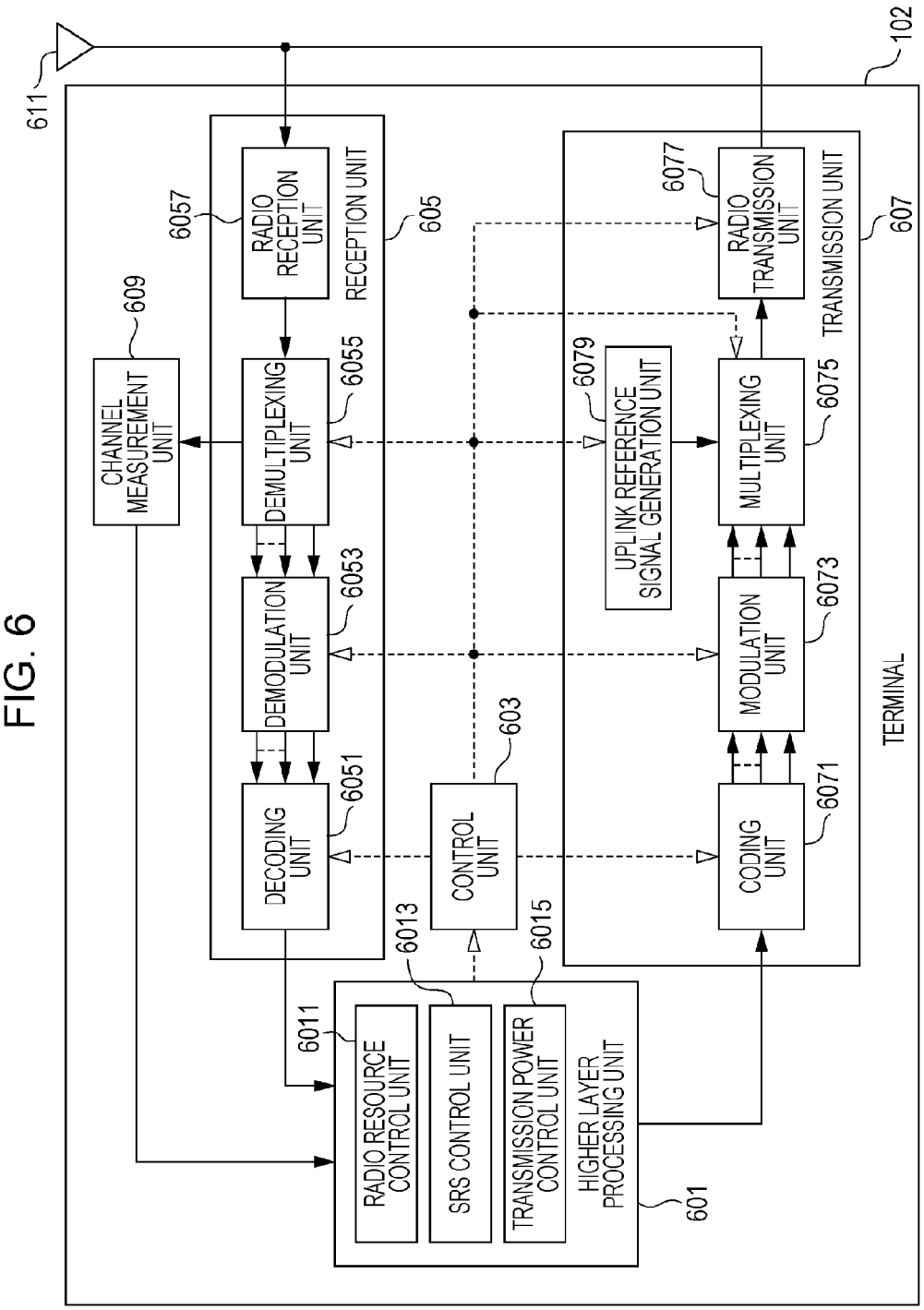
FIG. 6 is a block diagram schematically illustrating a configuration of the terminal 102 according to the first embodiment of the present invention.

FIG. 6 is a block diagram schematically illustrating a configuration of the terminal 102 according to this embodiment. As shown in the drawing, the terminal 102 includes a higher layer processing unit 601, a control unit 603, a reception unit 605, a transmission unit 607, a channel measurement unit 609, and a transmit/receive antenna 611. In addition, the higher layer processing unit 601 includes a radio resource control unit 6011, an SRS control unit 6013, and a transmission power control unit 6015. Moreover, the reception unit 605 includes a decoding unit 6051, a demodulation unit 6053, a demultiplexing unit 6055, and a radio reception unit 6057. Furthermore, the transmission unit 607 includes a coding unit 6071, a modulation unit 6073, a multiplexing unit 6075, and a radio transmission unit 6077.

The higher layer processing unit 601 outputs uplink data information generated by a user's operation or the like to the transmission unit. In addition, the higher layer processing unit 601 processes a packet data convergence layer, a radio link control layer, and a radio resource control layer.

The radio resource control unit 6011 included in the higher layer processing unit 601 manages various kinds of configuration information in the radio resource control unit 6011 itself. In addition, the radio resource control unit 6011 generates information arranged in each uplink channel and outputs the information to the transmission unit 607. The radio resource control unit 6011 generates control information for controlling the reception unit 605 and the transmission unit 607 based on downlink control information which is provided in the PDCCH from the base station 101 and the various kinds of configuration information of the radio resource control unit 6011 itself which is configured by the radio resource control information provided in the PDSCH and managed by the radio resource control unit 6011, and outputs the control information to the control unit 603.

The SRS control unit 6013 included in the higher layer processing unit 601 obtains, from the reception unit 605, a sounding subframe (SRS subframe, SRS transmission subframe) which is a subframe where a radio resource for transmitting an SRS broadcasted by the base station 101 is reserved, information indicating a bandwidth of the radio resource reserved for transmitting the SRS in the sounding subframe, information indicating a subframe for transmitting a periodic SRS provided by the base station 101 to the base station 101 itself, a frequency band, and a cyclic shift amount used in the CAZAC sequence of the periodic SRS, and information indicating a frequency band at which the base station 101 transmits an aperiodic SRS provided to the base station 101 itself and a cyclic shift amount used in the CAZAC sequence of the aperiodic SRS.

The SRS control unit 6013 controls SRS transmission in accordance with the aforementioned information. Specifically, the SRS control unit 6013 controls the transmission unit 607 to transmit the periodic SRS once or periodically in accordance with the information relating to the periodic SRS. In addition, when transmission of the aperiodic SRS is requested by an SRS request (SRS indicator) input from the reception unit 605, the SRS control unit 6013 transmits the aperiodic SRS a predetermined number of times (once, for example) in accordance with the information relating to the aperiodic SRS.

The transmission power control unit 6015 included in the higher layer processing unit 601 outputs control information to the control unit 603 to cause the control unit 603 to control transmission power based on information indicating configuration of transmission power of the PUCCH, the PUSCH, the periodic SRS, and the aperiodic SRS. Specifically, the transmission power control unit 6015 controls the transmission power of the periodic SRS and the transmission power of the aperiodic SRS from Equation (4) based on $P_{0\text{-}PUSCH}$, $\alpha$, a power offset for the periodic SRS $P_{SRS\_OFFSET}(0)$ (first SRS power offset parameter (pSRS-Offset)), a power offset for the aperiodic SRS $P_{SRS\_OFFSET}(1)$ (second SRS power offset parameter (pSRS-OffsetApr10)), and a TPC command received from the reception unit 605. In addition, the transmission power control unit 6015 switches the parameter for $P_{SRS\text{-}OFFSET}$ in accordance with which of the periodic SRS and the aperiodic SRS the corresponding SRS is.

The control unit 603 generates control signals for controlling the reception unit 605 and the transmission unit 607 based on the control information from the higher layer processing unit 601. The control unit 603 outputs the generated control signals to the reception unit 605 and the transmission unit 607 and controls the reception unit 605 and the transmission unit 607.

The reception unit 605 separates, demodulates, and decodes a received signal received from the base station 101 via the transmit/receive antenna 611 in accordance with the control signal input from the control unit 603, and outputs the decoded information to the higher layer processing unit 601.

The radio reception unit 6057 converts (down-converts) a downlink signal received via each receive antenna into a signal at the intermediate frequency, cancels unnecessary frequency components, controls an amplification level such that a signal level is appropriately maintained, orthogonally demodulates the signal based on an in-phase component and an orthogonal component of the received signal, and converts the orthogonally demodulated analog signal into a digital signal. The radio reception unit 6057 cancels a part corresponding to a guard interval from the converted digital signal, performs fast Fourier transform on the signal from which the guard interval has been canceled, and extracts a signal in a frequency domain.

The demultiplexing unit 6055 respectively separates the extracted signal into a physical downlink control channel (PDCCH: Physical Downlink Control Channel), a PDSCH, and a downlink reference signal (DRS: Downlink Reference Signal). In addition, the separation is performed based on radio resource assignment information and the like which is provided as the downlink control information. Moreover, the demultiplexing unit 6055 compensates for channels of the PDCCH and the PDSCH from a channel estimation value input from the channel measurement unit 609. In addition, the demultiplexing unit 6055 outputs the separated downlink reference signal to the channel measurement unit 609.

The demodulation unit 6053 performs demodulation based on the QPSK modulation scheme on the PDCCH and outputs the demodulated PDCCH to the decoding unit 6051. The decoding unit 6051 attempts to decode the PDCCH, and if the decoding unit 6051 successfully decodes the PDCCH, then the decoding unit 6051 outputs the decoded downlink control information to the higher layer processing unit 601. The demodulation unit 6053 performs demodulation based on a modulation scheme, the information of which is provided in the downlink control information, such as QPSK, 16QAM, or 64 QAM, on the PDSCH and outputs the demodulated PDSCH to the decoding unit 6051. The decoding unit 6051 performs decoding at the coding rate, the information of which is provided in the downlink control information, and outputs the decoded data information to the higher layer processing unit 601.

The channel measurement unit 609 measures downlink pathloss from the downlink reference signal input from the demultiplexing unit 6055 and outputs the measured pathloss to the higher layer processing unit 601. In addition, the channel measurement unit 609 calculates a downlink channel estimation path from the downlink reference signal and outputs the downlink channel estimation value to the demultiplexing unit 6055.

The transmission unit 607 generates a UL DMRS and/or an SRS in accordance with a control signal input from the control unit 603, encodes and modulates data information input from the higher layer processing unit 601, multiplexes the PUCCH, the PUSCH, and the generated UL DMRS and/or the SRS, adjusts transmission power of the PUSCH, the PUSCH, the UL DMRS, and the SRS, and transmits the data information to the base station 101 via the transmit/receive antenna 611.

The coding unit 6071 performs coding such as turbo coding, convolution coding, or block coding on the uplink control information and the data information input from the higher layer processing unit 601. The modulation unit 6073 modulates a coding bit input from the coding unit 6071 based on a modulation scheme such as BPSK, QPSK, 16QAM, or 64QAM.

The uplink reference signal generation unit 6079 generates a CAZAC sequence which is obtained by a predetermined rule based on a cell identifier for identifying the base station 101, a bandwidth where the UL DMR and the SRS are arranged, and the like and is known to the base station

101. In addition, the uplink reference signal generation unit 6079 applies cyclic shift to the generated CAZAC sequences of the UL DMRS and the SRS in accordance with the control signal input from the control unit 603.

The multiplexing unit 6075 rearranges modulation symbols of the PUSCH in accordance with the control signal input from the control unit 603, performs discrete Fourier transform (DFT: Discrete Fourier Transform) thereon, and multiplexes the PUCCH signal and the PUSCH signal with the generated UL DMR and the SRS.

The radio transmission unit 6077 performs inverse fast Fourier transform on the multiplexed signal, performs modulation based on the SCHDMA scheme, adds a guard interval to the SC-FDMA-modulated SC-FDMA symbol, generates a base band digital signal, converts the base band digital signal into an analog signal, generates an in-phase component and an orthogonal component at the intermediate frequency from the analog signal, cancels unnecessary frequency components for the intermediate frequency band, converts (up-converts) the intermediate frequency signal into a high frequency signal, cancels unnecessary frequency components, amplifies power, and outputs the signal to the transmit/receive antenna 611, and outputs the signal.

Figure 7:
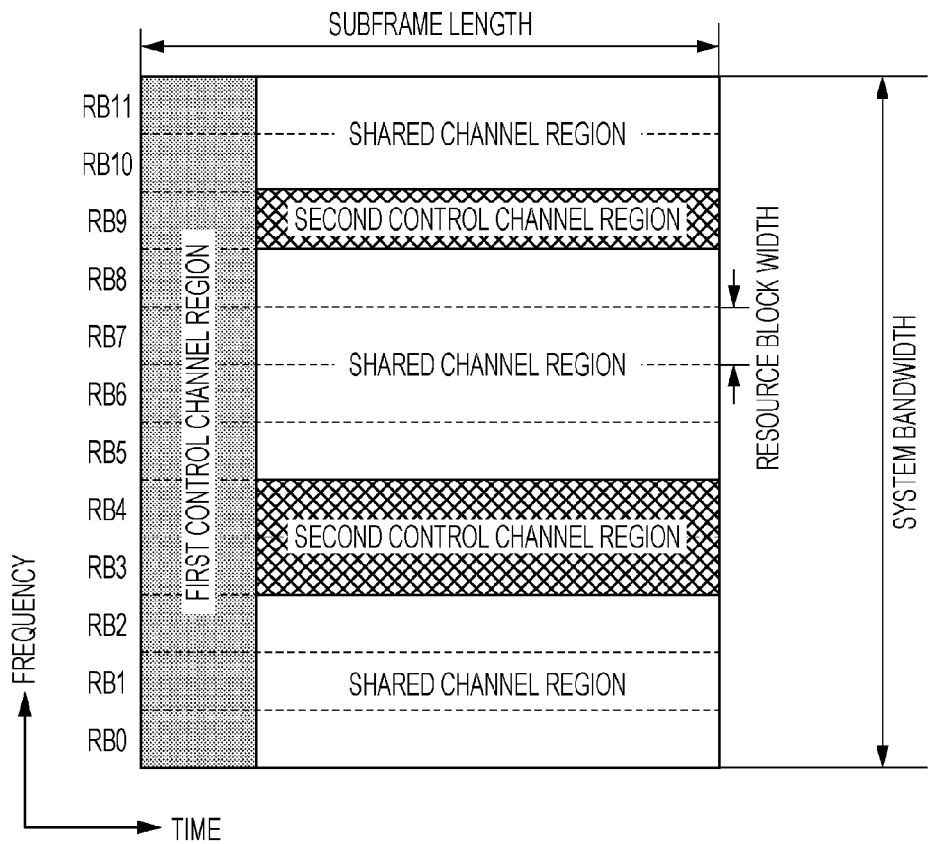
FIG. 7 is a diagram illustrating an example of a channel which is mapped by the base station 101.

FIG. 7 is a diagram illustrating an example of a channel mapped by the base station 101. FIG. 7 shows a case where a frequency band configured by 12 resource block pairs corresponds to a system bandwidth. The PDCCH as a first control channel is arranged in the top first to third OFDM symbols in the subframe. A frequency direction of the first control channel is arranged over the system bandwidth. In addition, the shared channel is arranged in the OFDM symbols with the exception of the first control channel in the subframe.

Here, detailed description will be given of a configuration of the PDCCH. The PDCCH is configured of a plurality of control channel elements (CCE: Control Channel Elements). The number of CCEs used in each downlink component carrier depends on a downlink component carrier bandwidth, the number of OFDM symbols configuring the PDCCH, and the number of transmission ports of the downlink reference signals corresponding to the number of transmit antennas in the base station 101 used for communication. A CCE is configured of a plurality of downlink resource elements (each resource is defined by a single OFDM symbol and a single subcarrier).

Numbers (indexes) to identify CCEs are applied to the CCEs used between the base station 101 and the terminal 102. Numbering of the CCEs is performed based on a predetermined rule. Here, CCE_t represents a CCE with a CCE number t. The PDCCH is configured of a group of a plurality of CCEs (CCE Aggregation). The number of CCEs configuring the group is referred to as a "CCE group level" (CCE aggregation level). The CCE group level configuring the PDCCH is configured by the base station 101 in accordance with the coding rate configured for the PDCCH and the bit number of the DCI included in the PDCCH. In addition, a combination of CCE group levels which may be used for the terminal 102 is determined in advance. Moreover, a group of n CCEs is referred to as a "CCE group level n".

A single resource element group (REG: Resource Element Group) is configured of four contiguous downlink resource elements in a frequency domain. Furthermore, a single CCE is configured of nine different resource element groups which are distributed in frequency domains and time domains. Specifically, interleaving is performed on the entire downlink component carrier in units of resource element groups by using a block interleaver for all the numbered resource element groups, and a single CCE is configured by nine resource element groups with consecutive numbers after the interleaving.

In each terminal 102, a region for searching the PDCCH (SS: Search Space) is configured. An SS is configured of a plurality of CCEs. The SS is configured of a plurality of CCEs with consecutive numbers from the smallest CCE number, and the number of the plurality of CCEs with the consecutive numbers is determined in advance. The SS in each CCE group level is configured of a group of a plurality of PDCCH candidates. The SSs are classified into a cell-specific search space (CSS: Cell-specific SS) in which the numbers from the smallest CCE number are the same and a terminal-specific search space (USS: UE-specific SS) in which the numbers from the smallest CCE number are specific to the terminal. In the CSS, it is possible to arrange the PDCCH to which control information to be read by the plurality of terminals 102 such as system information or information relating to paging is assigned and the PDCCH to which downlink/uplink grants indicating indications for a fallback to a lower transmission scheme and for random access are assigned.

The base station 101 transmits the PDCCH by using one or more CCEs in the SS configured by the terminal 102. The terminal 102 decodes a received signal by using one or more CCEs in the SS and performs processing for detecting the PDCCH directed to the terminal 102 (itself) (referred to as blind decoding). The terminal 102 configures a different SS for each CCE group level. Thereafter, the terminal 102 performs the blind decoding by using a predetermined combination of CCEs in a different SS for each CCE group level. In other words, the terminal 102 performs the blind decoding on each PDCCH candidate in a different SS for each CCE group level. The series of processes by the terminal 102 is referred to as PDCCH monitoring.

The second control channel (X-PDCCH, PDCCH on PDSCH, Extended PDCCH, Enhanced PDCCH, E-PDCCH) is arranged in the OFDM symbols other than the first control channel. The second control channel and the shared channel are arranged in different resource blocks. In addition, the resource blocks where the second control channel and the shared channel can be arranged are configured for each terminal 102. Moreover, a shared channel (data channel) directed to the terminal itself or to another terminal can be configured in the resource block in which the second control channel region can be arranged. For an OFDM symbol start position where the second control channel is arranged, it is possible to use the same method as that for the shared channel. That is, this can be realized by the base station 101 configuring a part of resources of the first control channel as a physical control format indicator channel (PCFICH: Physical Control Format Indicator Channel) and mapping information indicating the number of OFDM symbols of the first control channel.

In addition, the OFDM symbol start position where the second control channel is arranged can be defined in advance, and for example, the fourth OFDM symbol from the top in the subframe can be set as the OFDM symbol start position. At this time, if the number of OFDM symbols of the first control channel is two or less, a signal is not mapped and null is configured for the second and third OFDM symbols in the resource block pair where the second control channel is arranged. In addition, another control signal and a data signal can be further mapped in the resource for which null is configured. Moreover, the start position of the OFDM symbols which configures the second control channel can be configured in accordance with the higher layer control information. Furthermore, the subframe shown in FIG. 7 is time-division-multiplexed (TDM: Time Division Multiplexing), and the second control channel can be configured for each subframe.

As an SS for searching the X-PDCCH, it is possible to configure an SS by a plurality of CCEs in the same manner as the PDCCH. That is, a resource element group is configured of a plurality of resource elements in a region configured as a region of the second control channel shown in FIG. 7, and the CCE is further configured of the plurality of resource elements. With such a configuration, it is possible to configure the SS for searching (monitoring) the X-PDCCH in the same manner as the aforementioned PDCCH.

Alternatively, as the SS for searching the X-PDCCH, it is possible to configure an SS from one or more resource blocks unlike the PDCCH. That is, the SS for searching the X-PDCCCH is configured of a group (RB Aggregation) including one or more resource blocks in units of resource blocks in the region configured as the region of the second control channel shown in FIG. 7. The number of RBs configuring the group is referred to as an "RB group level" (RB aggregation level). The SS is configured of the plurality of RBs with consecutive numbers form the smallest RB number, and the number of one or more RBs with the consecutive numbers is determined in advance. The SS in each RB group level is configured of a group of a plurality of X-PDCCH candidates.

The base station 101 transmits the X-PDCCH by using one or more RBs in the SS configured by the terminal 102. The terminal 102 decodes the received signal by using the one or more RBs in the SS and performs processing for detecting the X-PCCH directed to the terminal 102 (itself) (blind decoding). The terminal 102 configures a different SS for each RB group level. Thereafter, the terminal 102 performs the blind decoding by using a predetermined combination of RBs in a different SS for each RB group level. In other words, the terminal 102 performs the blind decoding on the respective X-PDCCH candidates in a different SS for each RB group level (monitors the X-PDCCH). The terminal 102 can specify a downlink control information (DCI: Downlink Control Information) format included in the PDCCH when performing the blind decoding. Since the number of bits in the configuration differs depending on the type of the DCI format, to the terminal 102 can determine which of the DCI formats the DCI format included in the PDCCH is, based on the number of bits configuring the DCI format.

When the base station 101 provides the control signal to the terminal 102 through the second control channel, the base station 101 configures second control channel monitoring for the terminal 102 and maps the control signal with respect to the terminal 102 in the second control channel. In addition, when the base station 101 provides the control signal to the terminal 102 through the first control channel, the base station 101 maps the control signal with respect to the terminal 102 in the first control channel without configuring the second control channel monitoring for the terminal 102.

In contrast, when the base station 101 configures the second control channel monitoring, the terminal 102 performs the blind coding on the control signal directed to the terminal 102 for the second control channel. In addition, when the base station 101 does not configure the second control channel monitoring, the terminal 102 does not perform the blind coding on the control signal directed to the terminal 102 for the second control channel.

Hereinafter, description will be given of the control signal to be mapped in the second control channel. The control signal to be mapped in the second control channel is processed for each control information for a single terminal 102, and scramble processing, modulation processing, layer mapping processing, precoding processing, and the like are performed thereon in the same manner as the data signal. In addition, the control signal to be mapped in the second control channel is subjected to precoding processing which is unique to the terminal 102 along with the terminal-specific reference signal. At this time, the precoding processing is preferably performed by a precoding weight suitable for the terminal 102. For example, precoding processing common to the signal in the second control channel and the terminal-specific reference signal in the same resource block is performed.

In addition, the control signal mapped in the second control channel can be mapped so as to include different control information in a former slot (first slot) and a latter slot (second slot) in the subframe. For example, a control signal including assignment information (downlink assignment information) in a downlink shared channel of a data signal to be transmitted from the base station 101 to the terminal 102 is mapped in the former slot in the subframe. In addition, a control signal including assignment information (uplink assignment information) in an uplink shared channel of a data signal to be transmitted from the terminal 102 to the base station 101 is mapped in the latter slot in the subframe. Alternatively, the control signal including the uplink assignment information from the base station 101 to the terminal 102 may be mapped in the former slot in the subframe, and the control signal including the downlink assignment information from the terminal 102 to the base station 101 may be mapped in the latter slot in the subframe.

In addition, a data signal to the terminal 102 or another terminal 102 may be mapped in the former and/or latter slot in the second control channel. Moreover, a control signal to the terminal 102 or the terminal (including the terminal 102) for which the second control channel has been configured may be mapped in the former and/or latter slot in the second control channel.

In addition, the control signal to be mapped in the second control channel is multiplexed with the terminal-specific reference signal by the base station 101. The terminal 102 performs demodulation processing on the control signal to be mapped in the second control channel with the terminal-specific reference signal to be multiplexed. In addition, terminal specific-reference signals of a part or an entirety of the antenna ports 7 to 14 are used. At this time, the control signal to be mapped in the second control channel can be MIMO-transmitted by using the plurality of antenna ports.

For example, the terminal-specific reference signal in the second control channel is transmitted by using an antenna port and a scramble code defined in advance. Specifically, the terminal-specific reference signal in the second control channel is generated by using the antenna port 7 and a scramble ID defined in advance.

For example, the terminal-specific reference signal in the second control channel is generated by using an antenna port and a scramble ID, the information of which is provided through RRC signaling or PDCCH signaling. Specifically, information indicating one of the antenna port 7 and the antenna port 8 as an antenna port to be used for the terminal-specific reference signal in the second control channel is provided through the RRC signaling or the PDCCH signaling. As the scramble ID to be used for the terminal-specific reference signal in the second control channel, information indicating a value from 0 to 3 is provided through the RRC signaling or the PDCCH signaling.

According to the first embodiment, the base station 101 performs second measurement target configuration for each terminal 102. In addition, the terminal 102 holds first measurement target configuration and reports cell-specific reference signal received power as a measurement target designated by the first measurement target configuration and channel-state information reference signal received power as a measurement target designated by the second measurement target configuration to the base station 101.

It is possible to obtain the following effects by employing the aforementioned embodiment of the present application. It is assumed that only the cell-specific reference signal shown in FIG. 2 is transmitted only from the base station 101 by using the downlink 105, a measurement target configured by the second measurement target configuration and the second report configuration in Step S403 in FIG. 4 is the channel-state information reference signal shown in FIG. 3, and the reference signal as the measurement target is transmitted only from the RRH 103 by using the downlink 107. In such a case, it is possible to calculate pathloss 1 which is downlink pathloss between the base station 101 and the terminal 102 and pathloss 2 which is downlink pathloss between the RRH 103 and the terminal 102 by measuring the received signal power of the cell-specific reference signal as a measurement target designated in the predetermined first measurement target configuration in Step S405 in FIG. 4 and the channel-state information reference signal transmitted only from the RRH 103 as a measurement target designated in the second measurement configuration which can be configured by the base station 101. That is, it is also possible to configure uplink transmission power toward one of the base station 101 and the RRH 103 (one of the base station 101 and the RRH 103 with smaller pathloss, namely one of the base station 101 and the RRH 103 located at a closer position, for example) during uplink cooperative communication while it is possible to configure two kinds of uplink transmission power. Since the base station 101 reports the received signal power of the aforementioned cell-specific reference signal as the first measurement target and of the channel-state information reference signal transmitted only from the RRH 103 as a second measurement target according to the embodiment of the present application, the base station 101 can make a decision about (determine) whether the uplink signal from the terminal 102 is to be received by the base station 101 by using the uplink 106 or whether the uplink signal from the terminal 102 is to be received by the RRH 103 by using the uplink 108. The base station 101 can configure the parameters relating to the uplink power control in Step S408 in FIG. 4 based on the determination result and configure which of the aforementioned pathloss 1 and the pathloss 2 is to be used.

In another example, it is assumed that the cell-specific reference signals shown in FIG. 2 are transmitted from the base station 101 and the RRH 103 by using the downlink 105 and the downlink 106, and two measurement targets are configured in the second measurement target configuration and the second report configuration in Step S403 in FIG. 4, both the configured measurement targets are the channel-state information reference signals shown in FIG. 3, one of the reference signals as the measurement targets is transmitted only from the base station 101 by using the downlink 105, and the other reference signal is transmitted only from the RRH 103 by using the downlink 107. In such a case, it is possible to calculate pathloss 1 as a synthesized value of the downlink pathloss between the base station 101 and the terminal 102 and the downlink pathloss between the RRH 103 and the terminal 102 and pathloss 2 including a downlink pathloss value between the base station 101 and the terminal 102 and a downlink pathloss value between the RRH 103 and the terminal 102, by measuring received signal power of the cell-specific reference signal as a first measurement target designated in the predetermined first measurement target configuration in Step S405 in FIG. 4 and of the channel-state information reference signal transmitted only from the base station 101 which is one of the second measurement targets as measurement targets designated in the second measurement target configuration that can be configured by the base station 101 and received signal power of the channel-state information reference signal transmitted only from the RRH 103 as one of the second measurement targets. That is, the terminal 102 can configure uplink transmission power toward one of the base station 101 and the RRH 103 (one of the base station 101 and the RRH 103 with smaller pathloss, namely one of the base station 101 and the RRH 103 located at a closer position, for example) during the uplink cooperative communication while the terminal 102 can configure two kinds of uplink transmission power. Since the received signal power of the aforementioned cell-specific reference signal as the first measurement target and of the channel-state information reference signal transmitted only from the base station 101 as a second measurement target and the received signal power of the channel-state information reference signal transmitted only from the RRH 103 as another second measurement target are reported to the base station 101 according to the embodiment of the present application, the base station 101 can make a decision about whether the uplink signal from the terminal 102 is to be received by the base station 101 by using the uplink 106 or whether the uplink signal from the terminal 102 is to be received by the RRH 103 by using the uplink 108. The base station 101 configures the parameters relating to the uplink power control in Step S408 in FIG. 4 based on the result and can configure which one of the aforementioned three kinds of pathloss, namely the pathloss 1 and the two kinds of pathloss 2 is to be used. According to the embodiment of the present application, the terminal 102 can control the transmission power suitable for the uplink cooperative communication by calculating the uplink transmission power by using the pathloss 1 which is a synthesized value of the downlink pathloss between the base station 101 and the terminal 102 and the downlink pathloss between the RRH 103 and the terminal 102. In addition, the terminal 102 can control the transmission power suitable for the communication between the base station 101 and the terminal 102 by calculating the uplink transmission power by using the pathloss 2 based on the second measurement target between the base station 101 and the terminal 102. Moreover, the terminal 102 can control the transmission power suitable for the communication between the RRH 103 and the terminal 102 by calculating the uplink transmission power by using the pathloss 2 based on the second measurement target between the RRH 103 and the terminal 102. As described above, it is possible to appropriately control the uplink power regardless of the configuration of the reference signals from the base station 101 and the RRH 103 (a case where the cell-specific reference signal is transmitted only from the base station 101 or a case where the cell-specific reference signals are transmitted from both the base station 101 and the RRH 103, for example) by using both the predetermined first measurement configuration and the second measurement target configuration which can be configured by the base station 101. In addition, reporting the received signal power of the cell-specific reference signal designated in the first measurement target configuration and the received signal power of the channel-state information reference signals designated in the second measurement target configuration helps the base station 101 recognize a positional relationship (namely expected received power and pathloss) of the base station 101, the RRH 103, and the terminal 102, and it is possible to achieve an advantage even during the downlink cooperative communication according to this embodiment. If the signal received by the terminal 102 is appropriately selected and transmitted from one of the base station 101 and the RRH 103 or from both the base station 101 and the RRH 103 when the downlink 105 and the downlink 106 are used, for example, it is possible to expect an improvement in throughput of the entire system by suppressing unnecessary signal transmission.

Second Embodiment

Hereinafter, description will be given of a second embodiment of the present invention. According to this embodiment, detailed description will be given of the parameter configuration for a channel-state information reference signal, the second measurement target configuration in Step S403 in FIG. 4, the second report configuration, the third measurement target configuration, the third report configuration, and parameters relating to the first measurement report and the second measurement report in Step S407 in FIG. 4. Here, first reference signal configuration for calculating a CSI feedback, second reference signal configuration for designating a resource element to be excluded from data modulation during the data demodulation, and third reference signal configuration for configuring a measurement target for calculating received signal power will also be described later.

Figure 8:
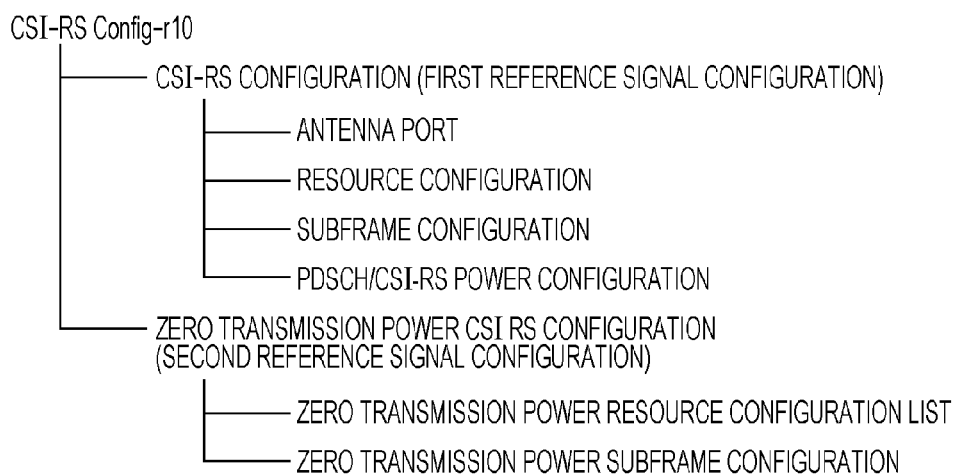
FIG. 8 is a diagram illustrating a detail of channel-state information reference signal configuration.

FIG. 8 shows a detail of parameters relating to the first reference signal configuration and the second reference signal configuration as a detail of the channel-state information reference signal. CSI-RS-Config-r10 can include CSI-RS configuration, namely the first reference signal configuration (csi-RS-r10) and zero transmission power CSI-RS configuration, namely the second reference signal configuration (zeroTxPowerCSI-RS-r10). CSI-RS configuration can include antenna ports (antennaPortsCount-r10), resource configuration (resourceConfig-r10), subframe configuration (subframeConfig-r10), and PDSCH/CSI-RS power configuration (p-C-r10).

In relation to the antenna ports (antennaPortsCount-r10), the number of antenna ports secured by the CSI-RS configuration is configured. In one example, one of one, two, four, and eight is selected as the number of antenna ports (antennaPortsCount-r10). Then, in the resource configuration (resourceConfig-r10), the position of the top resource element (the minimum block sectioned in accordance with the frequency (subcarrier) and the time (OFDM symbol) shown in FIGS. 2 and 3) of the antenna port 15 (CSI port 1) is indicated by an index. With such a configuration, a resource element of the channel-state information reference signal assigned to each antenna port is uniquely determined. Detailed description will be given later.

In the subframe configuration (subframeConfig-r10), a position and a frequency of a subframe including the channel-state information reference signal are indicated by indexes. If the index of the subframe configuration (subframeConfig-r10) is five, for example, the channel-state information reference signal is included in every ten subframes, and the channel-state information reference signal is included in the subframe 0 in a radio frame in units of ten subframes. In another example, if the index of the subframe configuration (subframeConfig-r10) is one, for example, the channel-state information reference signal is included in every five subframes, and the channel-state information reference signal is included in each of the subframes 1 and 6 in the radio frame in units of ten subframes. As described above, the frequency and the position of the subframe including the channel-state information reference signal is uniquely designated by the subframe configuration.

The PDSCH/CSI-RS power configuration (p-C-r10) is configuration of a power ratio (Energy Per Resource Element ratio (EPRE ratio)) between the PDSCH and the channel-state information reference signal (CSI-RS) and may be configured within a range from −8 dB to 15 dB. Although not shown in the drawing, the base station 101 separately provides information about cell-specific reference signal transmission power (referenceSignalPower) $P_A$ and $P_B$ to the terminal 102 through the RRC signal. Here, $P_A$ is an index representing a transmission power ratio between the PDSCH and the cell-specific reference signal in a subframe where no cell-specific reference signal is present, and $P_B$ is an index representing a transmission power ratio between the PDSCH and the cell-specific reference signal in a subframe where the cell-specific reference signal is present. Accordingly, the terminal 102 can calculate the transmission power of the channel-state information reference signal by combining the PDSCH/CSI-RS power configuration (p-C-r10), the cell-specific reference signal transmission power (referenceSignalPower), and $P_A$.

An example of the resource configuration (resourceConfig-r10) will be shown. In the resource configuration (resourceConfig-r10), a position of a resource assigned to CSI-RS for each antenna port is indicated by an index. If an index 0 is designated as the index of the resource configuration (resourceConfig-r10), for example, a subcarrier number 9 and a subframe number 5 are designated for the top resource element of the antenna port 15 (CSI port 1). Since C1 is assigned to the antenna port 15 as shown in FIG. 3, the resource element with the subcarrier number 9 and the subframe number 6 is configured as a channel-state information reference signal of the antenna port 15 (CSI port 1). The resource element of each antenna port is also secured based on the configuration, and for example, the same resource element with the subcarrier number 9 and the subframe number 5 and a resource element with the subcarrier number 9 and a subframe number 6 are assigned to 16 (CSI port 2). Similarly, a resource element with a subcarrier number 3 and a subframe number 5 and a resource element with a subcarrier number 3 and a subframe number 6 are assigned to the antenna ports 17 and 18 (CSI ports 3 and 4). Similarly, a resource element with a subcarrier number 8 and a subframe number 5 and a resource element with a subcarrier number 8 and a subframe number 6 are assigned to the antenna ports 19 and 20 (CSI ports 5 and 6). Similarly, a resource element with a subcarrier number 2 and a subframe number 5 and a resource element with a subcarrier number 2 and a subframe number 6 are assigned to the antenna ports 21 and 22 (CSI ports 7 and 8). If other indexes are designated in the resource configuration (resourceConfig-r10), the top resource element of the antenna port 15 (CSI port 1) becomes different, and in accordance with this, the resource elements assigned to the respective antenna ports become different.

In addition, the zero transmission power CSI-RS configuration (second reference signal configuration) can include a zero transmission power resource configuration list (zeroTxPowerResourceConfigList-r10) and zero transmission power subframe (zeroTxPowerSubframeConfig-r10). In the zero transmission power resource configuration list, one or more indexes included in the aforementioned resource configuration (resourceConfig-r10) are designated by bit mapping. In the zero transmission power subframe configuration, the position and the frequency of the subframe including the channel-state information reference signal are indicated by the indexes as described above. Accordingly, the terminal 102 designates the resource element to be excluded from the demodulation processing during the demodulation of the PDSCH (downlink shared channel, physical downlink shared channel, downlink data channel, downlink data signal, physical downlink shared channel) as a channel-state information reference signal by appropriately providing the zero transmission power resource configuration list and the zero transmission power subframe configuration. In one example, the indexes designated by the zero transmission power resource configuration list correspond to resource configuration (resourceConfig-r10) in a case where the number of antenna ports (antennaPortsCount-r10) is four. In other words, since information about the resource configuration (resourceConfig-r10) is provided by sixteen indexes in a case where the number of antenna ports is four, information about the aforementioned resource of the channel-state information reference signal indicated by the sixteen indexes is provided by bit mapping of sixteen bits. If information indicating the indexes 0 and 2 is provided by the bit mapping, the resource elements corresponding to the indexes 0 and 2 are excluded from the demodulation processing during the demodulation.

Figure 9:
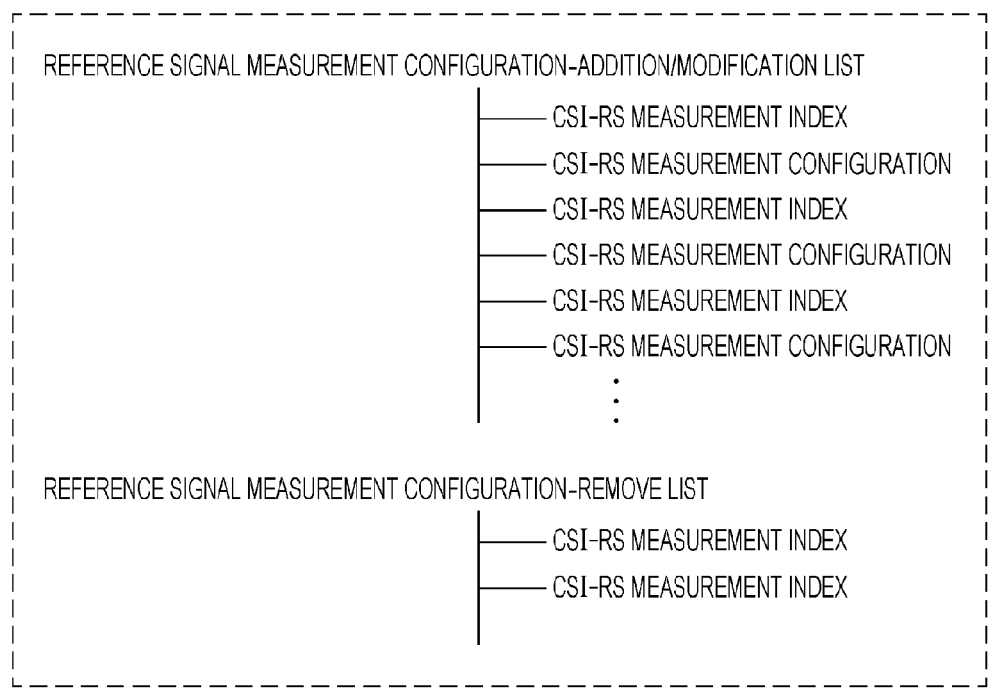
FIG. 9 is a diagram illustrating an example of a detail of parameters relating to second measurement target configuration in Step S403 in FIG. 4.

Next, detailed description will be given of parameters relating to the second measurement target configuration in Step S403 in FIG. 4 with reference to FIG. 9. The reference signal measurement configuration in FIG. 9, namely the third reference signal configuration or the second measurement target configuration can include a reference signal measurement configuration-addition/modification list and a reference signal measurement configuration-remove list. The reference signal measurement configuration-addition/modification list can include a CSI-RS measurement index and CSI-RS measurement configuration. The reference signal measurement configuration-remove list can include the CSI-RS measurement index. Here, the CSI-RS measurement index and the CSI-RS measurement configuration are configured in a combination, and one or more pairs are configured in the reference signal measurement configuration-addition/modification list, and the CSI-RS measurement configuration configured here is a measurement target. Here, the CSI-RS measurement index is an index associated with the CSI-RS measurement configuration, which is an index for distinguishing a plurality of measurement targets configured in the third reference signal configuration. Remove from the measurement target by the reference signal measurement configuration-remove list is performed based on the index, and the measurement report and the measurement target designated in the index are associated in the measurement report as will be described later. In addition, the CSI-RS measurement configuration will be described later with reference to FIGS. 11 and 12.

Figure 10:
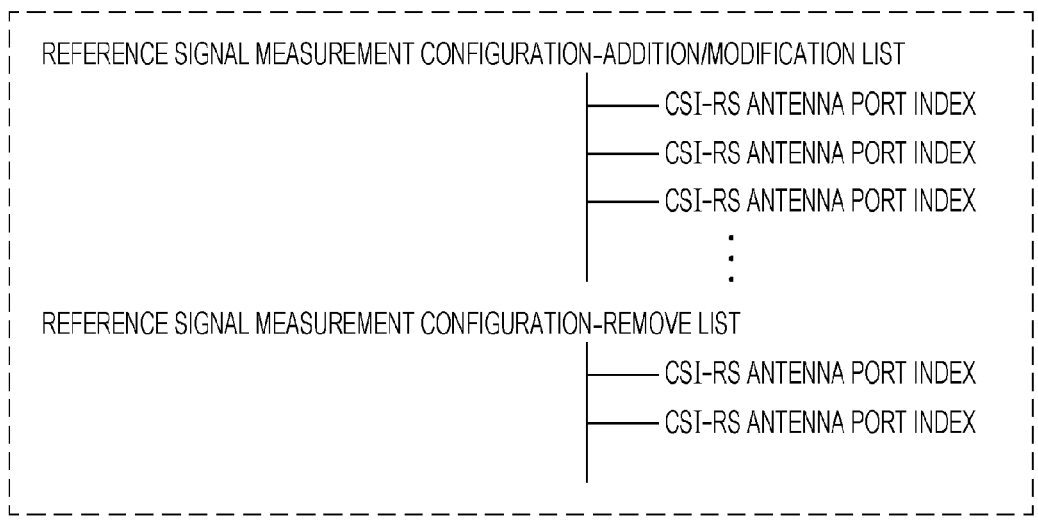
FIG. 10 is a diagram illustrating another example of a detail of the parameters relating to the second measurement target configuration in Step S403 in FIG. 4.

In another example, it is also possible to configure only the CSI-RS antenna port index in the reference signal measurement configuration-addition/modification list and the reference signal measurement configuration-remove list as shown in FIG. 10. Here, the CSI-RS antenna port index is an index associated with the antenna port number (antenna ports 15 to 22) of the channel-state information reference signal shown in FIG. 3. In addition, the CSI-RS antenna port index configured in the third reference signal configuration in FIG. 10 may be a part of the channel-state information reference signal configured in the first reference signal configuration shown in FIG. 8, or may not be included in the channel-state information reference signal configured in the first reference signal configuration. When the CSI-RS antenna port index is not included in the channel-state information reference signal configured in the first reference signal configuration, a channel-state information reference signal in a case where a CSI-RS antenna port index configured in the third reference signal configuration is included in the channel-state information reference signal configured in the first reference signal configuration is a target of the third reference signal configuration.

Figure 11:
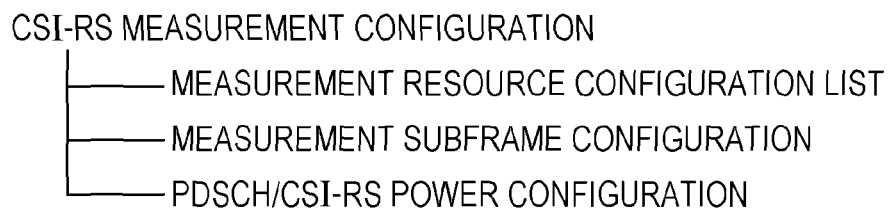
FIG. 11 is a diagram illustrating an example of a detail of CSI-RS measurement configuration.
Figure 12:
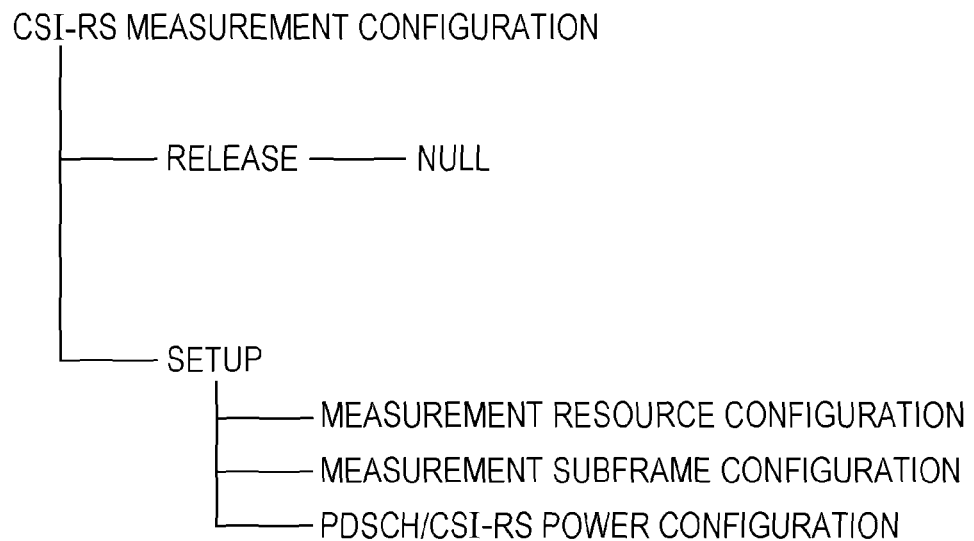
FIG. 12 is a diagram illustrating another example of a detail of the CSI-RS measurement configuration.

Next, detailed description will be given of the CSI-RS measurement configuration in FIG. 9 with reference to FIGS. 11 and 12. In one example, the CSI-RS measurement configuration can include a measurement resource configuration list, measurement subframe configuration, and PDSCH/CSI-RS power configuration as shown in FIG. 11. As the measurement resource configuration list and the measurement subframe configuration, it is possible to consider the configuration similar to the zero transmission power resource configuration list (zeroTxPowerResourceConfigList-r10) and the zero transmission power subframe (zeroTxPowerSubframeConfig-r10) configuration shown in FIG. 8. As the PDSCH/CSI-RS power configuration, it is possible to consider the configuration similar to the PDSCH/CSI-RS power configuration (p-C-r10) shown in FIG. 8. In another example, the CSI-RS measurement configuration can include measurement resource configuration, measurement subframe configuration, and PDSCH/CSI-RS power configuration as shown in FIG. 12. As the measurement resource configuration, the measurement subframe configuration, and the PDSCH/CSI-RS power configuration, it is possible to consider the configuration similar to the resource configuration (resouceConfig-r10), the subframe configuration (subframeConfig-r10), and the PDSCH/CSI-RS power configuration (p-C-r10) shown in FIG. 8. Although the PDSCH/CSI-RS power configuration is assumed in FIGS. 11 and 12, the information about CSI-RS transmission power (channel-state information reference signal transmission power) may be provided instead.

Figure 13:
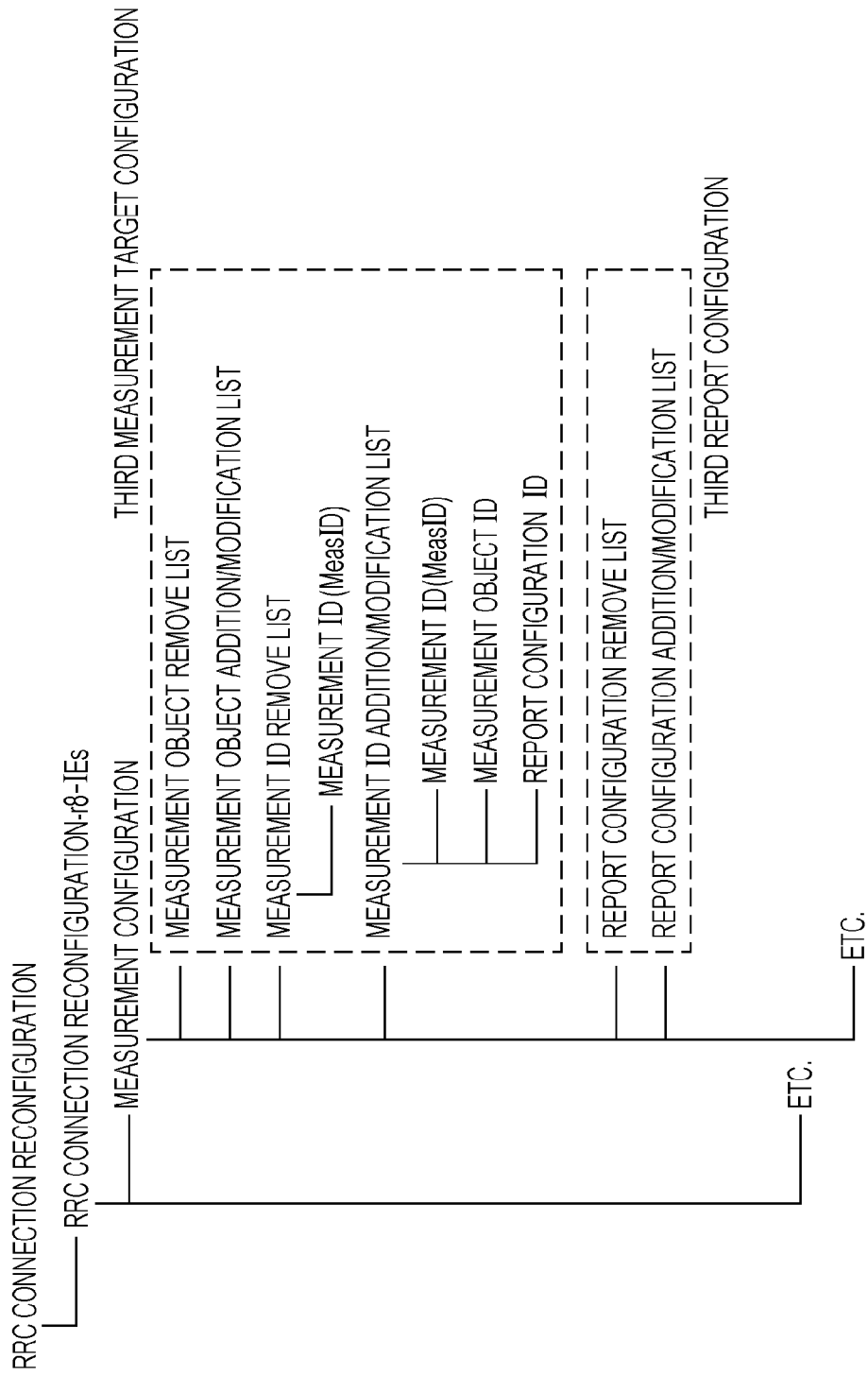
FIG. 13 is a diagram illustrating details of third measurement target configuration and report configuration in Step S403 in FIG. 4.
Figure 14:
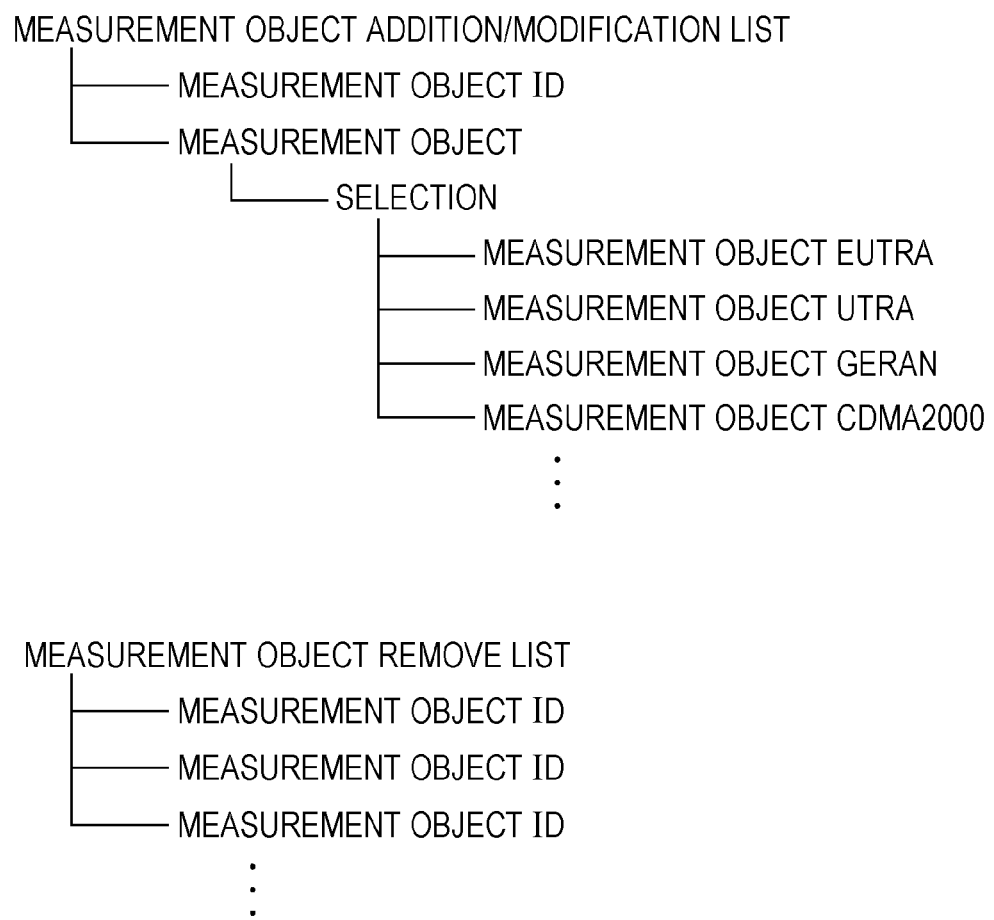
FIG. 14 is a diagram illustrating an example of a detail of the third measurement target configuration.

Next, detailed description will be given of the third measurement target configuration and the third report configuration in Step S403 in FIG. 4 with reference to FIG. 13. In one example, RRC connection reconfiguration can include RRC connection reconfiguration-r8-IEs, and the RRC connection reconfiguration-r8-IEs can include measurement configuration (Measurement Config (MeasureConfig)). The measurement configuration can include a measurement object remove list (MeasObjectToRemoveList), a measurement objet addition/modification list (MeasObjectToAddModList), a measurement ID remove list, a measurement ID addition/modification list, a report configuration remove list (ReportConfigToRemoveList), and a report configuration addition/modification list (ReportConfigToAddModList). The third measurement target configuration shown in Step S403 in FIG. 4 indicates the measurement object remove list, the measurement object addition/modification list, the measurement ID remove list, and the measurement ID addition/modification list, and the third report configuration indicates the report configuration remove list and the report configuration addition/modification list. In addition, the measurement ID addition/modification list includes a measurement ID, a measurement objet ID, and a report configuration ID in some cases, and the measurement ID remove list includes a measurement ID in some cases. Moreover, the measurement object ID is associated with a measurement object which will be described late, and the report configuration ID is associated with a report configuration ID which will be described later. In the measurement object addition/modification list, it is possible to select the measurement object ID and the measurement object as shown in FIG. 14. In addition, it is possible to select the measurement object from a measurement object EUTRA, a measurement object UTRA, a measurement object GERAN, a measurement object CDMA2000, and the like. In the case of the measurement object EUTRA, for example, it is possible to measure received signal power of a cell-specific reference signal transmitted from a non-connected cell (a cell for which the RRC parameter has not been configured) by the base station 101 providing information about a carrier frequency (center frequency) and the like to the terminal 102 (see FIG. 15). That is, it is possible to measure the received signal power of the cell-specific reference signal from the non-connected cell by the third measurement target configuration and the third report configuration. In addition, the measurement object remove list includes the measurement object ID, and it is possible to remove the corresponding measurement object by designating the measurement object ID. Since the aforementioned measurement target configuration is included in the RRC connection reconfiguration, the measurement target is configured through the RRC signal during the RRC connection reconfiguration. Moreover, the aforementioned RRC connection reconfiguration and various information elements and various kinds of configuration included in the RRC connection reconfiguration may be configured for each terminal 102 through an EEC signal (dedicated signaling). Furthermore, the aforementioned physical configuration may be made for each terminal 102 through an RRC message. In addition, the aforementioned RRC reconfiguration and RRC reestablishment may be configured for each terminal 102 through the RRC message.

Figure 16:
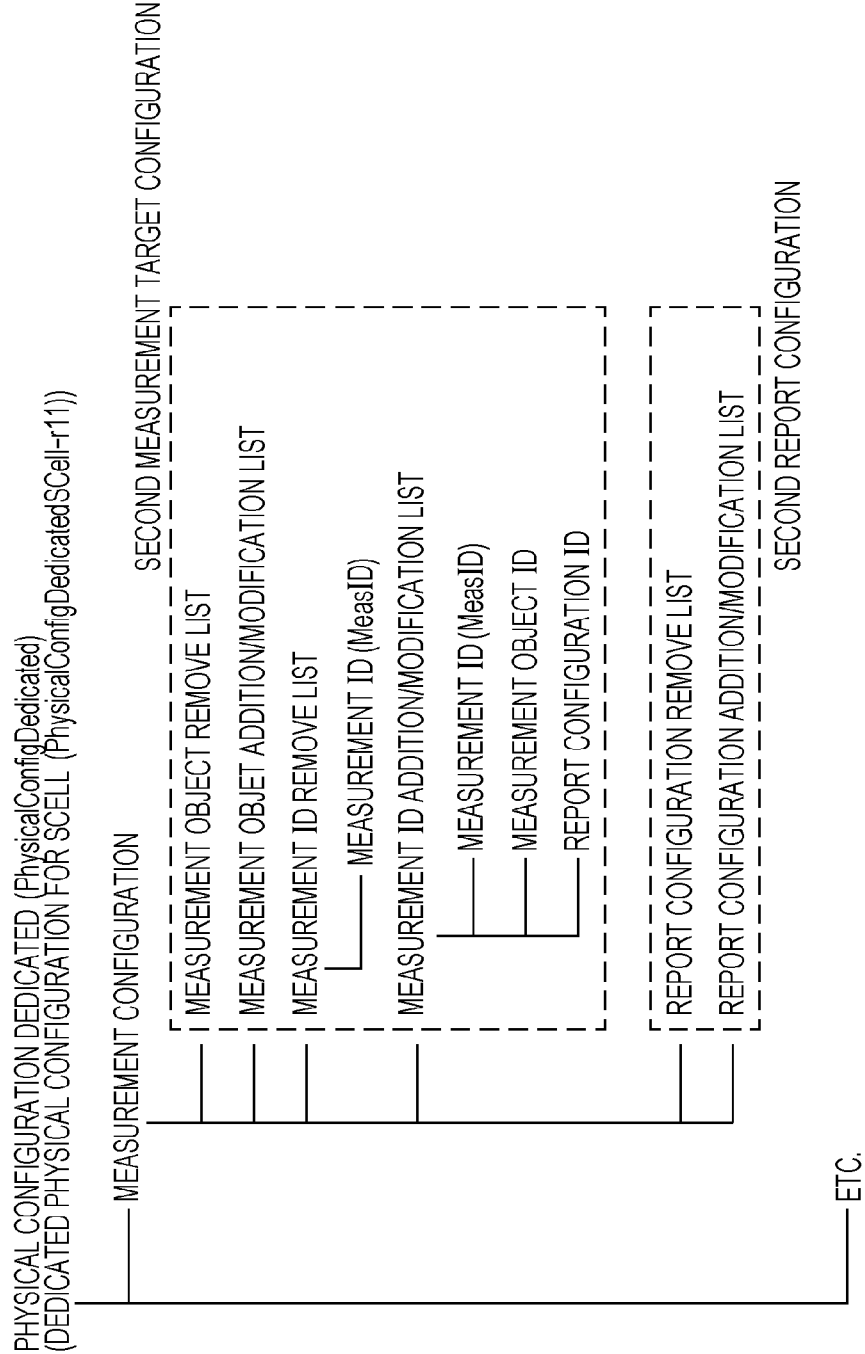
FIG. 16 is a diagram illustrating details of the second measurement target configuration and the report configuration in Step S403 in FIG. 4.

Next, detailed description will be given of the second measurement target configuration and the second report configuration in Step S403 in FIG. 4 with reference to FIG. 16. In one example, the dedicated physical configuration (PhysicalConfigDedicated) can include measurement configuration, and the measurement configuration can include a measurement object remove list, a measurement object addition/modification list, a measurement ID remove list, a measurement ID addition/modification list, a report configuration remove list, and a report configuration addition/modification list. The second measurement target configuration shown in Step S403 in FIG. 4 indicates the measurement object remove list and the measurement object addition/modification list, and may further include the measurement ID remove list and the measurement ID addition/modification list. The second report configuration indicates the report configuration remove list and the report configuration addition/modification list. Moreover, the measurement object remove list and the measurement object addition/modification list described herein are considered to be the same as the reference signal measurement configuration-addition/modification list and the reference signal measurement configuration-remove list shown in FIGS. 9 and 10. Although the above description was given of the case of the dedicated physical configuration (PhysicalConfigDedicated) as a physical configuration unique to the terminal in FIG. 16, dedicated physical configuration for SCell (PhysicalConfigDedicatedSCell-r11) which is assigned to the secondary cell and is the physical configuration unique to the terminal may also be applied. The aforementioned dedicated physical configuration is configured through the RRC signal during the RRC connection reestablishment and RRC connection reconfiguration. In contrast, the dedicated physical configuration for SCell is included in an SCell addition/modification list in some cases and is configured through the RRC signal during addition of SCell and during a change in the configuration. As described above, it is possible to measure the received signal power of the channel-state information reference signal, for which a connected cell has been configured, by the second measurement target configuration and the second report configuration. In addition, the measurement object addition/modification list and the measurement object remove list (second measurement target configuration) shown in FIG. 16 may have the same content as that of the reference signal measurement configuration-addition/modification list and the reference signal measurement configuration-remove list (third reference signal configuration) shown in FIGS. 9 and 10. That is, a third reference signal is configured by the CSI-RS measurement configuration (see FIGS. 11 and 12) identified by the CSI-RS measurement index shown in FIG. 9 or the third reference signal is configured by the CSI-RS antenna port index shown in FIG. 10 for the measurement object addition/modification list and the measurement object remove list shown in FIG. 16. In addition, although the case where the second measurement target configuration is included in the dedicated physical configuration (PhysicalConfigDedicated) or the dedicated physical configuration for SCell (PhysicalConfigDedicatedSCell-r11) which is physical configuration unique to the terminal assigned to the secondary cell is assumed in FIG. 16, the second measurement target configuration may be included in the aforementioned CSI-RS configuration-r10 in FIG. 8. Although the case where the second measurement target configuration is included is assumed in the other example, the second measurement target configuration may be included in the aforementioned measurement configuration in FIG. 13. In addition, the aforementioned physical configuration may be made for each terminal 102 through the RRC signal (dedicated signaling).

Figure 17:
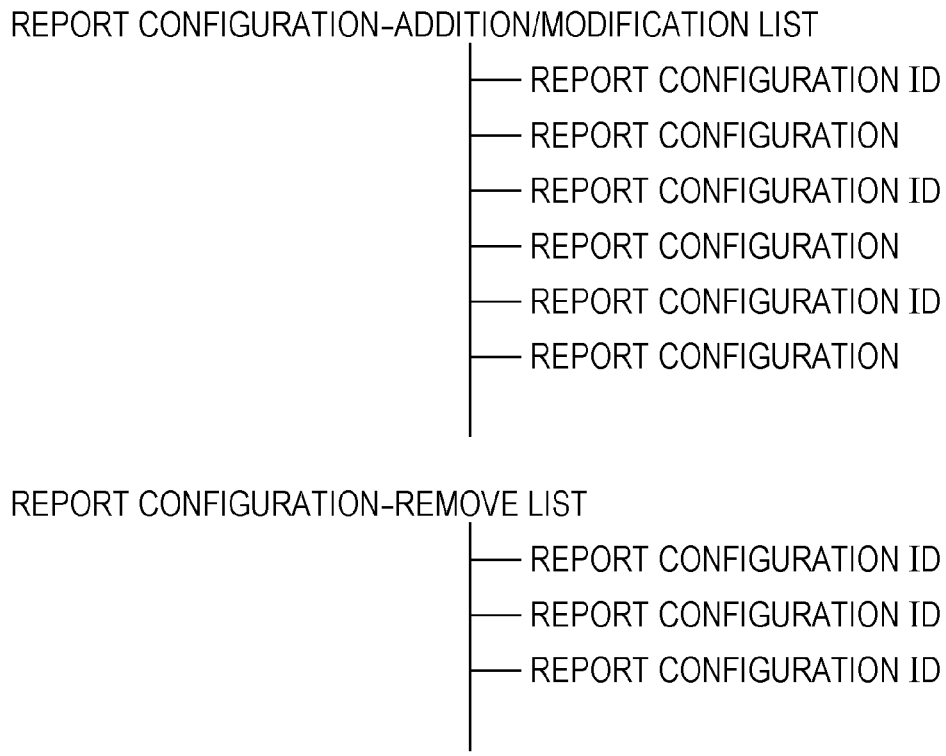
FIG. 17 is a diagram illustrating a detail of second report configuration.

Next, detailed description will be given of the second report configuration in FIG. 16 with reference to FIG. 17. In one example, a report configuration-addition/modification list includes a pair of a report configuration ID and report configuration. In addition, a report configuration-remove list includes the report configuration ID. In addition, a plurality of pairs of the report configuration IDs and the report configuration may be included or only one pair thereof may be included in the report configuration-addition/modification list. In addition, a plurality of report configuration IDs may be included or only one report configuration ID may be included in the report configuration-remove list. Moreover, the report configuration addition/modification list in FIG. 13 also includes one or more pairs of the report configuration IDs and the report configuration in the same manner as in FIG. 17, and the content of the report configuration is the same as that in the report configuration. Furthermore, the report configuration remove list in FIG. 13 also includes one or more report configuration ID in the same manner as in FIG. 17.

Figure 18:
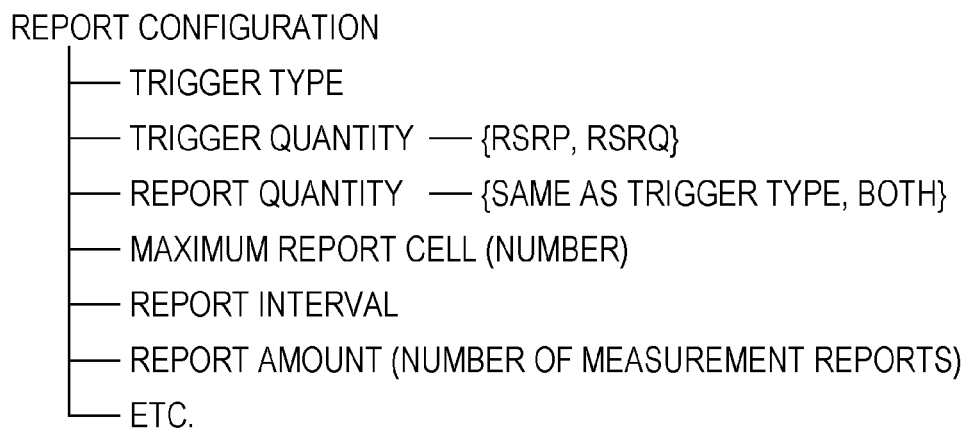
FIG. 18 is a diagram illustrating an example of the report configuration.

Next, description will be given of the report configuration in FIG. 17 with reference to FIG. 18. In one example, the report configuration includes a trigger type. In the trigger type, information on a threshold (threshold value) for an event of performing a report, a report interval, and the like is configured.

Figure 19:
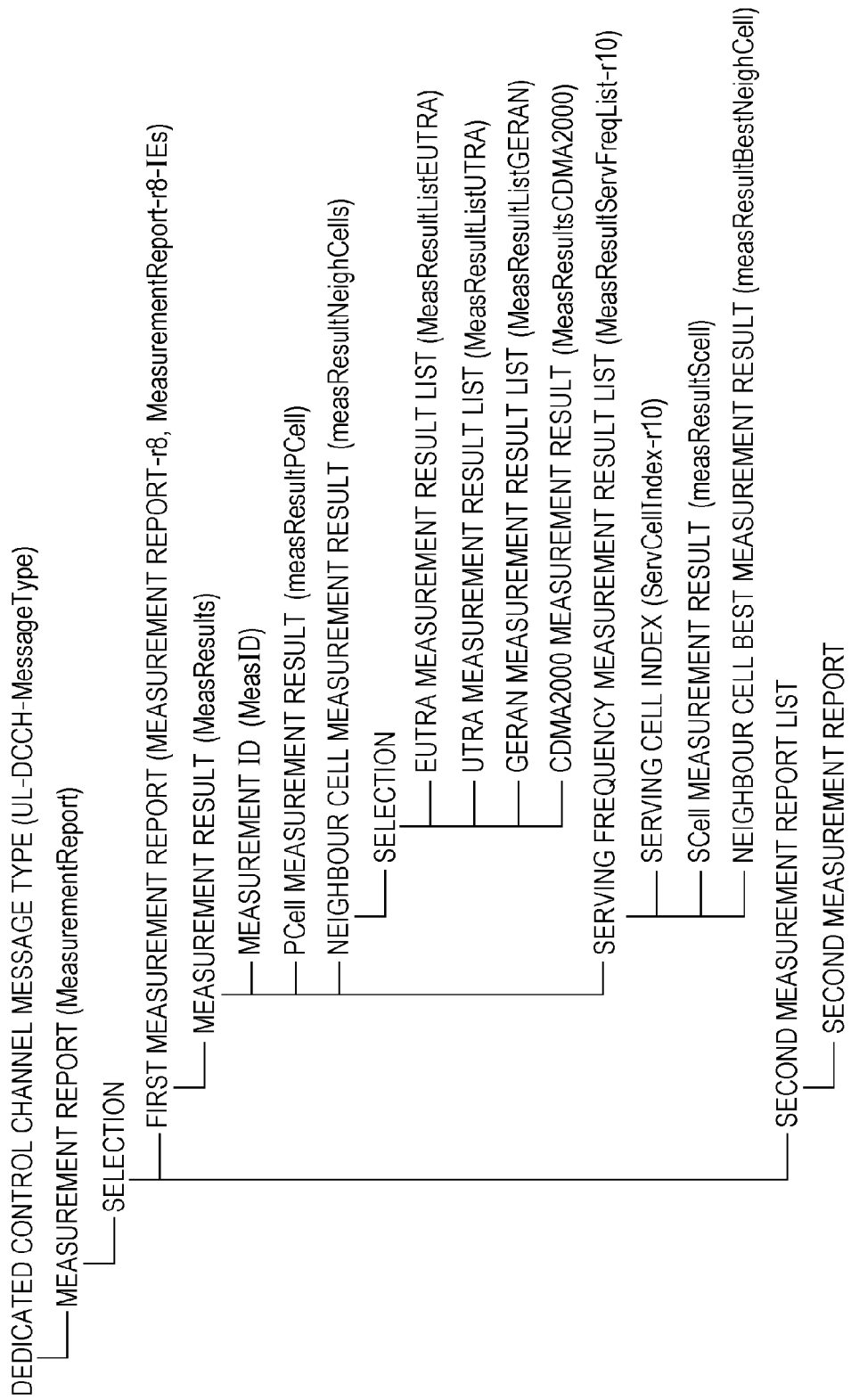
FIG. 19 is a diagram illustrating a detail of a measurement report.

Next, description will be given of a first measurement report and a second measurement report list as the configuration relating to the first measurement report and the second measurement report in Step S407 in FIG. 4, with reference to FIG. 19. A dedicated control channel message type (UL-DCCH-MessageType) described with reference to FIG. 19 is an RRC message transmitted from the terminal to the base station 101. The aforementioned dedicated control channel message type includes at least a measurement report. A report included in the measurement report can be selected. It is possible to select at least a first measurement report (measurement report-r8, MeasurementReport-r8-IEs) and a second measurement report list. The first measurement report can include measurement results (MeasResults), and the measurement results can include a measurement ID (MeasID), a PCell measurement Result (measResultPCell), an neighbour cell measurement result (measResultNeighCells), and a serving frequency measurement result list. As the neighbour cell measurement result, it is possible to select an EUTRA measurement result list (MeasResultListEUTRA), a UTRA measurement Result List (MeasResultListUTRA), a GERAN measurement result list (MeasResultListGERAN), or a CDMA2000 measurement result (MeasResultsCDMA2000). The serving frequency measurement result list may include a serving cell index, an SCell measurement result, and an neighbour cell best measurement result. Although the case where the first measurement report and the second measurement report list are aligned in parallel and one of the first measurement report and the second measurement report list is selected is assumed in FIG. 19, the second measurement report may be included in the measurement results of the first measurement report.

Next, detailed description will be given of the EUTRA measurement result list shown in FIG. 19 with reference to FIG. 20. The EUTRA measurement result list includes a physical cell ID (PhysCellID) and a measurement result (measResult). The terminal 102 can provide information indicating the neighbour cell whose measurement information has been provided to the base station 101 by combining the physical cell ID and the measurement result. In addition, the EUTRA measurement result list may include a plurality of combinations of the aforementioned physical cell IDs and the measurement results or only one combination thereof. In addition, the PCell measurement result and the serving frequency measurement result list included in FIG. 19 correspond to results obtained by measuring the measurement target designated in the aforementioned first measurement target configuration. Moreover, the measurement result included in the EUTRA measurement result list and the like in FIG. 20 corresponds to a result obtained by measuring the measurement target designated in the third measurement target configuration in FIG. 13. Furthermore, the measurement ID shown in FIG. 19 indicates the measurement ID shown in FIG. 13, and the measurement target is associated with the measurement object included in the third measurement target configuration and the measurement report configuration included in the third report configuration by the measurement ID. Moreover, a relationship between the measurement report and the first to third measurement target configuration will be described. The terminal 102 can report, to the base station 101, the received signal power of the PCell cell specific reference signal at the antenna port 0 and the received signal power of the SCell cell-specific reference signal at the antenna port 0 through the PCell measurement result and the SCell measurement result included in the first measurement report. In addition, the received signal power is the measurement target designated by the first measurement target configuration. On the other hand, the terminal 102 can report, to the base station 101, the received signal power of the neighbour cell cell-specific reference signal at the antenna port 0 through the physical cell ID and the measurement result included in the EUTRA measurement result list. In addition, the received signal power is a measurement target designated by the third measurement target configuration. That is, the terminal 102 can report, to the base station 101, the received power of the cell-specific reference signal transmitted from the antenna port 0 of the non-connected cell (the cell for which the RRC parameter has not been configured, the neighbour cell) by the first measurement report and the third measurement target configuration. From another point of view, the cell-specific reference signal transmitted from the non-connected cell can be generated by using a physical ID (physical cell ID) different from that of the cell specific reference signal transmitted from the connected cell. From another point of view, the terminal 102 can report, to the base station 101, the received power of the cell-specific reference signal transmitted from the antenna port 0 of the connected cell (the primary cell, the secondary cell) through the first measurement report.

Next, detailed description will be given of the second measurement report list shown in FIG. 19 with reference to FIG. 21. The second measurement report included in the second measurement report list includes a CSI-RS measurement index and a measurement result. In addition, a CSI-RS antenna port index may be included instead of the CSI-RS measurement index. The CSI-RS measurement index and the CSI-RS measurement index described herein indicate the CSI-RS measurement index and the CSI-RS antenna port index described with reference to FIGS. 9 and 10. Accordingly, the terminal 102 can report, to the base station 101, the received signal power of the measurement target configured by the third reference signal configuration through the measurement result of the second measurement report. When the antenna port 15 of the channel-state information reference signal is designated by the third reference signal configuration, for example, the terminal 102 can report, to the base station 101, the received signal power of the channel-state information reference signal at the antenna port 15. That is, the terminal 102 can report, to the base station 101, the received signal of the channel state reference signal (the antenna port 15 of the channel-state information reference signal, for example) for which connected cell (primary cell, secondary cell) has been configured, through the second measurement report. In addition, an index indicating a specific cell (a carrier component corresponding to the cell) such as a serving cell index may be included in the second measurement report in FIG. 21 although not shown in the drawing. In such a case, the terminal 102 can report, to the base station 101, which of the channel-state information reference signals the measurement result is obtained from, and which of the cells the channel-state information reference signal is included in, by combining the serving cell index, the CSI-RS measurement index, and the measurement result.

According to the second embodiment, the base station 101 configures, for each terminal 102, the second measurement target configuration for measuring only the channel-state information reference signal configured by the base station 101, and performs, for each terminal 102, the third measurement target configuration for measuring the cell-specific reference signal generated by using a physical ID different from the physical ID of the cell to which the terminal 102 is connected. In addition, the terminal 102 reports, to the base station 101, a received signal with respect to the reference signal as the measurement target designated by the second measurement target configuration and a received signal with respect to the reference signal as the measurement target designated by the third measurement configuration.

According to the second embodiment, the base station 101 performs, for each terminal, the first reference signal configuration for configuring the measurement target for a channel state report, the terminal 102 performs, for each terminal 102, the second reference signal configuration for designating the resource element to be excluded from the data demodulation during the data demodulation, and the terminal 102 performs, for each terminal 102, the third reference signal configuration for configuring the measurement target for measuring the reference signal received power. In addition, the terminal 102 receives information configured by the base station 101, reports the channel state to the base station 101 based on the first reference signal configuration, determines the resource element to be excluded from the data demodulation based on the second reference signal configuration, demodulates the data, and measures the reference signal received power based on the third reference signal configuration.

It is possible to obtain the following effects by employing the aforementioned embodiment of the present application. It is assumed that the antenna ports 15, 16, 17, and 18 of the cell-specific reference signal shown in FIG. 2 and the channel-state information reference signal shown in FIG. 3 are transmitted only from the base station 101 by using the downlink 105, and the measurement target configured in the second measurement target configuration in Step S403 in FIG. 4 and in the second report configuration, namely the measurement target configured in the third reference signal configuration in FIG. 9 corresponds to the antenna port 19 of the channel-state information reference signal shown in FIG. 3, and the channel-state information reference signal is transmitted only from the RRH 103 by using the downlink 107 in the case of the measurement target. In such a case, it is possible to calculate pathloss 1 as downlink pathloss between the base station 101 and the terminal 102 and pathloss 2 as downlink pathloss between the RRH 103 and the terminal 102 by measuring the received signal power of the cell-specific reference signal as the first measurement target in Step S405 in FIG. 4 and of the channel-state information reference signal transmitted only from the RRH 103 as the second measurement target. Furthermore, since the first reference signal configuration is performed on the antenna ports 15, 16, 17, and 18, a Rank Information (RI: Rank Indicator), precoding information (PMI: Precoding Matrix Indicator), and channel quality information (CQI: Channel Quality Indicator) based on this are provided and applied to precoding of the terminal-specific reference signal and the data signal and to the modulation coding scheme of the data signal (MCS: Modulation and Coding Scheme). In contrast, only measurement and report relating to received signal power are performed on the antenna port 19 of the channel-state information reference signal as the measurement target configured in the third reference signal configuration. With such a configuration, it is possible to configure an antenna port (or a measurement target) for measuring only received power (and pathloss) separately from the antenna port which actually performs communication in the downlink in the communication system. For example, the base station 101 can reduce transmission frequency of a reference signal corresponding to the antenna ports used in measuring only the received power as compared with the reference signal corresponding to the antenna port which performs communication in the downlink and suppress an increase in overhead of the reference signal in the system. In addition, when the received signal power of the channel-state information reference signal transmitted from the antenna port 19 increases (that is, when the pathloss between the RRH 103 and the terminal 102 decreases), the base station 101 can constantly transmit a downlink signal from an appropriate transmission point (namely, the base station 101 or the RRH 103) by reconfiguring the channel-state information reference signal configured in the first reference signal configuration to the antenna port assigned to the RRH 103. From another point of view, the channel-state information reference signals transmitted from the antenna ports 15, 16, 17, and 18 configured in the first reference signal configuration can be used for transmitting the downlink signal, and pathloss obtained from the antenna port 19 of the channel-state information reference signal configured in the third reference signal configuration can also be used for transmitting the uplink signal. This allows the terminal 102 to transmit the uplink signal to the RRH 103 by using the uplink 108 while receiving the downlink signal from the base station 101 via the downlink 105. It is possible to flexibly design the communication system in which access points of the downlink signal and the uplink signal are changed, for example, by performing the first reference signal configuration for configuring the measurement target for calculating the CSI feedback including at least one of CQI, PMI, and RI and the third reference signal configuration for configuring the measurement target for calculating the received signal power and obtaining a state where at least a part of the resources configured in the third reference signal configuration is not included in the resources configured in the first reference signal configuration.

From another point of view, it is assumed that the cell-specific reference signal shown in FIG. 2 is transmitted only from the base station 101 by using the downlink 105, the measurement target configured in the second measurement target configuration and the second report configuration in Step S403 in FIG. 4 is the channel-state information reference signal shown in FIG. 3, and the channel-state information reference signal is transmitted only from the RRH 103 by using the downlink 107 in the case of this measurement target. Furthermore, it is assumed that the base station 101 and the RRH 103 perform carrier aggregation and have two carrier components (Carrier Component, CC, Cell, cell) at different center frequencies in both the uplink and the downlink. These are referred to as a first carrier component and a second carrier component, and it is assumed that the base station 101 and the RRH 103 can perform individual communication and cooperative communication by using these carrier components. In such a case, the terminal 102 is connected to the base station 101 via the first carrier component. At the same time, measurement of the measurement target is performed in accordance with the predetermined parameter relating to the first measurement. Here, the measurement target is the cell-specific reference signal transmitted from the antenna port 0 of the connected cell. At the same time, parameters relating to the third measurement and the third report are configured, and measurement of the measurement target is performed. Here, the measurement target is the specific reference signal transmitted from the antenna port 0 of the non-connected cell. Thereafter, the first measurement report shown in FIG. 19 is provided from the terminal 102 to the base station 101 in Step S407 in FIG. 4. That is, the received power of the aforementioned cell-specific reference signal transmitted from the antenna port 0 of the connected cell and the received signal of the aforementioned cell-specific reference signal transmitted from the antenna port 0 which is not connected are reported to the base station 101 through the first measurement report. In contrast, the second measurement configuration for the first carrier component is individually performed by the dedicated physical configuration after the connection of the first carrier component (primary cell), and the second measurement configuration for the second carrier component is performed when the second carrier component (secondary cell) is added (during the SCell dedicated physical configuration). That is, the terminal 102 measures the antenna port 0 of the cell-specific reference signal of the non-connected cell and sends a report to the base station 101 by performing the third measurement target configuration, and the terminal 102 measures the antenna port at which the channel sate information reference signal of only the connected cell is configured, and sends a report to the base station 101 via the second measurement report by performing the second measurement configuration and the second measurement report. With such a configuration, the terminal 102 and the base station 101 can search the optimal base station 101 and a cell only by the third measurement target configuration, the third report configuration, and the first measurement report, and can search an optimal transmission point (the base station 101 or the RRH 103, for example) and measure pathloss based on the first measurement target configuration and the second measurement target configuration. Here, the connected cell indicates a cell for which parameters have been configured by an RRC signal, namely a primary cell (first carrier component), a secondary cell (second carrier component), or the like, and the non-connected cell indicates a cell for which parameters have not been configured by an RRC signal, namely an neighbour cell. From another point of view, the cell-specific reference signal transmitted from the non-connected cell can be generated by using a physical ID (physical cell ID) different from that of the cell-specific reference signal transmitted from the connected cell.

Third Embodiment

Next, description will be given of a third embodiment. In the third embodiment, detailed description will be given of the processing from Step S408 to Step S409 in FIG. 4. Particularly, processing of the communication system when a plurality of parameters relating to uplink power control has been configured will be described in detail. Here, pathloss (first pathloss) is set based on information relating to the first measurement target configuration and information relating to parameter configuration in relation to the uplink power control, and first uplink transmission power is set based on the first pathloss and information relating to parameter configuration in relation to the uplink power control, in particular. In addition, the terminal 102 sets pathloss (second pathloss) based on information relating to parameter configuration in relation to the second measurement target configuration and the uplink power control and sets second uplink transmission power based on the second pathloss and information relating to parameter configuration in relation to uplink power control. That is, detailed description will be given of a case where the information relating to the first measurement target configuration, second measurement target configuration, and the first and second uplink transmission power are implicitly (in an implicit or fixed manner) configured.

Description will be given of a method for calculating the uplink transmission power. The terminal 102 determines uplink transmission power of the PUSCH in a subframe i of a serving cell c from Equation (1).

$$P_{PUSCH,c}(i) = \min\begin{Bmatrix} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{Bmatrix}$$ [Math. 1]

$P_{CMAX,c}$ represents the maximum transmission power of the terminal 102 in the serving cell c. $M_{PUSCH,c}$ represents a transmission bandwidth (the number of resource blocks in the frequency direction) of the serving cell c. In addition, $P_{0\_PUSCH,c}$ represents standard power of the PUSCH of the serving cell c. $P_{0\_PUSCH,c}$ is determined by $P_{0\_NOMINAL\_PUSCH,c}$ and $P_{0\_UE\_PUSCH,c}$. $P_{0\_NOMINALL\_PUSCH,c}$ is a parameter relating to cell-specific uplink power control. $P_{0\_UE\_PUSCH,c}$ is a parameter relating to terminal-specific uplink power control. α is an attenuation coefficient (pathloss compensation coefficient) used for fractional transmission power control in the entire cell. $PL_c$ is pathloss and is obtained from a reference signal transmitted with known power and RSRP. When pathloss between the base station 101 (or the RRH 103) and the terminal 102 is 5 dB, for example, $PL_c$ is a parameter for compensating for the value. According to the present invention, $PL_c$ may be a pathloss calculation result obtained by the first embodiment or the second embodiment. $\Delta_{TF,c}$ is obtained from Equation (2).

$$\Delta_{TF,c}(i) = 10 \log_{10}((2^{BPRE \cdot K_s} - 1) \cdot \beta_{offset}^{PUSCH})$$ [Math. 2]

BPRE represents a number of bits which can be assigned to a resource element. In addition, $K_S$ is a parameter relating to the uplink power control, the information of which is provided from the higher layer by using the RRC signal, and which is a parameter depending on the modulation coding scheme (MCS) of the uplink signal (deltaMCS-Enabled). Moreover, $f_c$ is determined by accumulaton-enabled which is a parameter relating to the uplink power control and a TPC command included in an uplink grant (DCI format). Furthermore, the TPC command may be included in downlink assignment.

The terminal 102 determines uplink transmission power of the PUCCH in the subframe I from Equation (3).

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{Bmatrix}$$ [Math. 3]

$P_{0\_PUCCH}$ represents standard power of the PUCCH. $P_{0\_PUCCH}$ is determined from $P_{0\_NOMINAL\_PUCCH}$ and $P_{0\_UE\_PUCCH}$. $P_{0\_NOMINAL\_PUCCH}$ is a parameter relating to cell-specific uplink power control. $P_{0\_UE\_PUCCH}$ is a parameter relating to terminal-specific uplink power control. $n_{CQI}$ represents a number of bits of CQI, $n_{HARQ}$ represents a number of bits of HARQ, and $n_{SR}$ represents a number of bits of SR. $h(n_{CQI}, n_{HARQ}, n_{SR})$ is a parameter defined so as to depend on the respective numbers of bits, namely on the PUCCH format. $\Delta_{F\_PUCCH}$ is a parameter, the information of which is provided from the higher layer (deltaFList- PUCCH). $\Delta_{TxD}$ is a parameter, the information of which is provided from the higher layer when transmission diversity is configured. g is a parameter used for adjusting power control of the PUCCH.

The terminal 102 determines uplink transmission power of the SRS from Equation (4).

$$P_{SRS,c}(i) = \min\{P_{CMAX,c}(i), P_{SRS\_OFFSET,c}(m) + 10 \log_{10} (M_{SRS,c}) + P_{O\_PUSCH,c}(j) + \alpha_c(j) \cdot PL_c + f_c(i)\} \quad \text{[Math. 4]}$$

$P_{SRS\_OFFSET}$ is an offset for adjusting the transmission power of the SRS and is included in the uplink power control parameter (parameter configuration relating to the terminal-specific uplink power control). $M_{SRS,c}$ represents a bandwidth (the number of resource blocks in the frequency direction) of the SRS arranged in the serving cell c.

The terminal 102 determines uplink transmission power of the PRACH from Equation (5).

$$P_{PRACH} = \min\{P_{CMAX,c}(i), \text{PREAMBLE\_RECEIVED\_TARGET\_POWER} + PL_c\} \quad \text{[Math. 5]}$$

$P_{CMAX,c}$ of the PRACH is the maximum transmission power in the primary cell. $PL_c$ of the PRACH is downlink pathloss in the primary cell calculated by the terminal 102.

If the transmission power of each uplink physical channel exceeds the maximum transmission power $P_{CMAX,c}$ (i) of the terminal 102 as a result of calculation of various transmission power parameters and pathloss, the terminal 102 transmits the uplink physical channel with the maximum transmission power.

The terminal 102 determines PREAMBLE_RECEIVED_TARGET_POWER from Equation (6).

$$\text{PREAMBLE\_RECEIVED\_TARGET\_POWER} = (\text{PREAMBLE\_TRANSMISSION\_COUNTER} - 1) * \text{powerRampingStep} \quad \text{[Math. 6]}$$

preambleInitialReceivedPower is initial received power of a random access preamble. DELTA_PREAMBLE is a power offset associated with a preamble format. PREAMBLE_TRANSMISSION_COUNTER represents the number of times of transmission of the PRACH (random access preamble). powerRampingStep is a parameter indicating an amount of an increase in power for increasing, by a specific amount, transmission power when the PRACH is transmitted again when random access is failed.

Here, the terminal 102 determines pathloss (downlink pathloss) $PL_c$ from Equation (7).

$$PL_c = \text{referenceSignalPower} - \text{higherlayerfiltered} RSRP \quad \text{[Math. 7]}$$

referenceSignalPower is a power value per resource element of a reference signal for measuring pathloss (CRS, for example), the information of which is provided by the higher layer while being included in PDSCH-Config. That is, referenceSignalPower represents transmission power of the reference signal for measuring pathloss transmitted from the base station 101. higher layer filtered RSRP is an RSRP filtered at the higher layer. Furthermore, higher layer filtered RSRP is obtained by Equation (8).

$$F_n = (1-a) \cdot F_{n-1} + a \cdot M_n \quad \text{[Math. 8]}$$

$F_n$ is a measurement result to be updated, that is, represents the higher layer filtered RSRP. In addition, $F_{n-1}$ is a measurement result in the past, namely higher layer filtered RSRP in the past. Moreover, $M_n$ represents the latest measurement result. Furthermore, a is a measurement quantity and is determined by Equation (9). a represents a degree of influence of each measurement result, and a which is closer to 1 represents a measurement result which places more weight to the latest measurement result.

$$a = 1/2^{(k/4)} \quad \text{[Math. 9]}$$

k is configured by a filter coefficient filterCoefficient. In addition, fikterCoefficient is configured in quantityConfig or UplinkPowerControl. When the base station 101 places emphasis on the latest measurement result, a k value is configured to be small such that an a value increases.

Figure 22:
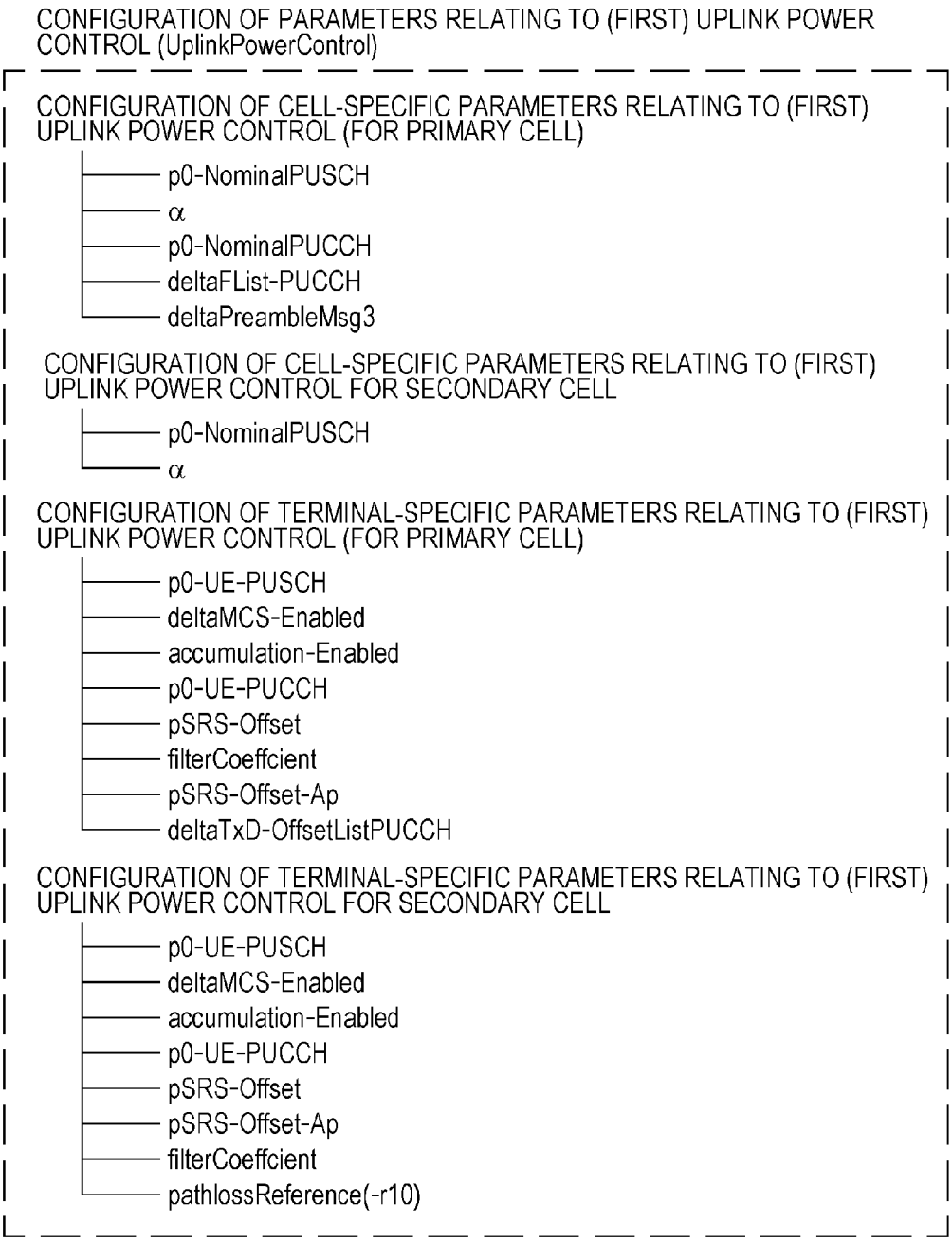
FIG. 22 is a diagram illustrating an example of a detail of parameter configuration relating to uplink power control.

FIG. 22 is a diagram showing an example of information elements included in configuration of parameters relating to (first) uplink power control (UplinkPowerControl). The configuration of parameters relating to the uplink power control includes cell-specific configuration (configuration of cell-specific parameters relating to uplink power control (UplinkPowerConrolCommon)) and terminal-specific configuration (configuration of terminal-specific parameters relating to uplink power control (UplinkPowerControlDedicated)), and the respective configuration includes parameters (information elements) relating to uplink power control configured specifically to the cell or specifically to the terminal. The cell-specific configuration includes standard PUSCH power (p0-NominalPUSCH) as PUSCH power which can be configured specifically to the cell, an attenuation coefficient (pathloss compensation coefficient) of fractional transmission power control α (alpha), standard PUCCH power as PUCCH power which can be configured specifically to the cell (p0-NominalPUCCH), $\Delta_{F\_PUCCH}$ included in Equation (3) (deltaFList-PUCCH), and power adjustment value (deltaPreambleMsg3) in a case where a preamble message 3 is transmitted. In addition, the terminal-specific configuration includes terminal-specific PUSCH power (p0-UE-PUSCH) as PUSCH power which can be configured specifically to the terminal, a parameter in association with power adjustment value $K_s$ based on the modulation coding scheme used in Equation (2) (deltaMCS-Enabled), a parameter necessary for configuring the TPC command (accumulationEnabled), terminal-specific PUCCH power as PUCCH power which can be configured specifically to the terminal (p0-UE-PUCCH), a power offset $P_{SRS\_OFFSET}$ of periodic and aperiodic SRSs (pSRS-Offset, pSRS-OffsetAp-r10), and a filter coefficient of the reference signal received power (filterCoefficient). The above configuration can be made for the primary cell, and the secondary cell can also be configured in the same manner. Furthermore, there is a parameter (pathlossReference-r10) for indicating pathloss calculation by using a reference signal for measuring pathloss of the primary cell or the secondary cell in the terminal-specific configuration of the secondary cell.

Figure 23:
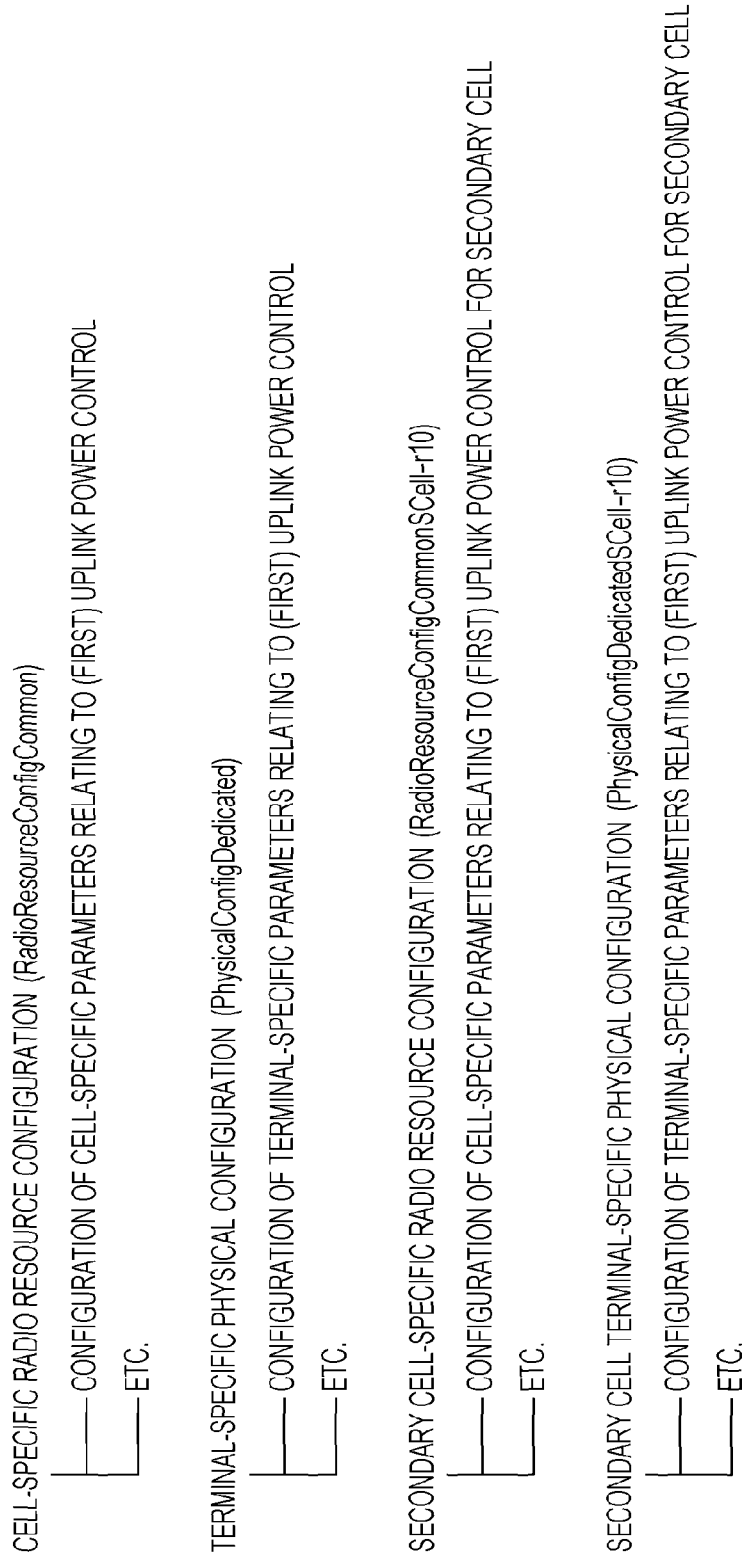
FIG. 23 is a diagram illustrating another example of a detail of the parameter configuration relating to the uplink power control.

FIG. 23 shows an example of information which includes configuration of parameters relating to uplink power control (configuration of parameters relating to first uplink power control). The configuration of cell-specific parameters relating to the (first) uplink power control (UplinkPowerControlCommon1) is included in cell-specific radio resource configuration (RadioResourceConfigCommon). The configuration of terminal-specific parameters relating to (first) uplink power control (UplinkPowerControlDedicated1) is included in terminal-specific physical configuration (PhysicalCofigDedicated). The configuration of cell-specific parameters relating to (first) uplink power control (UplinkPowerControlCommonSCell-r10-1) is included in cell-specific radio resource configuration (RadioResourceConfigCommonSCell-r10) for the secondary cell. The configuration of terminal-specific parameters relating to (first) uplink power control (UplinkPowerControlDedicatedSCell-r10-1) for the secondary cell is included in secondary cell terminal-specific physical configuration (PhysicalConfigDedicatedSCell-r10). In addition, (primary cell) terminal-specific physical configuration is included in (primary cell) terminal-specific radio resource configuration (RadioResourceCofigDedicated). Moreover, secondary cell terminal-specific physical configuration is included in secondary cell terminal-specific radio resource configuration (RadioResoruceConfigDedicatedSCell-r10). The aforementioned cell-specific radio resource configuration and the terminal-specific radio resource configuration may be included in the RRC connection reconfiguration (RRCConnectionReconfiguration) or the RRC reestablishment (RRCConnectionReestablishment) described in the second embodiment. In addition, the aforementioned secondary cell-specific radio resource configuration and the secondary cell terminal-specific radio resource configuration may be included in the SCell addition/modification list described in the second embodiment. The aforementioned cell-specific radio resource configuration and the terminal-specific radio resource configuration may be configured for each terminal 102 through the RRC signal (Dedicated signaling). In addition, the RRC connection reconfiguration and the RRC reestablishment may be configured for each terminal through the RRC message. Moreover, the aforementioned configuration of cell-specific parameters relating to uplink power control may be performed on the terminal 102 through system information. In addition, the aforementioned configuration of terminal-specific parameters relating to uplink power control may be performed on each terminal 102 through the RRC signal (Dedicated signaling).

According to the third embodiment, the terminal 102 can calculate uplink transmission power ($P_{PUSCH1}$, $P_{PUCCH1}$, $P_{SRS1}$) of various uplink signals (PUSCH, PUCCH, SRS) based on the first measurement target configuration and the second measurement target configuration described in the first embodiment and the second embodiment. In addition, various uplink signals also represent a plurality of kinds of uplink physical channels. Moreover, the various uplink physical channels represent that at least one uplink physical channel from among the PUSCH, the PUCCH, the UL DMRS, the SRS, the PRACH, and control information included in the PUCH (CQI, PMI, RI, Ack/Nack) is included.

According to the third embodiment, the base station 101 provides information relating to the first measurement target configuration, information relating to the second measurement target configuration, information relating to parameter configuration in relation to the uplink power control to the terminal 102. In one example, the terminal 102 calculates pathloss (first pathloss) based on the information relating to the first measurement target configuration and the information relating to configuration of parameters in relation to the uplink power control in accordance with the provided information, and sets the first uplink transmission power based on the first pathloss and the information relating to the configuration of parameters in relation to the uplink power control. In addition, the terminal 102 calculates pathloss (second pathloss) based on information relating to the second measurement target configuration and information relating to configuration of parameters in relation to the uplink power control, and sets the second uplink transmission power based on the second pathloss and the information relating to the configuration of parameters in relation to the uplink power control. That is, the first uplink transmission power may be constantly calculated based on the measurement target indicated by the information relating to the first measurement target configuration, and the second uplink transmission power may be constantly calculated based on the measurement target indicated by the information relating to the second measurement target configuration. More specifically, the first uplink transmission power may be constantly calculated based on information relating to the antenna port 0 of the cell-specific reference signal as the measurement target indicated by the information relating to the first measurement target configuration, and the second uplink transmission power may be constantly calculated based on information relating to a resource (or an antenna port), which is the measurement target indicated by the information relating to the second measurement target configuration, and for which the channel-state information reference signal has been designated. In another example, when a plurality of measurement targets (a plurality of resources or a plurality of antenna ports for which the channel-state information reference signal is designated, for example) are designated in the second measurement target configuration, one of the plurality of measurement targets is used to provide information about whether to calculate the second uplink transmission power. In such a case, a pathloss reference resource which will be described in FIG. 24 later may be configured during configuration of cell-specific parameters relating to first uplink power control, configuration of cell-specific parameters relating to uplink first power control for the secondary cell, configuration of terminal-specific parameters relating to first uplink power control, or configuration of terminal-specific parameters relating to first uplink power control for the secondary cell shown in FIG. 22. In still another example, the first uplink transmission power may be constantly calculated based on the cell-specific reference signal transmitted from the antenna port 0 (or the antenna port 0 and the antenna port 1) regardless of the first measurement target configuration. In addition, the terminal 102 can control whether to transmit an uplink signal with the aforementioned first uplink transmission power or whether to transmit the uplink signal with the aforementioned second uplink transmission power depending on a frequency resource or a timing at which a DCI format (an uplink grant, for example) is detected.

As described above, the first uplink transmission power and the second uplink transmission power may be fixedly associated with the first measurement target configuration and the second measurement target configuration (and measurement targets designated in the measurement target configuration).

In a more specific example, when carrier aggregation for performing communication by using a plurality of carrier components (two carrier components herein) is available, the first measurement target configuration or the second measurement target configuration may be associated with the carrier components. That is, the first measurement target configuration may be associated with a first carrier component, and the second measurement target configuration may be associated with a second carrier component. When the first carrier component is configured in the primary cell, and the second carrier component is configured in the secondary cell, the first measurement target configuration may be associated with the primary cell, and the second measurement target configuration may be associated with the secondary cell. That is, the base station 101 may perform the first measurement target configuration and the second measurement target configuration on each cell. The terminal 102 calculates the first pathloss and the first uplink transmission power from the first measurement target configuration, the parameter configuration relating to the primary cell-specific uplink power control, and the parameter configuration relating to the primary cell terminal-specific uplink power control when the uplink grant (DCI format) is detected in the primary cell, and calculates the second pathloss and the second uplink transmission power from the second measurement target configuration, the parameter configuration relating to the secondary cell-specific uplink power control, and the parameter configuration relating to the secondary cell terminal-specific uplink power control when the uplink grant (DCI) format is detected in the secondary cell.

From another point of view, when the terminal 102 communicating with the base station 101 is referred to as a terminal A and the terminal 102 communicating with the RRH 103 is referred to as a terminal B, for example, dynamic uplink signal transmission control for the terminal A is performed only in the primary cell, and the dynamic uplink signal transmission control for the terminal B is performed only in the secondary cell. That is, the base station 101 allows the uplink grant (DCI format) to be included in the primary cell and provides the uplink grant to the terminal 102 when it is desirable to cause the terminal 102 to transmit the uplink signal to the base station 101, and allows the uplink grant (DCI format) to be included in the secondary cell and provides the uplink grant to the terminal 102 when it is desirable to cause the terminal 102 to transmit the uplink signal to the RRH 103. Furthermore, the base station 101 can control the transmission power of the uplink signal directed to the base station 101 or the RRH 103 by utilizing a TPC command which is a correction value of the uplink signal transmission power control included in the DCI format (the uplink grant, for example). The base station 101 configures the value of the TPC command included in the uplink grant for the base station 101 or for the RRH 103 by the cell (carrier component, component carrier) which provides the DCI format (the uplink grant, for example). That is, the base station 101 configures the power correction value of the TPC command in the primary cell to be high when it is desirable to increase the uplink transmission power to the base station 101, and configures the power correction value of the TPC command in the secondary cell to be low when it is desirable to decrease the uplink transmission power to the RRH 103. The base station 101 transmits the uplink signal and controls the uplink transmission power (UL TPC: Uplink Transmission Power Control) on the terminal A by the primary cell, and transmits the uplink signal and controls the uplink transmission power on the terminal B by the secondary cell. That is, the base station 101 can perform dynamic uplink transmission power control on the terminal 102 by configuring the power correction value of the TPC command (transmission power control command) in the primary cell to a first value and configuring the power correction value of the TPC command in the secondary cell to a second value. That is, the base station 101 can perform power correction (power control) by the TPC command for each cell on the terminal 102. The base station 101 may configure the first value such that the power correction value thereof is greater than the second value. Here, the UL TPC means transmission of the uplink signal with appropriate transmission power in accordance with a communication environment. That is, the UL TPC means that the base station 101 configures parameters relating to appropriate uplink power control based on the uplink channel measurement result and the CSI feedback from the terminal 102 and provides information on the parameter to the terminal 102. In addition, the UL TPC means that the base station 101 selects one of the plurality of parameters relating to the uplink power control for the terminal 102 and transmits the uplink signal with appropriate transmission power.

In one example, a case where a downlink subframe is split into a first subset (first subframe subset) and a second subset (second subframe subset). Incidentally, when the terminal 102 receives an uplink grant in subframe n (n is a natural number), the terminal 102 transmits an uplink signal in a subframe n+4, and therefore, it is considered that the uplink subframe is also inevitably split into the first subset and the second subset. When downlink subframes 0 and 5 are classified into the first subset, and the downlink subframes 1, 2, 3, 4, 6, 7, 8 and 9 are classified into the second subset, for example, uplink subframes 4 and 9 are inevitably classified into the first subset and the uplink subframes 0, 1, 2, 3, 5, 6, 7, and 8 are classified into the second subset. If a downlink subframe index which has detected the uplink grant is included in the first subset in this case, the terminal 102 calculates the first pathloss and the first uplink transmission power based on the first measurement target configuration and the parameter configuration relating to the uplink power control. If the downlink subframe index which has detected the uplink grant is included in the second subset, the terminal 102 calculates the second pathloss and the second uplink transmission power based on the second measurement target configuration and the parameter configuration relating to the uplink power control. That is, the terminal 102 can control whether to transmit the uplink signal with the first uplink transmission power or whether to transmit the uplink signal with the second uplink transmission power depending on which of the first subset and the second subset the downlink subframe which has detected the uplink grant is included in.

In addition, the first subset can be configured of downlink subframes including a physical broadcasting channel (PBCH: Physical Broadcast Channel), a first synchronization signal (PSS: Primary Synchronization Signal), and a second synchronization signal (SSS: Secondary Synchronization Signal). In addition, the second subset may be configured of subframes which do not include the PBCH, the PSS, and the SSS.

From another point of view, when the terminal 102 communicating with the base station 101 is referred to as a terminal A and the terminal 102 communicating with the RRH 103 is referred to as a terminal B, for example, dynamic uplink signal transmission control for the terminal A is performed only in the first subframe subset, and the dynamic uplink signal transmission control for the terminal B is performed only in the second subframe subset. That is, the base station 101 allows the uplink grant to be included in the first subframe subset and provides the uplink grant to the terminal 102 when it is desirable to cause the terminal 102 to transmit the uplink signal to the base station 101, and allows the uplink grant to be included in the second subframe subset and provides the uplink grant to the terminal 102 when it is desirable to cause the terminal 102 to transmit the uplink signal to the RRH 103. Furthermore, the base station 101 can control the transmission power of the uplink signal directed to the base station 101 or the RRH 103 by utilizing a TPC command which is a correction value of the uplink signal transmission power control included in the uplink grant. The base station 101 configures a value of the TPC command included in the uplink grant for the base station 101 or for the RRH 103 by the subframe subset which provides the uplink grant. That is, the base station 101 configures the power correction value of the TPC command in the first subframe subset to be high when it is desirable to increase the uplink transmission power to the base station 101, and configures the power correction value of the TPC command in the second subframe subset to be low when it is desirable to decrease the uplink transmission power to the RRH 103. The base station 101 transmits the uplink signal and controls the uplink transmission power on the terminal A by the first subframe subset, and transmits the uplink signal and controls the uplink transmission power on the terminal B by the second subframe subset. That is, the base station 101 can perform dynamic uplink transmission power control on the terminal 102 by configuring the power correction value of the TPC command (transmission power control command) included in the first subframe subset to a first value and configuring the power correction value of the TPC command included in the second subframe subset to a second value. The base station 101 may configure the first value such that the power correction value thereof is greater than the second value. That is, the base station 101 can independently perform the power correction (power control) on the terminal 102 by the TPC command for each subframe subset.

In one example, if the terminal 102 detects the DCI format (uplink grant, for example) in the first control channel region, the first pathloss and the first uplink transmission power are calculated based on the first measurement target configuration and the parameter configuration relating to the uplink power control. If the terminal 102 detects the uplink grant in the second control channel, the second pathloss and the second uplink transmission power are calculated based on the second measurement target configuration and the parameter configuration relating to the uplink power control. That is, the terminal 102 can control whether to transmit the uplink signal with the first uplink transmission power or whether to transmit the uplink signal with the second uplink transmission power from the control channel region in which the uplink grant has been detected.

From another point of view, when the terminal 102 communicating with the base station 101 is referred to as a terminal A and the terminal 102 communicating with the RRH 103 is referred to as a terminal B, for example, dynamic uplink signal transmission control for the terminal A is performed only in the first control channel (PDCCH) region, and dynamic uplink signal transmission control for the terminal B is performed only in the second control channel (E-PDCCH). That is, the base station 101 allows the uplink grant to be included in the first control channel region and provides the uplink grant to the terminal 102 when it is desirable to cause the terminal 102 to transmit the uplink signal to the base station 101, and allows the uplink grant to be included in the second control channel region and provides the uplink grant to the terminal 102 when it is desirable to cause the terminal 102 to transmit the uplink signal to the RRH 103. Furthermore, the base station 101 can perform the transmission power control of the uplink signal directed to the base station 101 or to the RRH 103 y utilizing the TPC command which is a correction value of the transmission power control of the uplink signal included in the uplink grant. The base station 101 configures a value of the TPC command included in the uplink grant for the base station 101 or for the RRH 103 by the control channel region in which the uplink grant is provided. That is, the base station 101 configures the power correction value of the TPC command in the first control channel region to be higher when it is desirable to increase the uplink transmission power to the base station 101 and configures the power correction value of the TPC command in the second control channel region to be low when it is desirable to decrease the uplink transmission power to the RRH 103. The base station 101 transmits the uplink signal by the first control channel region and controls the uplink transmission power for the terminal A, and transmits the uplink signal and controls the uplink transmission power by the second control channel for the terminal B. That is, the base station 101 can perform the dynamic uplink transmission power control on the terminal 102 by configuring the power correction value of the TPC command (transmission power control command) in the first control channel region to a first value and configuring the power correction value of the TPC command in the second control channel to a second value. The base station 101 may configure the first value such that the power correction value there is greater than the second value. That is, the base station 101 can perform the power correction (power control) by the TPC command on the terminal 102 based on the control channel region where the DCI format (uplink grant, for example) is set.

According to the third embodiment, the base station 101 provides a radio resource control signal including the first measurement target configuration and the second measurement target configuration to the terminal 102 and provides a ratio resource control signal including the parameter configuration relating to the uplink power control to the terminal 102. In addition, the terminal 102 calculates the first pathloss and the first uplink transmission power based on the first measurement target included in the first measurement target configuration and the parameter configuration relating to the uplink power control, calculates the second pathloss and the second uplink transmission power based on the second measurement target included in the second measurement target configuration and the parameter configuration relating to the uplink power control, and transmits the uplink signal to the base station 101 with the first uplink transmission power or the second uplink transmission power.

Description will be given with reference to FIG. 1. It is assumed that the base station 101 and the RRH 103 perform carrier aggregation, have two carrier components (Carrier Components, CCs, Cells) with different center frequencies in both the uplink and the downlink, and perform communication. It is assumed that these are referred to as a first carrier component and a second carrier component, and the base station 101 and the RRH 103 use these carrier components and can perform individual communication and cooperative communication. It is assumed that the first carrier component is used for communication between the base station 101 and the terminal 102, and the second carrier component is sued for communication between the RRH 103 and the terminal 102. That is, the downlink 105 or the uplink 106 is connected with the first carrier component, and the downlink 107 or the uplink 108 is connected with the second carrier component. At this time, the terminal can perform transmission to the uplink 106 via the first carrier component with the first uplink transmission power if the terminal 102 detects the uplink grant from the downlink 105 through the first carrier component, and can perform transmission to the uplink 108 through the second carrier component with the second uplink transmission power if the terminal 102 detects the uplink grant from the downlink 107 through the second carrier component. In addition, if a carrier indicator is included in the detected uplink grant, the terminal 102 may calculate the pathloss and the uplink transmission power by using a pathloss reference resource associated with the carrier (cell, primary cell, secondary cell, serving cell index) indicated by the carrier indicator.

In addition, the base station 101 can control so as to perform the uplink transmission power control appropriate for the terminal 102 by scheduling the terminal 102 communicating with the base station 101 and the terminal 102 communicating with the RRH 103 with different carrier components and performing the first or second measurement target configuration on each carrier component. In addition, the scheduling includes resource assignment of the downlink signal or the uplink signal to the terminal 102 (time frequency resource assignment).

In the aperiodic SRS (A-SRS), various DCI formats and measurement targets configured in the measurement target configuration may be associated. That is, the terminal 102 calculates the first pathloss by the first measurement target configured in the first measurement target configuration and calculates first A-SRS transmission power based on the first pathloss when the terminal 102 detects an SRS request, which indicates an A-SRS transmission request, in a first DCI format, or calculates the second pathloss by the second measurement target configured in the second measurement target configuration, calculates second A-SRS transmission power based on the second pathloss, and transmits the A-SRS with the aforementioned A-SRS transmission power when the terminal 102 detects the SRS request, which indicates an A-SRS transmission request, in a second DCI format. In addition, the pathloss reference resource and the measurement target configured in the measurement target configuration may be associated in advance. Moreover, the DCI format and the measurement target configured in the measurement target configuration may be associated with each other. The associated information may be provided as system information (SI: System Information).

In addition, the aforementioned associated information may be provided to each terminal 102 by the RRC signal. Moreover, the aforementioned associated information may be provided to each terminal 102 by the RRC message. Moreover, the information indicating association between the first and second DCI formats and the first and second measurement target configuration may be provided to each terminal 102 by the RRC signal. Moreover, information indicating measurement target configuration shift which is the same or different between the first DCI format and the second DCI format may be provided to each terminal 102 by the RRC signal. That is, it is also possible to associate the measurement target configuration of the first DCI format with that of the second DCI format by the aforementioned information indicating the shift.

Here, the first DCI format and the second DCI format may be different kinds of DCI formats. That is, a DCI format 0 may be configured as the first DCI format, and a DCI format 1A may be configured as the second DCI format. In addition, a DCI format 2B may be configured as the first DCI format, and a DCI format 2C may be configured as the second DCI format. Moreover, the DCI format 0 may be configured as the first DCI format, and a DCI format 4 may be configured as the second DCI format.

In addition, the first DCI format and the second DCI format may be the same kind of DCI formats. However, values (or indexes) configured in control information fields included in the DCI formats are different. For example, an SRS request included in the DCI format 4 is represented by two-bit information. Here, it is assumed that the two-bit information is associated with indexes 0 to 3. Thus, the first DCI format can be configured as the DCI format 4 for which an index '1' of the SRS request has been indicated, and the second DCI format can be configured as the DCI format 4 for which an index '2' of the SRS request has been indicated. In addition, the index of the SRS request may be associated with the aforementioned SRS parameter set. That is, the base station 101 can indicate the terminal 102 about a fact that an SRS for which a predetermined parameter has been configured is to be transmitted, by selecting an index of the SRS request.

Description will be given with reference to FIG. 1. The terminal 102 configures an uplink subframe subset (uplink subset, subframe subset) for transmitting the uplink signal to the base station 101 and an uplink subframe subset (uplink subset, subframe subset) for transmitting the uplink signal to the RRH 103. That is, the terminal 102 is controlled such that the uplink signal transmitted from the terminal 102 does not function as a source of interference with another terminal 102, by differentiating the transmitting timing of the uplink signal to the base station 101 from the transmitting timing of the uplink signal to the RRH 103. Here, if it is assumed that the subframe subset for transmitting the uplink signal to the base station 101 is referred to as a first subset, and the subframe subset for transmitting the uplink signal to the RRH 103 is referred to as a second subset, the terminal 102 transmits the uplink 106 with the first subset and transmits the uplink 108 with the second subset. The terminal 102 can calculate the first pathloss and the first uplink transmission power by using the first measurement target configuration and the parameter configuration relating to the uplink power when the terminal 102 transmits the uplink signal with the first subset, and can calculate the second pathloss and the second uplink transmission power by using the second measurement target configuration and the parameter configuration relating to the uplink power control when the uplink signal is transmitted with the second subset.

In addition, the base station 101 can configure uplink transmission power appropriate for the uplink 106 or the uplink 108 in the terminal 102 by differentiating (subframe subset) a communication timing between the base station 101 and the terminal 102 from a communication timing between the RRH 103 and the terminal 102 (subframe subset), and appropriately controlling the uplink transmission power on each subset. That is, the base station 101 can cause the terminal 102 to independently control transmission power for each subframe subset.

Description will be given with reference to FIG. 1. The terminal 102 can determine transmission timing by the uplink 106 or the uplink 108 at a timing when the DCI format (uplink grant, for example) is detected, depending on which of the first control channel region and the second control channel region the control channel region where the uplink grand has been detected is. That is, the terminal 102 can transmit the uplink signal with the first uplink transmission power in the subframe n+4 to the base station 101 when the terminal 102 detects the uplink grant in the first control channel region of the subframe n. In addition, the terminal 102 can transmits the uplink signal with the second uplink transmission power in the subframe n+5 to the RRH 103 when the terminal 102 detects the uplink grant in the second control channel in the subframe n+1.

The terminal 102 can transmit the uplink signal with the first uplink transmission power to the uplink 106 when the terminal 102 detects the uplink grant in the first control channel region, and can transmit the uplink signal with the second uplink transmission power to the uplink 108 when the terminal 102 detects the uplink grant in the second control channel region.

In addition, the base station 101 can configure uplink transmission power appropriate for the uplink 106 or the uplink 108 in the terminal 102 by appropriately scheduling the uplink grant in the first control channel region and the second control channel region in the downlink 105 and the downlink 107.

Since the terminal 102 can separate the uplink transmission to the base station 101 from the uplink transmission to the RRH 103 depending on a frequency resource and a timing at which the uplink grant is detected as described above, it is possible to control the terminals 102 so as not to function as a source of interference with the other terminal 102 even if the terminals with greatly different uplink transmission power are configured.

As described above, the terminal 102 can perform the A-SRS transmission to the base station 101 or the RRH 103 depending on the kind of the DCI format including the SRS request. In addition, the base station 101 can simultaneously control a plurality of terminals 102 with different A-SRS transmission power.

Modification Example 1 of Third Embodiment

Next, description will be given of Modification Example 1 of the third embodiment. According to Modification Example 1 of the third embodiment, the base station 101 can designate a reference signal (a cell-specific reference signal or a channel-state information reference signal, for example) used in calculating pathloss and a resource (or an antenna port) of the measurement target for parameter configuration relating to the uplink power control. In addition, the reference signal used in calculating pathloss may be represented as the information relating to the first measurement target configuration or the information relating to the second measurement target configuration described in the first embodiment or the second embodiment. Hereinafter, detailed description will be given of a method for configuring the reference signal used in calculating pathloss and the resource of the measurement target.

It is assumed that the base station 101 and the RRH 103 performs carrier aggregation, have two carrier components (Carrier Components, CCs, Cells) with different center frequencies for both the uplink and the downlink, and perform communication. These are referred to as a first carrier component and a second carrier component, and it is assumed that the base station 101 and the RRH 103 can perform individual communication and cooperative communication by using the se carrier components. In addition, the base station 101 can configure the first carrier component as a primary cell and the second carrier component as a secondary cell. The base station 101 can designate a resource of the reference signal used in calculating pathloss by using an index or the like as the pathloss reference resources for the primary cell and the secondary cell. Here, the pathloss reference resource represents information elements indicating a resource (or an antenna port) of the reference signal and a measurement target used (used as a reference) in calculating pathloss, and corresponds to the measurement target configured in the first measurement target configuration or the second measurement target configuration described in the first embodiment or the second embodiment. Thus, the base station 101 may associate the pathloss used in calculating the uplink transmission power with the measurement target (the reference signal and the antenna port index or the measurement index) used in the calculation thereof by the pathloss reference resource. In addition, the pathloss reference resource may be the antenna port index 0 of the cell-specific refrence signal or the CSI-RS antenna port (or the CSI-RS measurement index) of the channel-state information reference signal described in the first embodiment or the second embodiment. More specifically, the pathloss reference resource may indicate the antenna port index 0 of the cell-specific reference signal when the index designated by the pathloss reference resource is 0, and the pathloss reference resource may be associated with the CSI-RS measurement index or the CSI-RS antenna port index of the channel-state information reference signal in the case of the other values. Furthermore, the aforementioned pathloss reference resource may be associated with pathlossReference (pathlossReference-r10) described with reference to FIG. 22. That is, the pathloss calculation may be performed based on the resource corresponding to the CSI-RS measurement index 1 included in the second carrier component, and the uplink transmission power may be calculated when the second carrier component (SCell, secondary cell) is designated by pathlossReference (pathlossReference-r10) and the CSI-RS measurement index 1 of the channel-state information reference signal is designated by the pathloss reference resource. In another example, the pathloss may be calculated based on the resource corresponding to the CSI-RS measurement index 1 included in the first carrier component, and the uplink transmission power may be calculated when the first carrier component (PCell, primary cell) is designated by pathlossReference (pathlossReference-r10) and the CSI-RS measurement index 1 of the channel-state information reference signal is designated by the pathloss reference resource. In addition, the terminal 102 may calculate the pathloss and the uplink transmission power by using the pathloss reference resource associated with a carrier (cell, primary cell, secondary cell, serving cell index) indicated by a carrier indicator when the carrier indicator is included in the detected uplink grant.

By following the aforementioned procedure, the terminal 102 can calculate the pathloss based on the content of the pathloss reference resource, the information of which is provided by the base station 101, and calculate the uplink transmission power based on the pathloss and the parameter configuration relating to the uplink power control.

Figure 24:
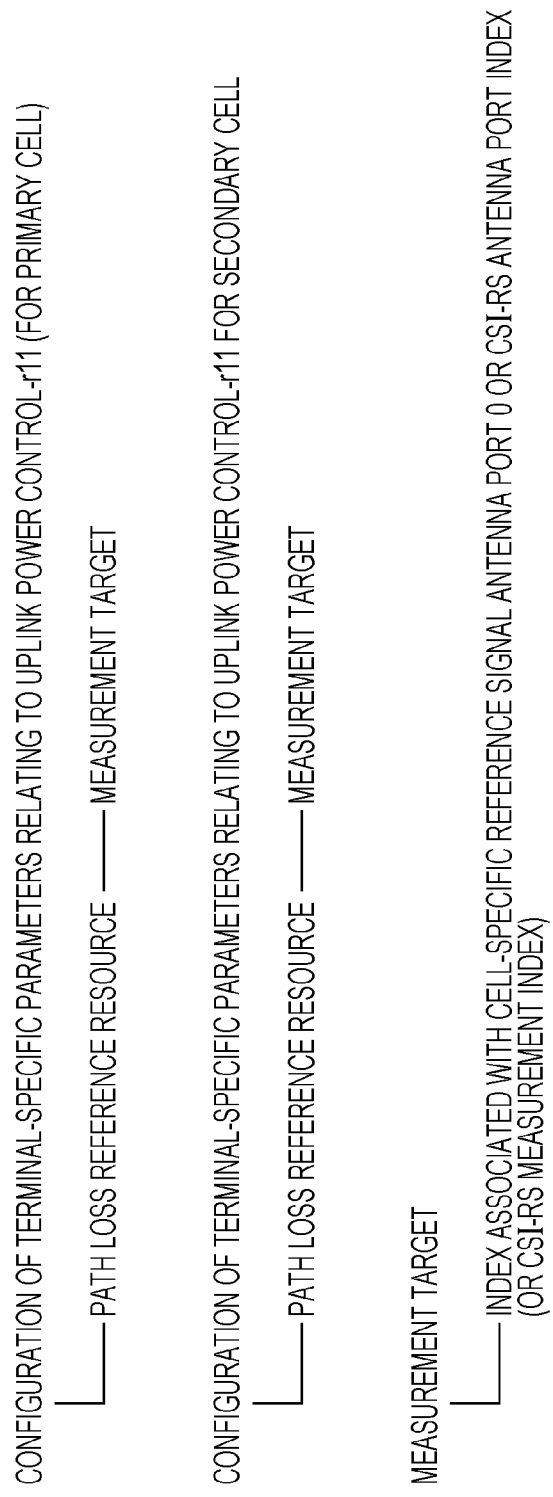
FIG. 24 is a diagram illustrating a detail of a pathloss reference resource.

FIG. 24 is a diagram showing a detail of the pathloss reference resource. The pathloss reference resource is an information element to be added to the parameter configuration relating to (primary cell) terminal-specific uplink power control and the parameter configuration relating to secondary cell terminal-specific uplink power control. In addition, a downlink reference signal (measurement target) used in pathloss measurement configured in the measurement target configuration is designated by the pathloss reference resource. The base station 101 can designate the measurement target designated by the measurement target configuration described in the first embodiment or the second embodiment for the terminal 102 by using the pathloss reference resource. That is, the base station 101 can select a measurement resource to be used in the pathloss measurement of the primary cell (first carrier component, PCell) and the secondary cell (second carrier component, SCell) from among measurement targets configured in the measurement target configuration, and the terminal 102 can perform pathloss calculation for calculating the uplink transmission power in the primary cell and the secondary cell in accordance with the indication thereof and set the uplink transmission power to the primary cell or the secondary cell based on the pathloss and the parameter configuration relating to the uplink power control.

From another point of view, when the terminal 102 communicating with the base station 101 is referred to as a terminal A, and the terminal 102 communicating with the RRH 103 is referred to as a terminal B, for example, dynamic uplink signal transmission control for the terminal A is performed only by the primary cell, and the dynamic uplink signal transmission control for the terminal B is performed only by the secondary cell. That is, the base station 101 allows the uplink grant to be included in the primary cell and provides the uplink grant to the terminal 102 when it is desirable to cause the terminal 102 to transmit the uplink signal to the base station 101, and allows the uplink grant to be included in the secondary cell and provides the uplink grant to the terminal 102 when it is desirable to cause the terminal 102 to transmit the uplink signal to the RRH 103. Furthermore, the base station 101 can perform the transmission power control of the uplink signal to the base station 101 or the RRH 103 by utilizing a TPC command as a correction value of the transmission power control of the uplink signal included in the uplink grant. The base station 101 configures the value of the TPC command included in the uplink grant for the base station 101 or the RRH 103 by the cell (carrier component, component carrier) which provides the uplink grant. That is, the base station 101 configures a power correction value of the TPC command in the primary cell to be higher when it is desirable to increase the uplink transmission power to the base station 101 and configures a power correction value of the TPC command in the secondary cell to be low when it is desirable to decrease the uplink transmission power to the RRH 103. The base station 101 transmits the uplink signal and controls the uplink transmission power by the primary cell for the terminal A, and transmits the uplink signal and controls the uplink transmission power by the secondary cell for the terminal B. That is, the base station 101 can perform the uplink transmission power control on the terminal 102 by configuring the power correction value of the TPC command (transmission power control command) in the primary cell to a first value and configuring the power correction value of the TPC command in the secondary cell to a second value. At this time, the first value and the second value may be differently configured. In addition, the base station 101 may configure the first value such that the power correction value thereof is greater than the second value. That is, the base station 101 may perform the power correction (power control) by the TPC command independently for each cell. In addition, the terminal 102 can perform the power correction (power control) by the TPC command independently for each cell.

Figure 25:
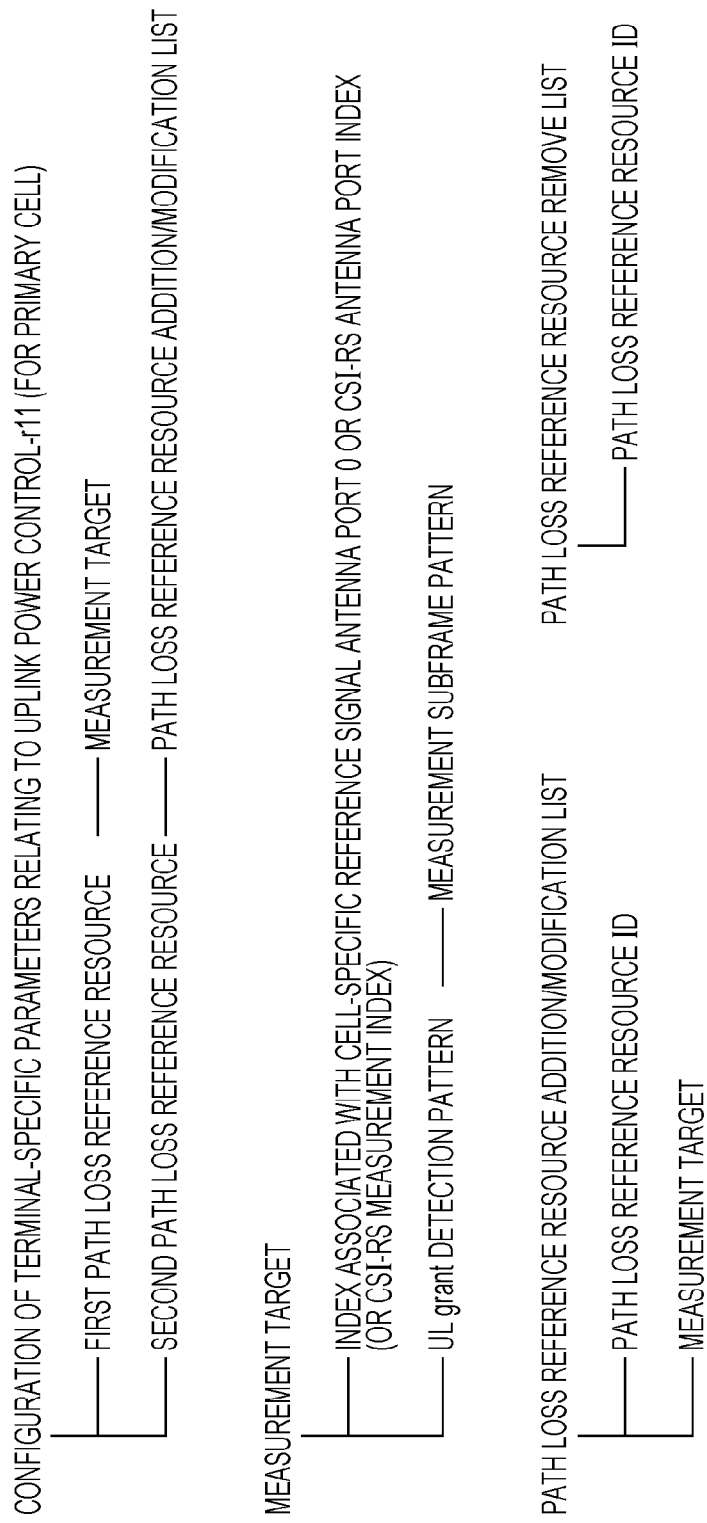
FIG. 25 is a diagram illustrating a detail of the pathloss reference resource at timing when the terminal 102 detects an uplink grant.

FIG. 25 is a diagram illustrating a detail of the pathloss reference source at a timing when the terminal 102 detects the uplink grant. The base station 101 can configure two or more pathloss reference resources (first pathloss reference resource, second pathloss reference resource) for the terminal 102. Here, the second pathloss reference resource is a parameter which can be added as needed by the addition/modification list. The pathloss reference resource is associated with the measurement target configured in the measurement target configuration. For example, an uplink grant detection subframe subset (uplink grant detection pattern) is configured as the measurement target, and if the uplink grant is detected in the downlink subframe included in the uplink grant detection pattern, then the terminal 102 calculates the pathloss by using the measurement target associated with the uplink grant detection subframe subset and sets the uplink transmission power based on the pathloss. That is, the terminal 102 associates the uplink grant detection subframe subset with the pathloss reference resource when a plurality of pathloss reference resources (first pathloss reference resource and second pathloss reference resource) are configured. More specifically, the first pathloss reference resource and the first subframe subset are associated. In addition, the second pathloss reference resource and the second subframe subset are associated. Furthermore, measurement target configuration, based on which the uplink transmission power is calculated, is selected from the pathloss reference resources, and the uplink transmission power is calculated based on pathloss calculated based on the received signal power as the measurement target designated in the measurement target configuration. In one example, the first pathloss reference resource designates the first measurement target configuration, namely the antenna port 0 of the cell-specific reference signal, and this may be transmitted from the base station 101. In addition, the second pathloss reference resource designates the second measurement target configuration, namely the channel-state information reference signal transmitted from the antenna port 15 and may be transmitted from the RRH 103. Accordingly, when the different measurement targets are used as references based on the subframe in which the uplink grant is detected, and as a result, the uplink signal is detected in the first subframe subset, the transmission power suitable for the base station 101 is configured. When the plink signal is detected in the second subframe subset, the transmission power suitable for the RRH 103 is configured. That is, it is possible to shift the measurement targets used in calculating the pathloss at the timing when the uplink grant is detected and appropriately perform the uplink transmission power control.

The second pathloss reference resource means a pathloss reference resource which can be added from the pathloss reference resource addition/modification list. That is, the base station 101 can define a plurality of pathloss reference resources for a single cell (primary cell, for example). The base station 101 can indicate the terminal 102 to simultaneously calculate the pathloss for the plurality of pathloss reference resources. In addition, when the second pathloss reference resource is added, the second pathloss reference resource can be added as needed by configuring a pathloss reference resource ID and a measurement target by the pathloss reference resource addition/modification list. If it is not necessary to calculate the pathloss for the plurality of pathloss reference resources, it is possible to remove unnecessary pathloss reference resources by the pathloss reference resource remove list. A method of calculating the second pathloss in this case will be exemplified. The second pathloss reference resource designates a plurality of kinds of first measurement target configuration or second measurement target configuration, for example, channel-state information reference signals transmitted from the antenna port 15, the antenna port 16, and the like in the pathloss reference resource addition/modification list in some cases. In such a case, the second pathloss may be calculated based on the received signal power of the channel-state information reference signals transmitted from the antenna port 15 and the antenna port 16. In such a case, an average of the pathloss calculated from the channel-state information reference signal transmitted from the antenna port 15 and the pathloss calculated from the channel-state information reference signal transmitted from the antenna port 16 may be calculated and regarded as the second pathloss. In addition, a smaller or a larger one of the two pathloss values may be selected and regarded as the second pathloss. In addition, linear processing may be performed on the two pathloss values and the second pathloss may be obtained. The above configuration may be applied to the antenna port 0 of the cell-specific reference signal and the antenna port 15 of the channel-state information reference signal. In another example, the second pathloss reference resource designates a plurality of kinds of second measurement target configuration in the pathloss reference resource addition/modification list, namely designates the channel-state information reference signals transmitted from the antenna port 15, the antenna port 16, and the like in some cases. In such a case, the second pathloss and the third pathloss may be calculated based on the received signal power of the channel-state information reference signals transmitted from the antenna port 15, the antenna port 16, and the like. In such a case, the first pathloss, the second pathloss, and the third pathloss may be associated with the first subframe subset, the second subframe subset, and the third subframe subset, respectively.

In addition, the measurement targets included in the first pathloss reference resource and the second pathloss reference resource may be the antenna port 0 of the cell-specific reference signal or the CSI-RS antenna port index (CSI-RS measurement index) described in the first embodiment or the second embodiment.

Moreover, the measurement targets may include the uplink grant detection pattern. As the uplink grant detection pattern, a measurement subframe pattern (MeasSubframe-Pattern-r10) included in the measurement object EUTRA in the measurement objects in FIG. 14 may be utilized. In addition, the uplink grant detection pattern is referred to as a DCI format detection pattern in some cases.

Although the measurement targets and the uplink grant detection pattern are associated herein, the uplink grant detection pattern may not be included in the measurement targets, and the measurement targets and a measurement report transmission timing may be associated in another example. That is, the terminal 102 may associate measurement results of the measurement targets with the subframe pattern, the information of which is to be provided to the base station 101, and if the uplink grant is detected in the downlink subframe associated with the subframe pattern, then the terminal 102 can calculate the pathloss by the measurement targets and calculate the uplink transmission power.

Although the description was given of the case of the addition to the parameter configuration relating to the primary cell terminal-specific uplink power control herein, it is also possible to add the similar configuration to the secondary cell. However, the pathloss reference (pathlossReference-r10) has been configured in the case of the secondary cell, and the pathloss calculation is performed based on a reference signal included in one of the primary cell and the secondary cell. That is, when the primary cell is selected, the pathloss calculation is performed based on the pathloss reference resource of the parameter configuration relating to the primary cell terminal-specific uplink power control. In addition, when the secondary cell is selected, the pathloss calculation is performed based on the pathloss reference resource of the parameter configuration relating to the secondary cell terminal-specific uplink power control. Furthermore, the aforementioned pathloss reference resource may be associated with the pathloss reference (pathlossReference-r10). That is, when the second carrier component (SCell, secondary cell) is designated by the pathloss reference (pathlossReference-r10), and the CSI-RS measurement index 1 of the channel-state information reference signal is designated by the pathloss reference resource, the uplink transmission power may be set by performing the pathloss calculation based on the resource corresponding to the CSI-RS measurement index 1 included in the second carrier component. In another example, when the first carrier component (PCell, primary cell) is designated by the pathloss reference (pathlossReference-r10), and the CSI-RS measurement index 1 of the channel-state information reference signal is designated by the pathloss reference resource, the uplink transmission power may be set by performing the pathloss calculation based on the resource corresponding to the CSI-RS measurement index 1 included in the first carrier component.

From another point of view, when the terminal 102 communicating with the base station 101 is referred to as a terminal A, and the terminal 102 communicating with the RRH 103 is referred to as a terminal B, for example, dynamic uplink signal transmission control for the terminal A is performed only by the first subframe subset, and dynamic uplink signal transmission control for the terminal B is performed only by the second subframe subset. That is, the base station 101 allows the uplink grant to be included in the first subframe subset and provides the uplink grant to the terminal 102 when it is desirable to cause the terminal 102 to transmit the uplink signal to the base station 101, and allows the uplink grant to be included in the second subframe subset and provides the uplink grant to the terminal 102 when it is desirable to cause the terminal 102 to transmit the uplink signal to the RRH 103. Furthermore, the base station 101 can perform the transmission power control of the uplink signal to the base station 101 or the RRH 103 by utilizing a TPC command as a correction value of the transmission power control of the uplink signal included in the uplink grant. The base station 101 configures a value of the TPC command included in the DCI format for the base station 101 or the RRH 103 by the subframe subset which provides the DCI format (the uplink grant, for example). That is, the base station 101 configures a power correction value of the TPC command in the first subframe subset to be higher when it is desirable to increase the uplink transmission power to the base station 101, and configures the power correction value of the TPC command in the second subframe subset when it is desirable to decrease the uplink transmission power to the RRH 103. The base station 101 transmits the uplink signal and controls the uplink transmission power by the first subframe subset for the terminal A, and transmits the uplink signal and controls the uplink transmission power by the second subframe subset for the terminal B. That is, the base station 101 can perform the uplink transmission power control on the terminal 102 by configuring the power correction value of the TPC command (transmission power control command) included in the first subframe subset to a first value and configuring the power correction value of the TPC command included in the second subframe subset to a second value. At this time, the first value and the second value may be differently configured. In addition, the base station 101 may configure the first value such that the power correction value thereof is greater than the second value. That is, the base station 101 may perform the power correction (power control) by the TPC command for each subframe subset. In addition, the terminal 102 can perform the power correction (power control) by the TPC command for each subframe subset.

Figure 26:
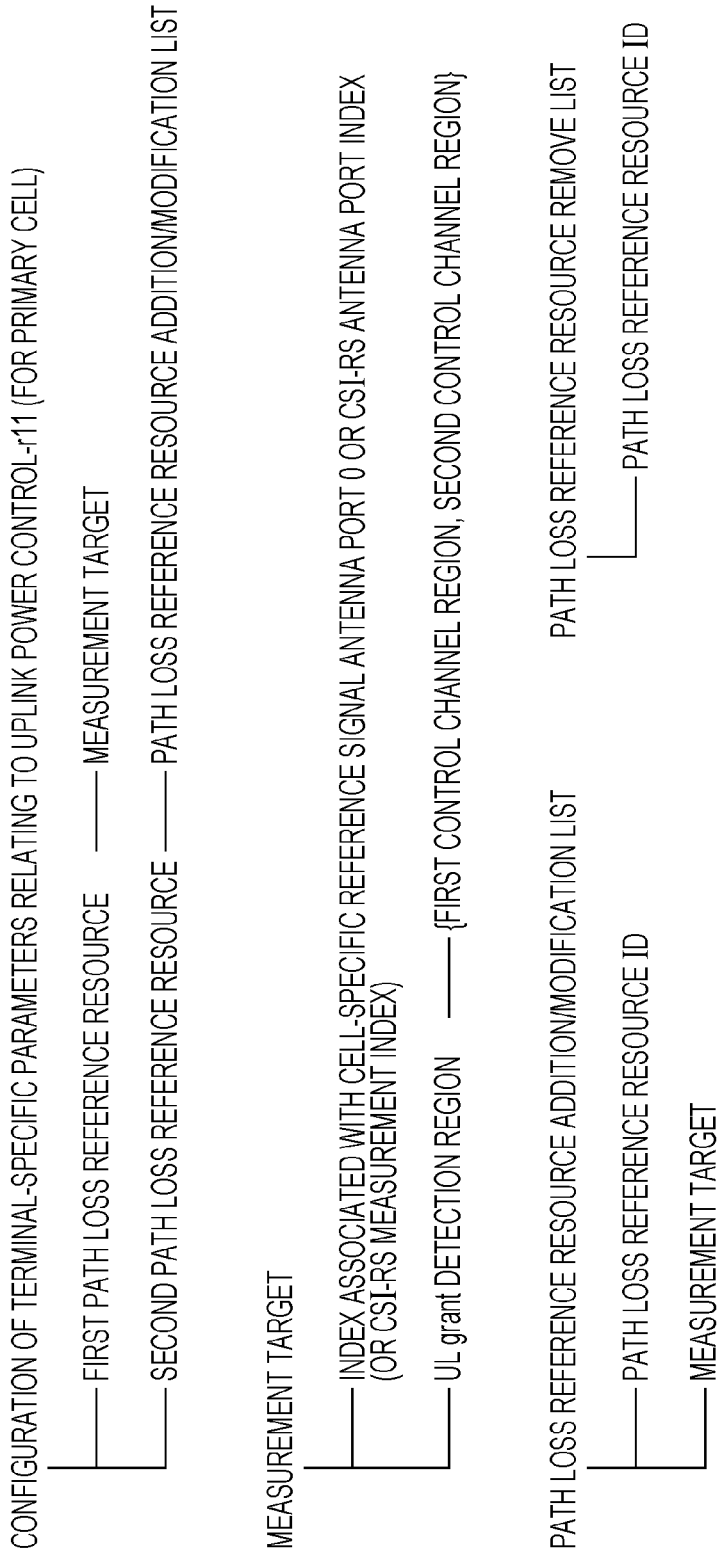
FIG. 26 is a diagram illustrating a detail of the pathloss reference resource in a control channel region where the terminal 102 detects the uplink grant.

FIG. 26 is a diagram illustrating a detail of the pathloss reference resource by the control channel region where the terminal 102 detects the DCI format (the uplink grant, for example). In the same manner as in FIG. 25, the base station 101 can configure two or more pathloss reference resources (first pathloss reference resource, second pathloss reference resource) for the terminal 102. Here, the second pathloss reference resource is a parameter which can be added as needed by the addition/modification list. The pathloss reference resources are associated with the measurement targets configured in the measurement target configuration. For example, uplink grant detection regions (first control channel region, second control channel region) are configured as the measurement targets, and if the uplink grant is detected in a downlink control channel region included in the uplink grant detection regions, then the terminal 102 calculates pathloss by using the measurement targets associated with the uplink grant detection regions and calculates the uplink transmission power based on the pathloss. That is, when a plurality of pathloss reference resources (the first pathloss reference resource and the second pathloss reference resource) are configured, the terminal 102 associates the uplink grant detection regions with the pathloss reference resources. More specifically, the first pathloss reference resource and the first control channel region are associated. In addition, the second pathloss reference resource is associated with the second control channel region. Furthermore, measurement target configuration, based on which the uplink transmission power is to be calculated, is selected from the pathloss reference resources, and the uplink transmission power is calculated based on the pathloss calculated based on the received signal power of the measurement target designated in the measurement target configuration. With such a configuration, the terminal 102 can transmits the uplink signal with the uplink transmission power calculated in accordance with the measurement target in the region where the uplink grant has been detected. Furthermore, a method for calculating the second pathloss when a plurality of kinds of second measurement target configuration is associated with the second pathloss reference resource will be exemplified. The second pathloss reference resource designates a plurality of first or second measurement target configurations, for example, the antenna ports 15 and 16 of the channel-state information reference signal are designated in the pathloss reference resource addition/modification list in some cases. In such a case, the second pathloss may be calculated based on the received power of the channel-state information reference signal transmitted from the antenna port 15 and of the channel-state information reference signal transmitted from the antenna port 16. In such a case, an average of the pathloss calculated from the channel-state information reference signal transmitted from the antenna port 15 and the pathloss calculated from the channel-state information reference signal transmitted from the antenna port 16 may be calculated and regarded as the second pathloss, or a larger or smaller one of the two pathloss values may be selected and regarded as the second pathloss. Moreover, linear processing may be performed on the two pathloss values, and the second pathloss may be obtained. In addition, the above configuration may be applied to the cell-specific reference signal transmitted from the antenna port 0 and the channel-state information reference signal transmitted from the antenna port 15. In still another example, the second pathloss reference source designates a plurality of kinds of second measurement target configuration, namely the channel-state information reference signal transmitted from the antenna port 15, the channel-state information reference signal transmitted from the antenna port 16, and the like in the pathloss reference resource addition/modification list in some cases. In such a case, the second pathloss and the third pathloss may be calculated based on the receive power of the channel-state information reference signals transmitted from the antenna port 15 and the antenna port 16. In such a case, the first pathloss, the second pathloss, and the third pathloss may be associated with the first subframe subset, the second subframe subset, and the third subframe subset, respectively. That is, the pathloss may be calculated based on the received power of the reference signals transmitted from one or more antenna ports.

In addition, the pathloss reference resource may be the cell-specific reference signal antenna port 0 or the CSI-RS antenna port index (CSI-RS measurement index) described in the first embodiment or the second embodiment.

From another point of view, when the terminal 102 communicating with the base station 101 is referred to as a terminal A, and the terminal 102 communicating with the RRH 103 is referred to as a terminal B, for example, dynamic uplink signal transmission control for the terminal A is performed only in the first control channel (PDCCH) region, and dynamic uplink signal transmission control for the terminal B is performed only in the second control channel (X-PDCCH) region. That is, the base station 101 allows the uplink grant to be included in the first control channel region and provides the uplink grant to the terminal 102 when it is desirable to cause the terminal 102 to transmit the uplink signal to the base station 101, and allows the uplink grant to be included in the second control channel region and provides the uplink grant to the terminal 102 when it is desirable to cause the terminal 102 to transmit the uplink signal to the RRH 103. Furthermore, the base station 101 can perform the transmission power control of the uplink signal to the base station 101 or the RRH 103 by utilizing the TPC command as a correction value of the transmission power control of the uplink signal included in the uplink grant. The base station 101 configures the value of the TPC command included in the uplink grant for the base station 101 or the RRH 103 by the control signal region in which the uplink grant is provided. That is, the base station 101 configures the power correction value of the TPC command in the first control channel region to be high when it is desirable to increase the uplink transmission power to the base station 101, and configures the power correction value of the TPC command in the second control channel region to be low when it is desirable to decrease the uplink transmission power to the RRH 103. When a plurality of values (first value, second value, and the like) are configured as TPC commands, for example, the base station 101 may be controlled to select the first value as the power correction value of the TPC command in the first subframe subset and select the second value as the power correction value of the TPC command in the second subframe subset in accordance with the communication state. The base station 101 transmits the uplink signal and controls the uplink transmission power by the first control channel region for the terminal A, and transmits the uplink signal and controls the uplink transmission power control by the second control channel for the terminal B. That is, the base station 101 can perform the uplink transmission power control on the terminal 102 by configuring the power correction value of the TPC command (transmission power control command) in the first subframe to a first value and configuring the power correction value of the TPC command in the second subframe subset to a second value. At this time, the base station 101 may configure different values for the first value and the second value. The base station 101 may configure the first value such that the power correction value thereof is greater than the second value. That is, the base station 101 may perform the power correction by the TPC command independently for each subframe subset.

In relation to the aperiodic SRS, a plurality of DCI formats (the first DCI format and the second DCI format in this example) and a plurality of pathloss reference resources (the first pathloss reference resource and the second pathloss reference resource) may be associated. That is, when the SRS request for indicating an A-SRS transmission request is detected in the first DCI format, the terminal 102 calculates the first pathloss based on the first pathloss reference resource, sets first A-SRS transmission power based on the first pathloss. When the SRS request for indicating the A-SRS transmission request is detected in the second DCI format, the terminal 102 calculates the second pathloss based on the second pathloss reference resource, sets second A-SRS transmission power based on the second pathloss, and transmits the A-SRS with the aforementioned A-SRS transmission power. In addition, the pathloss reference resources and the measurement targets configured in the measurement target configuration may be associated in advance. Moreover, the DCI formats and the pathloss reference resources may be associated in advance. The associated information may be broadcasted as system information. In addition, the associated information may be provided to each terminal 102 by the RRC signal. Moreover, the associated information may be provided to each terminal 102 by the RRC message. Moreover, information indicating shift of the pathloss reference resources which are the same or different for the first DCI format and the second DCI format may be provided to each terminal 102 by the RRC signal. That is, it is also possible to associate the first and second DCI formats and the pathloss reference resources by the aforementioned information indicating the shift.

In Modification Example 1 of the third embodiment, the base station 101 provides a radio resource control signal including configuration of parameters relating to the uplink power control which configures the pathloss reference resource to the terminal 102 and provides the DCI format (uplink grant, for example) to the terminal 102. In addition, the terminal 102 calculates the pathloss and the uplink transmission power based on the pathloss reference resource and the configuration of parameters relating to the uplink power control in accordance with the information included in the radio resource control signal and transmits the uplink signal to the base station 101 with the uplink transmission power.

In Modification Example 1 of the third embodiment, the base station 101 provides a radio resource control signal including parameter configuration relating to the uplink power control which configures the first pathloss reference resource and the second pathloss reference resource to the terminal 102. In addition, the terminal 102 calculates the first pathloss based on the first pathloss reference resource, calculates the second pathloss based on the second pathloss reference resource, and sets the uplink transmission power based on the first pathloss or the second pathloss and the information relating to configuration of parameters in relation to the uplink power control.

In Modification Example 1 of the third embodiment, the base station 101 provides a radio resource control signal including configuration of parameters relating to the uplink power control which configures primary cell and secondary cell-specific pathloss reference resources to the terminal 102 and provides the uplink grant to the terminal 102. In addition, the terminal 102 receives the radio resource control signal including the configuration of parameters relating to the uplink power control which configures the primary cell and secondary cell-specific pathloss reference resources, and if the uplink grant is detected in the primary cell, then the terminal 102 calculates the pathloss and the uplink transmission power based on the pathloss reference signal included in configuration of parameters relating to the primary cell terminal-specific uplink power control and configuration of parameters relating to the uplink power control, or if the uplink grant is detected in the secondary cell, then the terminal 102 calculates the pathloss and the uplink transmission power based on the pathloss reference resource included in configuration of parameters relating to the secondary cell terminal-specific uplink power control and configuration of parameters relating to the uplink power control and transmits the uplink signal to the base station 101 with the uplink transmission power which is obtained by calculation for the cell where the uplink grant has been detected.

In Modification Example 1 of the third embodiment, the base station 101 provides a radio resource signal including configuration of parameters relating to the uplink power control which configures the first pathloss reference resource and the second pathloss reference resource to the terminal 102 and provides the uplink grant to the terminal 102. If the uplink grant is detected in the downlink subframe included in the first subframe subset, then the terminal 102 calculates the pathloss and the uplink transmission power based on the first pathloss reference resource and configuration of parameters relating to the uplink power control in accordance with the information included in the radio resource control signal. If the uplink grant is detected in the downlink subframe included in the second subframe subset, then the terminal 102 calculates the pathloss and the uplink transmission power based on the second pathloss reference resource and configuration of parameters relating to the uplink power control and transmits the uplink signal in the uplink subframe included in the subframe subset to the base station 101 with the uplink transmission power.

In Modification Example 1 of the third embodiment, if the uplink grant is detected in the first control channel region, then the terminal 102 calculates the first pathloss and the first uplink transmission power based on the first pathloss reference resource and configuration of parameters relating to the uplink power control. If the uplink grant is detected in the second control channel region, then the terminal 102 calculates the second pathloss and the second uplink transmission power based on the second pathloss reference resource and configuration of parameters relating to the uplink power control and transmits the uplink signal to the base station 101 with the first uplink transmission power or the second uplink transmission power in accordance with the timing when the uplink grant is detected.

A more specific description will be given with reference to FIG. 1. When a plurality of pathloss reference resources (the first pathloss reference resource and the second pathloss reference resource) are configured, the terminal 102 associates the control channel regions where the uplink grants are detected with the pathloss reference resources. More specifically, the first pathloss reference resource is associated with the first control channel region. In addition, the second pathloss reference resource is associated with the second control channel region. Furthermore, measurement target configuration, based on which the uplink transmission power is calculated, is selected from the pathloss reference resources, and the uplink transmission power is set based on the pathloss calculated based on the received signal power of the measurement target designated in the measurement target configuration. In one example, the first pathloss reference resource may designate the first measurement target configuration, namely the antenna port 0 of the cell-specific reference signal, and this may be transmitted from the base station 101. In addition, the second pathloss reference resource designates the second measurement target configuration, namely the antenna port 15 of the channel-state information reference signal, and this may be transmitted from the RRH 103. Accordingly, different measurement targets are used as references depending on the control channel region where the uplink grant is detected, and as a result, transmission power suitable for the base station 101 is set if the uplink signal is detected in the first control channel region, or transmission power suitable for the RRH 103 is set if the uplink signal is detected in the second control channel region. That is, it is possible to shift the measurement target used in the pathloss calculation in accordance with the control channel region where the uplink grant is detected and to appropriately perform the uplink transmission power control. In addition, it is not necessary to provide the aforementioned subframe pattern from the base station 101 to the terminal 102 by referring to the different measurement targets depending on the control channel regions.

In another example, the base station 101 can reconfigure various kinds of configuration of parameters in relation to the uplink power control for the terminal 102 in order to control the uplink transmission power control appropriately for the base station 101 or the RRH 103. As described above, it is necessary for the base station 101 to shift between the pathloss measurement by the first measurement target configuration and the pathloss measurement by the second measurement target configuration in order to perform the uplink transmission control appropriately form the transmission to the base station 101 or the RRH 103. However, when the terminal 102 communicates with only one of the base station and the RRH in the order of several tens of subframes to several hundreds of subframes, and the shift thereof is performed in a quasi-static manner, it is possible to appropriately perform the uplink transmission power control by padding the measurement target configuration (the first measurement target configuration and the second measurement target configuration) and configuration of parameters relating to the pathloss reference resource. That is, it is possible to configure transmission power appropriate for the base station 101 or the RRH 103 by configuring only the first pathloss reference resource shown in FIG. 25 or 26 and performing appropriate configuring.

Modification Example 2 of Third Embodiment

In Modification Example 2 of the third embodiment, a plurality of kinds of configuration of parameters relating to uplink power control are configured, and the terminal 102 can calculate uplink transmission power ($P_{PUSCH}$, $P_{PUCCH}$, $P_{SRS}$) of various uplink signals (PUSCH, PUCCH, SRS) by using the respective parameter configuration relating to the uplink power control.

In Modification Example 2 of the third embodiment, the base station 101 configures information on the plurality of kinds of configuration of parameters relating to the uplink power control (information on configuration of parameters relating the first uplink power control and information on configuration of parameters relating to the second uplink power control) and provides the information to the terminal 102. The terminal 102 calculates pathloss based on the information on configuration of parameters relating to the first uplink power control in accordance with the provided information, and sets uplink transmission power based on the pathloss and the information on configuration of parameters relating to the first uplink power control. In addition, the terminal 102 calculates pathloss based on the information on configuration of parameters relating to the second uplink power control and sets uplink transmission power based on the pathloss and the information on configuration of parameters relating to the second uplink power control. Here, the uplink transmission power set based on the information on configuration of parameters relating to the first uplink power control is referred to as first uplink transmission power, and the uplink transmission power set based on the information on configuration of parameters relating to the second uplink power control is referred to as second uplink transmission power.

The terminal 102 controls whether to transmit the uplink signal with the first uplink transmission power or whether to transmit the uplink signal with the second uplink transmission power depending on a frequency resource or a timing at which the DCI format (the uplink grant, for example) is detected.

The base station 101 may individually configure information elements respectively included in configuration of parameters relating to the first uplink power control and configuration of parameters relating to the second uplink power control. A specific description will be given with reference to FIGS. 27 to 30, for example. FIG. 27 is a diagram illustrating an example of configuration of parameters relating to the second uplink power control according to the embodiment of the present application. The configuration of parameters relating to the second uplink power control is configured of configuration of cell-specific parameter relating to second uplink power control-r11 (for the primary cell), configuration of cell-specific parameters relating to the second uplink power control-r11 for the secondary cell, configuration of terminal-specific parameters relating to second uplink power control-r11 (for the primary cell), and configuration of terminal-specific parameters relating to the second uplink power control-r11 for the secondary cell. In addition, configuration of parameters relating to the first uplink power control is the same as those shown in FIGS. 22 and 24. In this embodiment of the present application, configuration of parameters relating to the first cell-specific uplink power control-r11 (for the primary cell), configuration of parameters relating to the first cell-specific uplink power control-r11 for the secondary cell, configuration of terminal-specific parameters relating to the first uplink power control-r11 (for the primary cell), and configuration of parameters relating to the first terminal-specific uplink power control-r11 for the secondary cell can be included.

FIG. 28 is a diagram illustrating an example of configuration of parameters relating to the first uplink power control and configuration of parameters relating to the second uplink power control included in the respective radio resource configuration. The cell-specific radio resource configuration (for the primary) includes configuration of cell-specific parameters relating to the first uplink power control (for the primary cell) and configuration of cell-specific parameters relating to the second uplink power control-r11 (for the primary cell). Furthermore, configuration of cell-specific parameters relating to the uplink power control-r11 (for the primary cell) can be included. In addition, the secondary cell-specific radio resource configuration includes the configuration of cell-specific parameters relating to the first uplink power control (for the secondary cell) and configuration of cell-specific parameters relating to the second uplink power control-r11 (for the secondary cell). Furthermore, configuration of cell-specific parameters relating to the second uplink power control-r11 (for the secondary cell) can be included. In addition, the terminal-specific physical configuration (for the primary cell) includes configuration of terminal-specific parameters relating to the first uplink power control (for the primary cell) and configuration of terminal-specific parameters relating to the second uplink power control-r11 (for the primary cell). Moreover, the secondary cell terminal-specific physical configuration includes configuration of terminal-specific parameters relating to the first uplink power control (for the secondary cell) and configuration of terminal-specific parameters relating to the second uplink power control-r11 (for the secondary cell). Furthermore, the terminal-specific physical configuration (for the primary cell) is included in the terminal-specific radio resource configuration (for the primary cell) (RadioResoruceCofigDedicated). In addition, the terminal-specific physical configuration for the secondary cell is included in the terminal-specific radio resource configuration for the secondary cell (RadioResourceConfigDedicatedSCell-r10). In addition, the aforementioned cell-specific radio resource configuration and the terminal-specific radio resource configuration may be included in the RRC connection reconfiguration (RRCConnectionReconfiguration) and RRC reestablishment (RRCConnectionReestablishment) described in the second embodiment. Moreover, the aforementioned secondary cell-specific radio resource configuration and the secondary cell terminal-specific radio resource configuration may be included in the SCell addition/modification list described in the second embodiment. Moreover, the aforementioned cell-specific radio resource configuration and the terminal-specific radio resource configuration may be performed for each terminal 102 through the RRC signal. In addition, the RRC connection reconfiguration and the RRC reestablishment may be configured for each terminal 102 through the RRC message. The RRC signal is referred to as a dedicated signal (dedicated signaling) or a higher layer signal (higher layer signaling) in some cases.

FIG. 29 is a diagram illustrating an example of configuration of cell-specific parameters relating to the second uplink power control. Information elements included in configuration of cell-specific parameters relating to the second power control-r11 (for the primary cell) or configuration of cell-specific parameters relating to the second uplink power control-r11 (for the secondary cell) may be configured so as to include all the information elements shown in FIG. 29. In addition, information elements included in configuration of cell-specific parameters relating to the second uplink power control-r11 (for the primary cell) or configuration of cell-specific parameters relating to the second uplink power control-r11 (for the secondary cell) may be configured so as to include at least one of the information elements shown in FIG. 29. Moreover, the information elements included in configuration of cell-specific parameters relating to the second cell-specific uplink power control-r11 (for the primary cell) or configuration of cell-specific parameters relating to the second uplink power control-r11 (for the secondary cell) may not be included at all. In such a case, the base station 101 selects releasing (release) and provides information thereof to the terminal 102. In addition, the information elements which are not configured in configuration of cell-specific parameters relating to the second uplink power control may be common to those in configuration of cell-specific parameters relating to the first uplink power control.

FIG. 30 is a diagram illustrating an example of configuration of terminal-specific parameters relating to the first power control and configuration of terminal-specific parameters relating to the second uplink power control. In configuration of terminal-specific parameters relating to the first uplink power control for the primary cell/secondary cell, a pathloss resource is configured. In configuration of terminal-specific parameters relating to the second cell terminal-specific uplink power control for the primary cell/secondary cell, a pathloss reference resource is configured in addition to the information elements shown in FIG. 22. Information elements included in configuration of terminal-specific parameters relating to the second uplink power control-r11 (for the primary cell) or configuration of terminal-specific parameters relating to the second uplink power control-r11 (for the secondary cell) may be configured so as to include all the information elements shown in FIG. 30. In addition, the information elements included in configuration of terminal-specific parameters relating to the second uplink power control-r11 (for the primary cell) or configuration of terminal-specific parameters relating to the second uplink power control-r11 (for the secondary cell) may be configured so as to include only at least one information element from among the information elements shown in FIG. 30. Moreover, the information elements included in configuration of terminal-specific parameters relating to the second uplink power control-r11 (for the primary cell) or configuration of terminal-specific parameters relating to the second uplink control-r11 (for the secondary cell) may not be included at all. In such a case, the base station 101 selects releasing and provides the information thereof to the terminal 102. In addition, the information elements which are not configured in configuration of terminal-specific parameters relating to the second uplink power control may be common to those in configuration of terminal-specific parameters relating to the first uplink power control. That is, when the pathloss reference resource is not configured in the configuration of terminal-specific parameters relating to the second uplink power control, the pathloss calculation is performed based on the pathloss reference resource configured in configuration of terminal-specific parameters relating to the first uplink power control.

Figure 32:
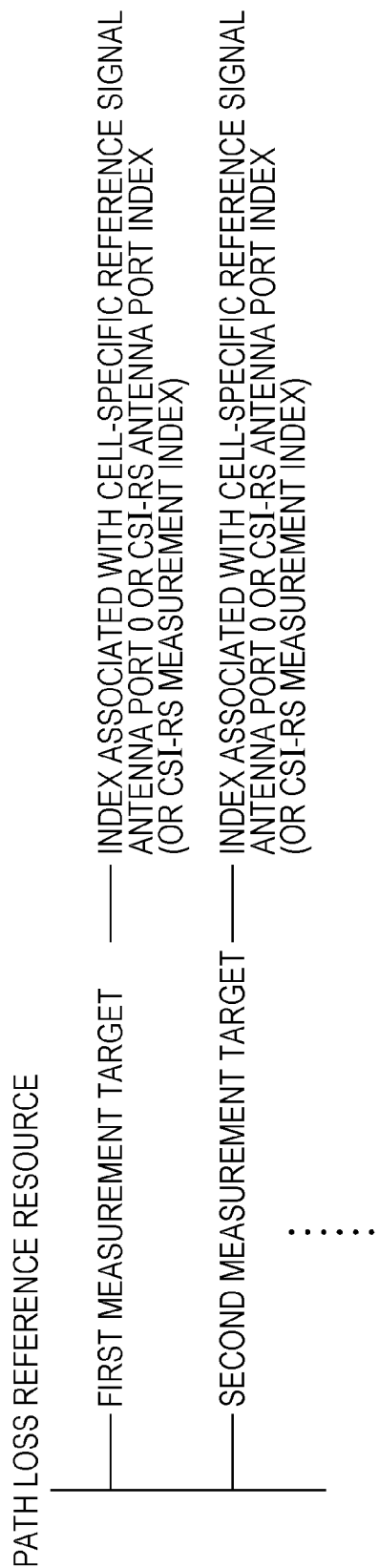
FIG. 32 is a diagram illustrating another example (Another Example 1) of the pathloss reference resource.
Figure 37:
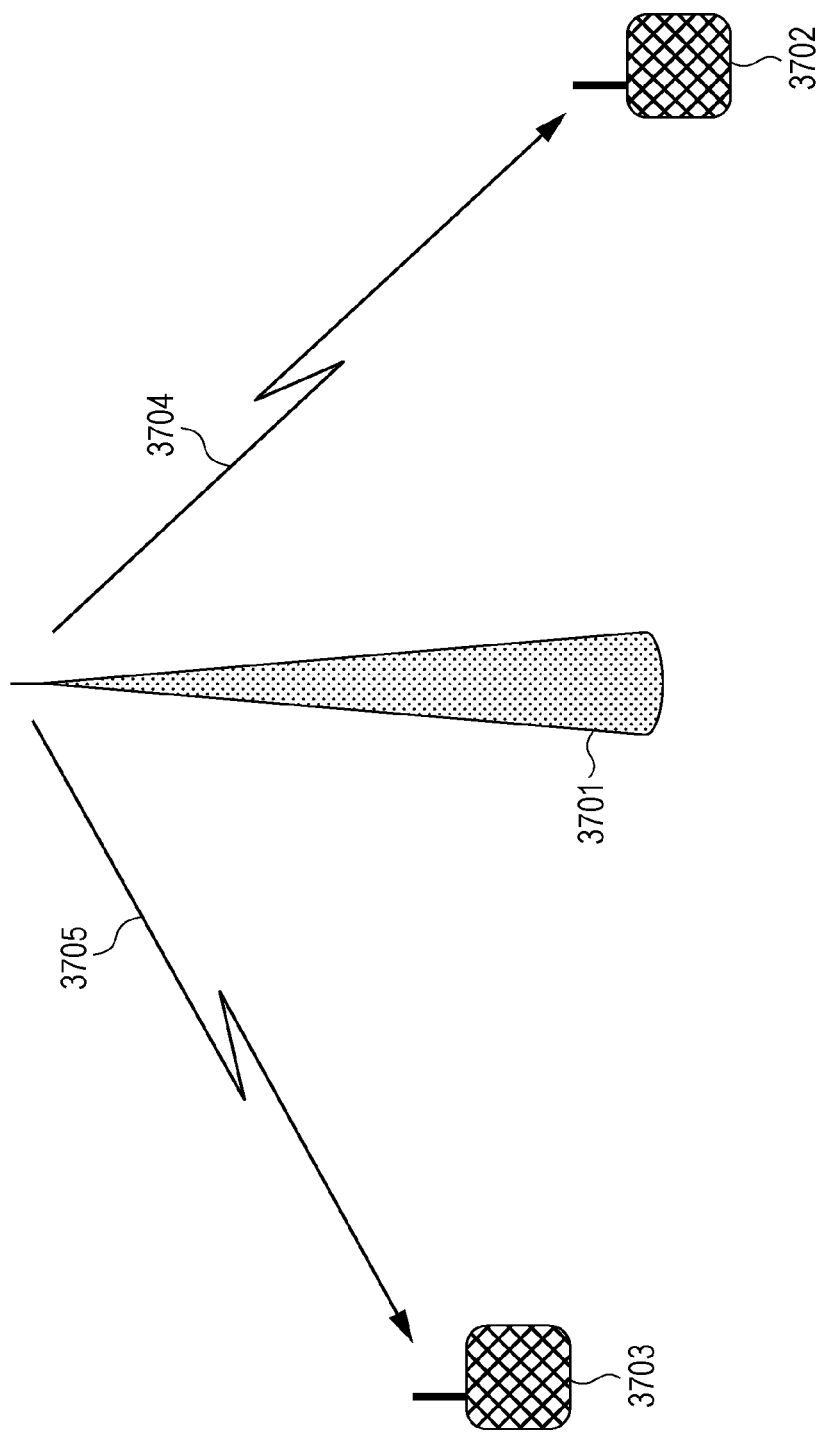
FIG. 37 is a diagram illustrating an example in which a multi user MIMO scheme is employed.
Figure 38:
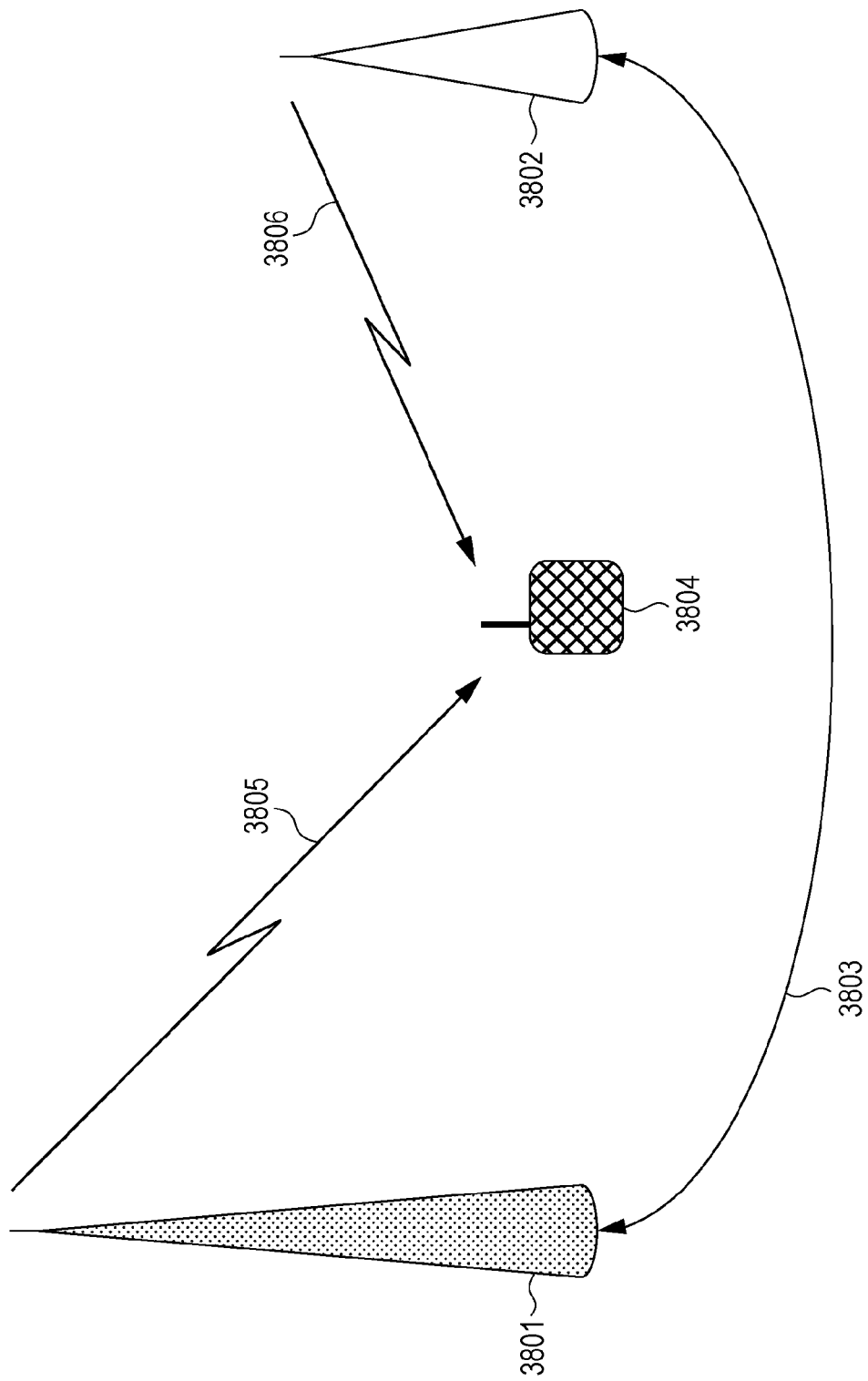
FIG. 38 is a diagram illustrating an example in which a downlink CoMP scheme is employed.
Figure 39:
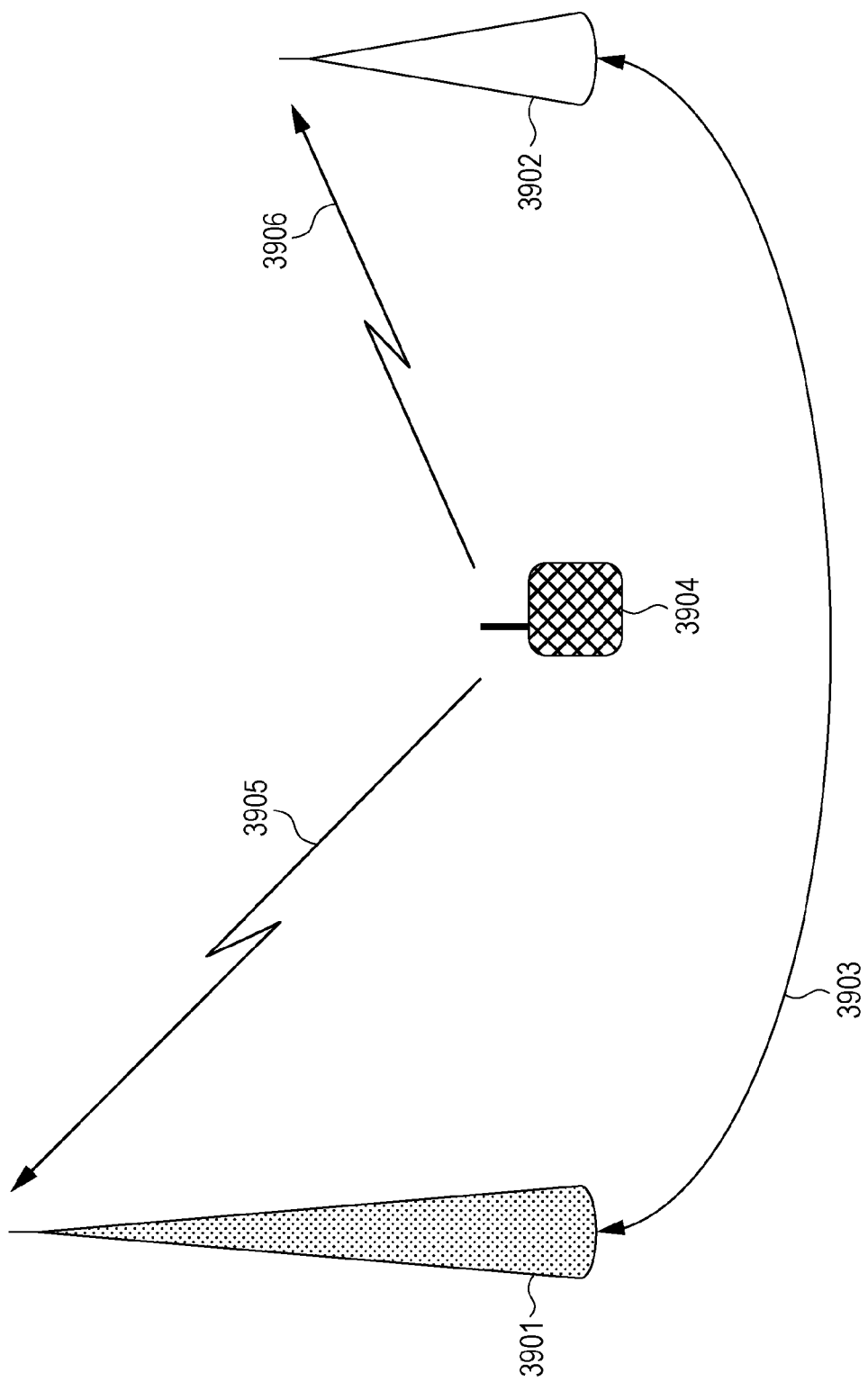
FIG. 39 is a diagram illustrating an example in which an uplink CoMP scheme is employed.

The pathloss reference resource may be the same as that described in the third embodiment (FIG. 24). That is, the measurement target designating the pathloss reference resource may be associated with an index which is associated with the cell-specific reference signal antenna port 0 or the CSI-RS antenna port index (CSI-RS measurement index) (FIG. 31). In addition, the pathloss reference resource may be indicated as shown in FIG. 32 or FIG. 33. FIG. 32 is a diagram illustrating an example (Example 1) of the pathloss reference resource. As the pathloss reference resource, a plurality of measurement targets are configured. The terminal 102 can perform the pathloss calculation by using at least one for these measurement targets. FIG. 33 is a diagram illustrating another example (Example 2) of the pathloss reference resource. The measurement target to be added to the pathloss reference resource may be added based on the addition/modification list. In addition, the number of added measurement targets may be determined by the maximum measurement target ID. The measurement ID may be determined by a measurement object ID. That is, the number of added measurement targets may be the same as the number of measurement target configurations. In addition, unnecessary measurement targets can be removed based on the remove list. The above configuration can be applied to the third embodiment and Modification Example 1 of the third embodiment. Furthermore, a method for calculating pathloss when the plurality of first measurement target configurations and the second measurement target configurations are associated with pathloss reference resource will be exemplified. The pathloss reference resource designates a plurality of first measurement target configurations and the plurality of second measurement target configurations, namely the antenna ports 15, 16, and the like of the channel-state information reference signals in the pathloss reference resource addition/modification list in some cases. In such a case, the second pathloss may be calculated based on received power of the channel-state information reference signals transmitted from the antenna port 15 and the antenna port 16. In such a case, an average of the pathloss calculated from the channel-state information reference signal transmitted from the antenna port 15 and the pathloss calculated from the channel-state information reference signal transmitted from the antenna port 16 may be obtained and regarded as the second pathloss, or a larger or a smaller one of the two pathloss values may be selected and regarded as the second pathloss. In addition, linear processing may be performed on the two pathloss values, and the second pathloss may be obtained. The above configuration can be applied to the cell-specific reference signal transmitted from the antenna port 0 and the channel-state information reference signal transmitted from the antenna port 15. In still another example, the second pathloss reference resource designates a plurality of second measurement target configurations, namely a channel-state information reference signal transmitted from the antenna port 15, the channel-state information reference signal transmitted from the antenna port 16, and the like in the pathloss reference resource addition/modification list in some cases. In such a case, second pathloss and third pathloss may be calculated based on the channel-state information reference signals transmitted from the antenna port 15 and the antenna port 16. In such a case, the first pathloss, the second pathloss, and the third pathloss may be associated with the first subframe subset, the second subframe subset, and the third subframe subset, respectively. In addition, the base station 101 may configure a first value for the TPC command (transmission power control command) included in the uplink grant provided in the first subframe subset and configure a second value which is different from the first value for the TPC command included in the uplink grant provided in the first subframe subset. That is, the first value of the TPC command may be associated with the first subframe subset, and the second value of the TPC command may be associated with the second subframe subset. At this time, the first value and the second value may be differently configured. That is, the base station 101 may configure the first value so as to be greater than the second value. That is, the base station 101 may perform the power correction (power control) by the TPC command independently for each subframe subset. The terminal 102 can perform the power correction by the TPC command independently for each subframe subset. In addition, the first value and the second value are the power correction values of the TCP command.

An example in which a downlink subframe is split into a first subset and a second subset will be considered. Incidentally, when the uplink grant is received in a subframe n (n is a natural number), it is considered that the uplink subframe is also inevitably split into the first subset and the second subset since the terminal 102 transmits the uplink signal in a subframe n+4. The first subset and the first parameter configuration relating to the uplink power control may be associated, and the second subset and the second parameter configuration relating to the uplink power control may be associated. That is, when the terminal 102 detects the uplink grant in the downlink subframe included in the first subset, the terminal 102 calculates pathloss based on various information elements included in the first parameter configuration relating to the uplink power control and the pathloss reference resource (measurement target) included in the first parameter configuration relating to the uplink power control and calculates first plink transmission power. In addition, when the terminal 102 detects the uplink grant in the downlink subframe included in the second subset, the terminal 102 calculates the pathloss based on various information elements included in the second parameter configuration relating to the uplink power control and the pathloss reference resource (measurement target) included in the second parameter configuration relating to the uplink power control and sets second uplink transmission power.

In one example, the control channel region including the uplink grant and the parameter configuration relating to the uplink power control are associated. That is, the base station 101 can shift the parameter configuration relating to the uplink power control used for calculating the uplink transmission power depending on which of the control channel regions (the first control channel region and the second control channel region) the terminal 102 has detected the uplink grant in. That is, when the uplink grant is detected in the first control channel region, the terminal 102 calculates the pathloss by using the first parameter configuration relating to the uplink power control and calculates the uplink transmission power. When the uplink grant is detected in the second control channel region, the terminal 102 calculates the pathloss by using the second parameter configuration relating to the uplink power control and calculates the uplink transmission power. In another example, the control channel region including downlink assignment and the parameter configuration relating to the uplink power control may be associated. In addition, each of the uplink grant and the downlink assignment is a kind of DCI format.

In Modification Example 2 of the third embodiment, the base station 101 provides the first parameter configuration relating to the uplink power control and the second parameter configuration relating to the uplink power control to the terminal 102. In one example, the terminal 102 calculates the pathloss (first pathloss) based on the first parameter configuration relating to the uplink power control and sets the first uplink transmission power based on the first pathloss and the first parameter configuration relating to the uplink power control in accordance with the provided information. In addition, the terminal 102 calculates the pathloss (second pathloss) based on the second parameter configuration relating to the uplink power control and sets the second uplink transmission power based on the second pathloss and the second parameter configuration relating to the uplink power control. That is, the first uplink transmission power may be constantly calculated based on the measurement target, the information of which has been provided by the first parameter configuration relating to the uplink power control, and the second uplink transmission power may be constantly calculated based on the measurement target, the information of which has been provided by the second parameter configuration relating to the uplink power control. In addition, the terminal 102 may control whether to transmit the uplink signal with the aforementioned first uplink transmission power or whether to transmit the uplink signal with the aforementioned second uplink transmission power depending on a frequency resource or a timing at which the DCI format (the uplink grant, for example) is detected. In addition, the base station 101 configures the value of the TPC command to the first value when the uplink grant is provided in the downlink subframe in the first subframe subset, and configures the value of the TPC command to the second value when the uplink grant is provided in the downlink subframe in the second subframe subset. For example, the first value may be configured such that the power correction value thereof is greater than the second value. That is, the base station 101 may perform the power correction (power control) by the TPC command for each subframe subset. In addition, the base station 101 can perform uplink signal demodulation processing so as to demodulate the uplink signal transmitted in the uplink subframe in the first subframe subset and not to demodulate the uplink signal transmitted in the uplink subframe in the second subframe subset.

As described above, the first and second uplink transmission power may be fixedly associated with the first and second parameter configurations relating to the uplink power control.

In Modification Example 2 of the third embodiment, the base station 101 provides a radio resource control signal including the first parameter configuration relating to the uplink power control and the second parameter configuration relating to the uplink power control to the terminal 102 and provides the uplink grant to the terminal 102. In addition, th terminal 102 calculates the first pathloss and the first uplink transmission power based on the first parameter configuration relating to the uplink power control, calculates the second pathloss and the second uplink transmission power based on the second parameter configuration relating to the uplink power control, and if the uplink grant is detected, then the terminal 102 transmits the uplink signal with the first uplink transmission power or the second uplink transmission power.

By configuring a plurality of parameter configurations relating to the uplink power control, the terminal 102 can select parameter configuration relating to the uplink power control appropriate for the base station 101 or the RRH 103 and transmit the uplink signal with the uplink transmission power appropriate for the base station 101 or the RRH 103. More specifically, it is possible to configure at least one information element among the information elements included in the first and second parameter configurations relating to the uplink power control to be a different value. For example, when it is desirable to perform different control between the base station 101 and the terminal 102 and between the RRH 103 and the terminal 102, it is possible to configure the attenuation coefficient α included in the first parameter configuration relating to the uplink power control and the second parameter configuration relating to the uplink power to appropriate α by associating the first parameter configuration relating to the uplink power control with the transmission power control for the base station 101 and associating the second parameter configuration relating to the uplink power control with the transmission power control for RRH 103 for α used in the intra-cell fractional transmission power control. That is, it is possible to perform different fractional transmission power control between the base station 101 and the terminal 102 and between the RRH 103 and the terminal 102. Similarly, it is possible to configure PUSCH standard power between the base station 101 and the terminal 102 and PUSCH between the RRH 103 and the terminal 102 to be different values by configuring $P_{O\_NOMINAL\_PUSCH,c}$ and $P_{O\_UE\_PUSCH,c}$ to different values in the first and second parameter configurations relating to the uplink power control. The same operation can be performed on other parameters. That is, it is possible to configure respectively different values for the various parameters included in the first parameter configuration relating to the uplink power control and the second parameter configuration relating to the uplink power control. In addition, the various parameters relating to the power control such as $P_{O\_NOMINAL\_PUSCH,c}$ and $P_{O\_UE\_PUSCH,c}$ included in the second parameter configuration relating to the uplink power control can be configured from a wider range than that for the various parameters relating to the power control $P_{O\_NOMINAL\_PUSCH,c}$ and $P_{O\_UE\_PUSCH,c}$ included in the first parameter configuration relating to the uplink power control. For example, $P_{O\_UE\_PUSCH,c}$ included in the second parameter configuration relating to the uplink power control can be configured as a larger value and/or a smaller value than $P_{O\_UE\_PUSCH,c}$ included in the first parameter configuration relating to the uplink power control. In addition, the SRS power offset included in the second parameter configuration relating to the uplink power control can be configured as a larger value and/or a smaller value than the SRS power offset included in the first parameter configuration relating to the uplink power control. In addition, $P_{O\_UE\_PUCCH,c}$ included in the second parameter configuration relating to the uplink power control may be configured as a larger value and/or a smaller value than $P_{O\_UE\_PUCCH,c}$ included in the first parameter configuration relating to the uplink power control. If it is assumed that a range of power values which can be configured for $P_{O\_UE\_PUSCH,c}$ included in the first parameter configuration relating to the uplink power control is [−8, 7], for example, a range of power values which can be configured for $P_{O\_UE\_PUSCH,c}$ included in the second parameter configuration relating to the uplink power control can be configured to [−15, 10]. If it is assumed that a range of power values which can be configured for $P_{O\_UE\_PUCCH,c}$ included in the first parameter configuration relating to the uplink power control is [−8, 7], a range of power values which can be configured for $P_{O\_UE\_PUCCH,c}$ included in the second parameter configuration relating to the uplink power control can be configured to [−15, 10]. If it is assumed that a range of offsets which can be configured for the SRS power offset included in the first parameter configuration relating to the uplink power control is [0, 15], a range of offsets which can be configured for the SRS power offsets included in the second parameter configuration relating to the uplink power control can be configured to [−5, 20].

In addition, the terminal 102 can shift the parameter configuration relating to the uplink power control used in configuring the uplink transmission power depending on the type of the DCI format included in the received PDCCH. When the PDCCH including the SRS request is a DCI format 0 (first DCI format), for example, a power offset of the aperiodic SRS (first A-SRS power offset) configured in the first parameter configuration relating to the uplink power control can be used to calculate transmission power of the aperiodic SRS. When the PDCCH including the SRS request is a DCI format 1A (second DCI format), a power offset of the aperiodic SRS configured in the second parameter configuration relating to the uplink power control (second A-SRS power offset) can be used to calculate the transmission power of the aperiodic SRS. That is, the terminal 102 can calculate the transmission power of the aperiodic SRS by associating the type of the DCI format including the SRS request with the parameter configuration relating to the uplink power control.

Information on whether or not to use different parameter configurations relating to the uplink power control depending on the types of DCI format may be provided to each terminal 102 by the RRC signal. That is, information on whether or not to use the same parameter configuration relating to the uplink power control for both the first DCI format and the second DCI format may be provided by the RRC signal.

Description will be given with reference to FIG. 1. The terminal 102 may be controlled to calculate the pathloss and the uplink transmission power by using the first parameter configuration relating to the uplink power control for the uplink 106 and transmit the uplink signal with the transmission power. The terminal 102 may be controlled to calculate the pathloss and the uplink transmission power by using the second parameter configuration relating to the uplink power control for the uplink 108 and transmit the uplink signal with the transmission power.

According to the third embodiment including Modification Example 1 and Modification Example 2, the first pathloss and the second pathloss may be calculated with filter coefficients for which different values are configured. That is, the first pathloss and the second pathloss may be calculated with a first filter coefficient and a second filter coefficient, respectively.

Fourth Embodiment

Next, description will be given of a fourth embodiment. In the fourth embodiment, a method for configuring parameter required for the base station 101 to perform connection processing between the terminal 102 and the base station 101 or the RRH 103 will be described.

If transmission of the uplink signal with the uplink transmission power to the base station (macro base station) 101 and transmission of the uplink signal with the uplink transmission power to the RRH 103 are performed with the same carrier components at the same timing (uplink subframe), problems such as intra-code interference, interference due to out-of-band radiation, and an increase in a desired dynamic range occur.

The base station 101 controls the terminal 102 so as to separate the transmission of the uplink signal to the base station 101 from the transmission of the uplink signal to the RRH 103 in the time direction. That is, the base station 101 configures transmission timings of the respective uplink signals (PUSCH, PUCCH (CQI, PMI, SR, RI, Ack/Nack), UL DMRS, SRS, PRACH) such that a timing when the terminal 102 transmits the uplink signal to the base station 101 differs from a timing when the terminal 102 transmits the uplink signal to the RRH 103. That is, the base station 101 performs configuring such that transmission of the respective uplink signal to the base station 101 and to the RRH 103 is not overlapped. In addition, various uplink physical channels include at least one (or one kind) of uplink physical channel (uplink signal) among the aforementioned respective uplink signals (PUSCH, PUCCH (CQI, PM1, SR, RI, Ack/Nack), UL DMRS, SRS, PRACH).

The base station 101 may configure a subset at the transmission timing (uplink subframe) of the uplink signal to the base station 101 and a subset at the transmission timing (uplink subframe) of the uplink signal to the RRH 103 and schedule the respective terminals in accordance with the subsets.

In addition, the base station 101 appropriately configure the parameter configuration relating to the uplink power control for the base station 101 and for the RRH 103 such that the transmission power is appropriately configured for the uplink signal to be transmitted to the base station 101 and the uplink signal to be transmitted to the RRH 103. That is, the base station 101 can perform the uplink transmission power control appropriate for the terminal 102.

First, description will be given of control by the base station 101 in the time direction. If it is assumed that the uplink subframe subset to the base station 101 is referred to as a first uplink subset (first uplink subframe subset) and the uplink subframe subset to the RRH 103 is referred to as a second uplink subset (second uplink subframe subset), the base station 101 configures various parameter values such that the respective uplink signals are included in one of the first subset and the second subset depending on which of the base station 101 and the RRH 103 the terminal 102 is connected to.

Description will be given of configuration of the transmission subframe of each uplink signal and a transmission cycle. As a channel quality criterion (CQI: Channel Quality Indicator) and a precoding matrix criterion (PMI: Precoding Matrix Indicator), the transmission subframe and the transmission cycle are configured by a CQIPMI configuration index (cqi-pmi-ConfigIndex). As a rank criterion (RI: Rank Indicator), the transmission subframe and the transmission cycle are configured by an RI configuration index. For the SRS (Sounding Reference Signal), a cell-specific SRS transmission subframe (a transmission subframe and a transmission cycle) are configured in cell-specific SRS subframe configuration (srs-SubframeConfig), and a terminal-specific SRS transmission subframe as a cell-specific SRS transmission subframe subset is configured by a terminal-specific SRS configuration index (srs-ConfigIndex). For the PRACH, a transmission subframe is configured by a PRACH configuration index (prach-ConfigIndex). For the SR (Scheduling Request), a transmission timing is configured by SR configuration (se-CofigIndex).

A CQI-PMI configuration index and an RI configuration index are configured by a CQI report periodic (CQI-ReportPeriodic) included in CQI report configuration (CQI-ReportConfig). In addition, the CQI report configuration is included in the dedicated physical configuration.

Cell-specific SRS subframe configuration is configured in cell-specific sounding UL configuration (SoundingRS-UL-ConfigCommon), and a terminal-specific SRS configuration index is configured in terminal-specific sounding UL configuration (SoundingRS-UL-ConfigDedicated). The cell-specific sounding UL configuration is included in cell-specific radio resource configuration SIB and cell-specific radio resource configuration. The terminal-specific sounding UL configuration is included in terminal-specific radio resource configuration.

The PRACH configuration index is configured by PRACH configuration information (PRACH-ConfigInfo). The PRACH configuration information is included in PRACH configuration SIB (PRACH-ConfigSIB) and PRACH configuration (PRACH-Config). The PRACH configuration SIB is included in the cell-specific radio resource configuration SIB, and the PRACH configuration is included in the cell-specific radio resource configuration.

The SR configuration index is included in scheduling request configuration (SchedulingRequestConfig). The scheduling request configuration is included in dedicated physical configuration.

In addition, since the PUSCH, the aperiodic CSI (Channel State Information), and the aperiodic SRS are transmitted in the uplink subframe associated with the downlink subframe where the uplink grant has been detected, the base station 101 can control whether to perform transmission in the first uplink subframe subset or whether to perform transmission in the second uplink subframe subset to the terminal 102 by controlling timing at which the uplink grant is provided. Here, the aperiodic CSI (A-CSI: Aperiodic CSI) means a CSI transmitted when a transmission request by a CSI request (CSI indicator) is sent. In addition, the CSI request is associated with information indicated by two bits. When the CSI request is '00', for example, the CSI is not transmitted. When the CSI request is '01', a CSI of a serving cell c is transmitted. When the CSI request is '10', a CSI in a first cell group (cell set) is transmitted. When the CSI request is '11', a CSI in a second cell group (cell set) is transmitted. In addition, if it is assumed that the CSI request is represented by indexes 0 to 3, the CSI is not transmitted in the case of the index 0 (first value). The CSI of the serving cell c is transmitted in the case of the index 1 (second value). The CSI in the first cell group (cell set) is transmitted in the case of the index 2 (third value). The CSI in the second cell group (cell set) is transmitted in the case of the index 3 (fourth value).

The base station 101 can perform the uplink transmission control for the terminal such that the uplink signal to the base station 101 and the uplink signal for the RRH 103 do not function as mutual interference sources by configuring the index relating to the transmission timing of each uplink signal so as to be included in the first uplink subset or the second uplink subset.

As for the resource assignment of each uplink signal and control of a transmission timing and transmission power, it is also possible to perform configuration for the secondary cell. More specifically, cell/terminal-specific SRS configuration is performed specifically to the secondary cell. In addition, a transmission timing and a transmission resource of the PUSCH are indicated by the uplink grant.

As described above in the third embodiment, the parameter configuration relating to the uplink transmission power control can be configured specifically to the secondary cell.

Description will be given of control of PRACH transmission power. For the PRACH, PRACH initial transmission power is calculated by preamble initial reception target power (preambleInitialReceivedTargetPower). When random access between the base station 101 and the terminal 102 fails, the transmission power is enhanced by a predetermined amount, and a power ramping step (powerRampingStep) is configured. If the random access by a physical random access channel (PRACH: Physical Random Access Channel), which is transmitted by enhancing the power, continuously fails, and the maximum transmission power of the terminal 102 or the maximum number of times of transmission of the PRACH is exceeded, the terminal 102 determines that the random access has failed and provides information indicating that a random access problem (RAP: Random Access Problem) has occurred. If the information on the random access problem is provided to the higher layer, it is determined that radio link failure (RLF: Radio Link Failure) has occurred.

The cell-specific radio resource configuration includes P_MAX indicating the maximum transmission power of the terminal 102. The base station 101 can configure the maximum transmission power of the terminal 102 specifically to the primary cell or the secondary cell.

The transmission power of the PUSCH, the PUSCH, and the SRS are as described above in the third embodiment.

In one example, first, the base station 101 performs cell-specific/terminal-specific radio resource configuration, the information of which is provided as system information, and configuration (index) of PUSCH/PUCCH/SRS/PRACH on a time axis included in the dedicated physical configuration so as to be included in the first uplink subframe subset. The base station 101 recognizes which of the base station 101 and the RRH 103 the position of the terminal 102 is closer to (the base station 101 or the RRH 103), by performing channel measurement or the like for each terminal 102 after establishment of the RRC connection. When it is determined that the measured terminal 102 is located at a position closer to the base station 101 than to the RRH 103, the base station 101 does not change the configuration, in particular. When it is determined that the measured terminal 102 is located at a position closer to the RRH 103 than to the base station 101, the base station 101 provides reconfiguration information (transmission power control information or transmission timing information, for example) suitable for the connection with the RRH 103 to the terminal 102. Here, the transmission power control information is a collective term of the transmission power control performed on each uplink signal. For example, various information elements included in the parameter configuration relating to the uplink power control and the TPC command are included in the transmission power control information. In addition, the transmission timing information is a collective term of information for configuring the transmission timing of each uplink signal. For example, the transmission timing information includes control information relating to the transmission timing (the SRS subframe configuration, the CQI-PMI configuration index, and the like).

Description will be given of the transmission control (uplink transmission timing control) of the uplink signal to the base station 101 or the RRH 103. The base station 101 determines which of the base station 101 and the RRH 103 the position of the terminal 102 is closer to, in accordance with the measurement result of each terminal. When it is determined that the terminal 102 is located at a position closer to the base station 101 than to the RRH 103 by the measurement result (measurement report), the base station 101 configures the transmission timing information of each uplink signal so as to be included in the first uplink subframe subset and configures the transmission power information to a value suitable for the base station 101. At this time, the base station 101 does not provide information for the reconfiguration, in particular, to the terminal 102 in some cases. That is, updating is not particularly performed from the initial configuration in some cases. When it is determined that the terminal 102 is located at a position closer to the RRH 103 than to the base station 101, the base station 101 configures the transmission timing information of each uplink signal so as to be included in the second uplink subframe subset and configures the transmission power information to a value suitable for the RRH 103. That is, the base station 101 can control the terminal 102 such that the signals do not interfere with each other by changing the transmission timings and controlling the uplink signal to the base station 101 and the uplink signal to the RRH 103. Here, the terminal 102 communicating with the base station 101 is referred to as a terminal A, and the terminal 102 communicating with the RRH 103 is referred to as a terminal B. The base station 101 can configure various configuration indexes including a transmission timing such that the transmission timing of the terminal B is not the same as that of the terminal A. For example, the terminal-specific SRS subframe configuration may be performed such that different values are configured for the terminal A and the terminal B.

As described above in the third embodiment, the base station 101 can associate the first uplink subframe subset and the second uplink subframe subset with the measurement targets, respectively.

A more detailed description will be given of the above procedure. The base station 101 and/or the RRH 103 broadcasts broadcast information for designating a subframe in the first uplink subframe subset in the configuration of the PRACH on the time axis. The terminal 102 before initial access or the terminal 102 in an RRC idle state attempts initial access by using a PRACH resource in some subframe in the first uplink subframe subset based on the obtained broadcast information. At this time, the PRACH transmission power is configured with reference to the CRS transmitted by the base station 101 or by the base station 101 and the RRH 103. For this reason, the PRACH reaches the base station 101 with relatively high transmission power.

After or during establishment of RRC connection by a random access procedure, a PUCCH resource for the periodic CSI or Ack/Nack assigned in the quasi-static manner, an SRS resource assigned in the quasi-static manner, and a PUCCH resource for the SR assigned in the quasi-static manner are configured. Here, resources in a subframe in the first uplink subframe subset are configured as all these resources. In addition, the base station 101 schedules (assigns) the PUSCH in the subframe in the first uplink subframe subset and the PDSCH which transmits Ack/Nack in the PUCCH in the subframe in the first uplink subframe subset for the terminal 102. At this time, the transmission power of the PUSCH, the PUCCH, and the SRS is configured with reference to the CRS transmitted by the base station 101 or by the base station 101 and the RRH 103. For this reason, the PUSCH, the PUCCH, and the SRS reach the base station 101 with relatively high transmission power. As described above, the terminal 102 which performs the uplink transmission with the relatively high transmission power (transmission power which compensates for loss between the base station 101 and the terminal 102) uses only the subframe in the first uplink subframe subset. In addition, the periodic CSI (P-CSI: Periodic CSI) includes at least one of the CQI, the PMI, and the RI.

Next, the base station 101 determines (make a decision on) whether the terminal 102 is required to transmit the uplink signal to the base station 101 or transmit the uplink signal to the RRH 103. In other words, it is determined whether or not the terminal 102 is required to perform transmission with transmission power which compensates for the loss between the base station 101 and the terminal 102 or perform transmission with transmission power which compensates for the loss between the RRH 103 and the terminal 102. As a determination criterion, which of the base station 101 and the RRH 103 the position of the terminal 102 is closer to may be calculated from the measurement result, or another determination criterion can be used. For example, it is possible to cause the RRH 103 to receive a signal such as an SRS that the terminal 102 transmits in the subframe in the first uplink subframe subset and make a determination based on the received signal power. If it is determined that the terminal 102 is required to transmit the uplink signal to the base station 101, the base station 101 continues to the uplink communication using only the subframe in the first uplink subframe subset.

If it is determined that the terminal 102 is required to transmit the uplink signal to the RRH 103, the base station 101 configures the parameters relating to the uplink power control such that the uplink transmission is performed with relatively low transmission power (transmission power which compensates for the loss between the RRH 103 and the terminal 102) with these resources. Here, it is possible to use the methods described above in the respective embodiments for configuration for low transmission power. Alternatively, another method such as a method for gradually reducing the power by repeating the closed loop transmission power control or a method of updating configuration of the CRS power value or the pathloss compensation coefficient α in the system information by a handover procedure can be used.

If the base station 101 determines that the terminal 102 is required to transmit the uplink signal to the RRH 103, the PUCCH resource for the periodic CSI or Ack/Nack assigned in the quasi-static manner, the SRS resource assigned in the quasi-static manner, and the PUCCH resource for the SR assigned in the quasi-static manner are reconfigured. Here, resources in a subframe in the second uplink subframe subset are configured as all these resources. In addition, the configuration of the PRACH resource in the system information is updated by a handover procedure (mobility control procedure). Here, resources in a subframe in the second uplink subframe subset are configured for all the PRACH resources. In addition, the base station 101 schedules (assigns) the PUSCH in the subframe in the second uplink subframe subset and the PDSCH which transmits Ack/Nack in the PUCCH in the subframe in the second uplink subframe subset for the terminal 102. As described above, the terminal 102 which performs the uplink transmission with relatively low transmission power (transmission power which compensates the loss between the RRH 103 and the terminal 102) uses only the subframe in the second uplink subframe subset.

As described above, the terminal 102 performing the uplink transmission with relatively high transmission power (transmission power which compensates for the loss between the base station 101 and the terminal 102) uses the subframe in the first uplink subframe subset, and the terminal 102 which performs the uplink transmission with relatively low transmission power (transmission power which compensates for the loss between the RRH 103 and the terminal 102) uses only the subframe in the second uplink subframe subset. With such a configuration, it is possible to separate the subframe received by the base station 101 from the subframe received by the RRH 103 on the time axis. For this reason, it is not necessary to perform processing of simultaneously receiving a large received power signal and a small received power signal, and therefore, it is possible to suppress interference. In addition, it is possible to reduce a required dynamic range in the base station 101 or the RRH 103.

Here, description will be given of transmission control (uplink transmission resource control) of the uplink signal to the base station 101 or the RRH 103 during carrier aggregation. A case where the base station 101 configures two carrier components (a first carrier component and a second carrier component) for the terminal 102, the first carrier component is configured as a primary cell, and the second carrier component is configured as a secondary cell is assumed. When the base station 101 determines that the terminal 102 is located at a position closer to the base station 101 than to the RRH 103 (terminal A) based on the measurement result, the base station 101 configures the secondary cell to be deactivated (non-activation). That is, the terminal A performs communication by using only the primary cell without using the secondary cell. When the base station 101 determines that the terminal 102 is located at a position closer to the RRH 103 than to the base station 101 (terminal B), the base station 101 configures the secondary cell to be activated (activation). That is, the terminal B communicates with the base station 101 and the RRH 103 by using not only the primary cell but also the secondary cell. The base station 101 configures resource assignment and transmission power control suitable for transmission to the RRH 103 in the configuration of the secondary cell by the terminal B. That is, the base station 101 controls the terminal B to calculate the pathloss and the uplink transmission power on the assumption that the pathloss measurement of the secondary cell is transmitted from the RRH 103. However, the uplink signal transmitted from the terminal B via the secondary cell is the PUSCH, the UL DMRS for PUSCH demodulation, or the SRS. The PUCCH (CQI, PMI, RI), the UL DMRS for PUCCH demodulation, and the PRACH are transmitted via the primary cell. When the terminal B is allowed to simultaneously transmit the PUSCH and the PUCCH by the higher layer, for example, the terminal B is controlled so as to transmit the PUCCH by the primary cell and transmit the PUSCH by the secondary cell. At this time, the terminal B is controlled by the base station 101 such that the transmission power for the primary cell is directed to the base station 101 and the transmission power of the secondary cell is directed to the RRH 103. When the terminal A is allowed to simultaneously transmit the PUSCH and the PUCCH by the higher layer, the terminal A is controlled by the base station 101 to transmit both the PUSCH and the PUCCH via the primary cell. That is, the base station 101 can control the terminal 102 such that the signals do not interfere with each other by changing transmission resources and controlling the uplink signal to the base station 101 and the uplink signal to the RRH 103.

In addition, the base station 101 can reconfigure the first carrier component as a secondary cell and reconfigure the second carrier component as a primary cell by utilizing handover for the terminal B. At this time, the terminal B performs the same processing as that of the terminal A described above. That is, the terminal B deactivates the secondary cell. That is, the terminal B communicates with the RRH 103 only via the primary cell without using the secondary cell. At this time, the terminal B is controlled to transmit all the uplink signals via the primary cell. The uplink transmission power control for the RRH 103 is always performed on the uplink transmission power at this time. That is, the transmission power of the PUSCH, the PUCCH, the PRACH, and the SRS is reconfigure to the transmission power for the RRH 103. The reconfiguration information at this time is included in the RRC connection reconfiguration.

In addition, the base station 101 can control the terminal so as not to perform communication with high transmission power via the second carrier component by providing access (transmission) restriction (ac-BarringFactor) of the uplink transmission power to the carrier component or the cell.

As described in the third embodiment, the base station 101 can associate the first carrier component and the second carrier component or the primary cell and the secondary cell with the measurement target, respectively.

The above procedure will be described from another point of view. The base station 101 and the RRH 103 performs communication by using a combination of carrier components which is a partial group of two downlink carrier components (component carriers) and two uplink carrier components (component carriers). The base station 101 and/or the RRH 103 broadcasts broadcast information for restricting initial access (inhibiting initial access) in the second downlink carrier component. In contrast, the base station 101 and/or the RRH 103 broadcasts broadcast information for permitting the initial access (do not broadcasts the broadcast information for restricting the initial access) in the first downlink carrier component. The terminal before the initial access or the terminal 102 in the RRC idle state attempts initial access by using a PRACH resource in the first uplink carrier component instead of the second uplink carrier component based on the obtained broadcast information. At this time, the PRACH transmission power is configured with reference to the CRS transmitted by the base station 101 or by the base station 101 and the RRH 103 in the first downlink carrier component. For this reason, the PRACH reaches the base station 101 with relatively high transmission power.

After or during establishment of RRC connection by a random access procedure, a PUCCH resource for the periodic CSI or Ack/Nack assigned in the quasi-static manner, an SRS resource assigned in the quasi-static manner, and a PUCCH resource for the SR assigned in the quasi-static manner are configured. Here, resources in a subframe in the first uplink carrier component, namely in the primary cell (PCell: a cell including the first downlink carrier component and the first uplink carrier component) are configured as these resources. In addition, the base station 101 schedules (assigns) the PUSCH in the first uplink carrier component for the terminal 102. Furthermore, the terminal 102 transmits Ack/Nack for the PDSCH in the first downlink carrier component by using the PUCCH in the first uplink carrier component. At this time, the transmission power of the PUSCH, the PUCCH, and the SRS is configured with reference to the CRS transmitted by the base station 101 or by the base station 101 and the RRH 103 in the PCell. For this reason, the PUSCH, the PUCCH, and the SRS reach the base station 101 with relatively high transmission power.

When the carrier aggregation is performed, the secondary cell (SCell) is configured as a cell including the second downlink carrier component (a cell which does not include the uplink carrier component). As the PUCCH resource for the periodic CSI or Ack/Nack in the SCell, which is assigned in the quasi-static manner, a resource in the first uplink carrier component, namely a resource in the PCell is configured. In addition, the terminal 102 transmits Ack/Nack for the PDSCH in the second downlink carrier component (SCell) by using the PUCCH in the first uplink carrier component (PCell). At this time, the transmission power of the PUSCH, the PUCCH, and the SRS is configured with reference to the CRS transmitted by the base station 101 or by the base station 101 and the RRH 103 in the PCell. For this reason, the PUSCH, the PUCCH, and the SRS reach the base station 101 with relatively high transmission power. As described above, the terminal 102 which performs the uplink transmission with the relative high transmission power (the transmission power which compensates for the loss between the base station 101 and the terminal 102) uses only the first uplink carrier component regardless of whether or not the carrier aggregation is performed.

Next, the base station 101 determines whether the terminal 102 is required to transmit the uplink signal to the base station 101 or transmit the uplink signal to the RRH 103. In other words, it is determined whether the terminal 102 is required to perform transmission with the transmission power which compensates for the loss between the base station 101 and the terminal 102 or perform transmission with the transmission power which compensates for the loss between the RRH 103 and the terminal 102. As a determination criterion, the aforementioned method can be used. When the base station 101 determines that the terminal 102 is required to transmit the uplink signal to the base station 101, the uplink communication using only the first uplink carrier component, namely communication using a cell including the first downlink carrier component and the first uplink carrier component as the PCell is continued.

When the base station 101 determines that the terminal 102 is required to transmit the uplink signal to the RRH 103, PCell is changed by a handover procedure. That is, the PCell including the first downlink carrier component and the first uplink carrier component is changed to the PCell including the second downlink carrier component and the second uplink carrier component. During the handover procedure, the parameters relating to the uplink power control are configured so as to perform the uplink transmission with the relatively low transmission power (the transmission power which compensates for the loss between the RRH 103 and the terminal 102) after the handover. Another method such as a method of updating configuration of the CRS power value, the pathloss compensation coefficient α, and the uplink transmission power initial value, for example, in the system information can be used. In addition, the system information which does not restrict the initial access is configured.

When the PCell is changed, a random access procedure in the second uplink carrier component is performed, and the RRC connection is established. After or during establishment of RRC connection by the random access procedure, a PUCCH resource for the periodic CSI or Ack/Nack assigned in the quasi-static manner, an SRS resource assigned in the quasi-static manner, and a PUCCH resource for the SR assigned in the quasi-static manner are reconfigured. Here, resources in the second uplink carrier component are configured as all these resources. The base station 101 schedules (assigns) the PUSCH in the second uplink carrier component and the PUSCH for transmitting Ack/Nack in the PUCCH in the second uplink carrier component for the terminal 102. At this time, the parameters relating to the uplink power control are configured such that the transmission power of the PUSCH, the PUCCH, and the SRS becomes relatively low transmission power (the transmission power which compensates for the loss between the RRH 103 and the terminal 102).

When the carrier aggregation is performed, the SCell is configured as a cell including the first downlink carrier component (a cell which does not include the uplink carrier component). As the PUCCH resource for the periodic CSI or Ack/Nack in the SCell, which is assigned in the quasi-static manner, a resource in the second uplink carrier component, namely a resource in the PCell is configured. In addition, the terminal 102 transmits Ack/Nack for the PDSCH in the SCell by using the PUCCH in the second uplink carrier component (PCell). At this time, the parameters relating to the uplink power control are configured such that the transmission power of the PUCCH becomes the relatively low transmission power (the transmission power which compensates for the loss between the RRH 103 and the terminal 102). As described above, the terminal 102 which performs the uplink transmission with the relative low transmission power (the transmission power which compensates for the loss between the RRH 103 and the terminal 102) uses only the second uplink carrier component regardless of whether or not the carrier aggregation is performed.

As described above, the terminal 102 which performs the uplink transmission with the relatively high transmission power (the transmission power which compensates for the loss between the base station 101 and the terminal 102) uses the first uplink carrier component, and the terminal 102 which performs the uplink transmission with the relatively low transmission power (the transmission power which compensates for the loss between the RRH 103 and the terminal 102) uses only the second uplink carrier component. With such a configuration, it is possible to separate the subframe received by the base station 101 from the subframe received by the RRH 103 on the frequency axis. For this reason, it is not necessary to perform processing of simultaneously receiving a large received power signal and a small received power signal, and therefore, it is possible to suppress the interference. In addition, it is possible to reduce the required dynamic range in the base station 101 or the RRH 103.

Here, description will be given of transmission control (uplink transmission power control) of the uplink signal to the base station 101 or the RRH 103 by the control channel (PDCCH) region including the uplink grant (DCI format). When the base station 101 determines that a specific terminal (terminal A) is located at a position closer to the base station 101 from the measurement result, the base station 101 performs the dynamic uplink signal transmission control for the terminal A only in the first control channel (PDCCH) region. When the base station 101 determines that a specific terminal (terminal B) is located at a position closer to the RRH 103 from a measurement result, the base station 101 performs the dynamic uplink signal transmission control for the terminal B only in the second control channel (EPDCCH) region. That is, the base station 101 allows the uplink grant to be included in the first control channel region and provided the uplink grant to the terminal 102 when it is desirable to cause the terminal 102 to transmit the uplink signal to the base station 101, and allows the uplink grant to be included in the second control channel region and provides the uplink grant to the terminal 102 when it is desirable to cause the terminal 102 to transmit the uplink signal to the RRH 103. Furthermore, the base station 101 can control the transmission power control of the uplink signal to the base station 101 or the RRH 103 by utilizing the TPC command as a correction value for the transmission power control of the uplink signal included in the uplink grant. The base station 101 configures the value of the TPC command included in the uplink grant for the base station 101 or the RRH 103 depending on the control channel region which provides the uplink grant. That is, the base station 101 configures a power correction value of the TPC command in the first control channel region to be higher when it is desirable to increase the uplink transmission power for the base station 101, and configures a power correction value of the TPC command in the second control channel to be low when it is desirable to decrease the uplink transmission power for the RRH 103. The base station 101 transmits the uplink signal and controls the uplink transmission power by the first control channel region for the terminal A, and transmits the uplink signal and controls the uplink transmission power by the second control channel for the terminal B. That is, the base station 101 can perform the uplink transmission power control for the terminal 102 by configuring the TPC command (transmission power control command) for the base station 101 to the first value and configuring the TPC command (transmission power control command) for the RRH 103 to the second value. The base station 101 may configure the first value such that the power correction value thereof is greater than the second value. That is, the base station 101 may perform the power correction (power control) by the TPC command based on the control channel region where the uplink grant (physical downlink control channel) is arranged.

As shown in the third embodiment, the base station 101 can associate the first control channel region and the second control channel region with the measurement targets, respectively.

According to the fourth embodiment, the base station 101 configures transmission timing information of the physical random access channel included in the system information in a subframe in the first subframe subset and configures transmission timing information of various uplink physical channels in a subframe in the first subframe subset, and when the radio resource control information is reconfigured for a part of the terminals 102, then the base station 101 configures transmission timing information of the physical random access channel included in the radio resource control signal in a subframe in a second subframe subset, which is different from the first subframe subset, and configures transmission timing information of the various uplink physical channels in a subframe in the second subframe subset.

Furthermore, the base station 101 configures the transmission power control information of the various uplink signal as first transmission power control information in association with the first subframe subset, and when the radio resource control information is reconfigured for a part of the terminals 102, then the base station 101 configures the transmission power control information of the various uplink signals as second transmission power control information in association with the second subframe subset.

Furthermore, the base station 101 configures the first transmission power control information for the terminal 102 which transmits the uplink signal in the first subframe subset and configures the second transmission power control information for the terminal 102 which transmits the uplink signal in the second subframe subset.

In the fourth embodiment, the base station 101 transmits a signal via the first downlink carrier component and the second downlink carrier component, configures the first transmission power control information as primary cell-specific transmission power control information for the terminal 102 for which the first downlink carrier component is configured, and configures the second transmission power control information as the primary cell-specific transmission power control information for the terminal 102 for which the second downlink carrier component is configured.

Furthermore, the base station 101 receives a signal via the first uplink carrier component and the second uplink carrier component, configures the first transmission power control information for the terminal 102 which performs communication via the first uplink carrier component, and configures the second transmission power control information for the terminal 102 which performs communication via the second uplink carrier component.

The base station 101 can perform appropriate transmission timing control, appropriate radio resource control, and appropriate uplink transmission power control by controlling the uplink signal transmission of the respective terminals 102, namely the terminal 102 which accesses (communicates, connects) the base station 101 and the terminal 102 which accesses the RRH 103 by time, a frequency, and a control channel region including the uplink grant. In addition, the base station 101 can determine whether a signal is transmitted to the base station 101 itself depending on the time and the frequency resource of the received uplink signal and determine whether to demodulate the received signal. In addition, the RRH 103 can determine whether a signal is transmitted to the RRH 103 itself depending on the time and the frequency resource of the received uplink signal and determine whether to demodulate the received signal. When the uplink signal is received via the first uplink carrier component as the primary cell, for example, the base station 101 determines that the signal is directed to the base station 101 itself and performs the demodulation processing on the received uplink signal. In contrast, when the uplink signal is received via the second uplink carrier component as the secondary cell, the base station 101 determines that the signal is not directed to the base station 101 itself and can be controlled so as not to perform the demodulation processing on the received uplink signal. When the uplink signal is received in the uplink subframe in the first subframe subset, the base station 101 determines that the signal is detected to the base station 101 itself and performs the demodulation processing. In contrast, when the uplink signal is received in the uplink subframe in the second subframe subset, the base station 101 determines that the signal is not directed to the base station 101 itself and can be controlled so as not to perform the demodulation processing on the received uplink signal. The RRH 103 can also perform the same processing. When the uplink signal is received via the first uplink carrier component as the primary cell, the RRH 103 determines that the signal is not directed to the RRH 103 itself and does not perform the demodulation processing on the received uplink signal. In contrast, when the uplink signal is received via the second uplink carrier component as the secondary cell, the RRH 103 determines that the signal is detected to the RRH 103 itself and can be controlled to perform the demodulation processing on the received uplink signal. In addition, when the uplink signal is received in the uplink subframe in the first subframe subset, the RRH 103 determines that the signal is not directed to the RRH 103 itself and does not perform the demodulation processing on the received uplink signal. In contrast, when the uplink signal is received in the uplink subframe in the second subframe subset, the RRH 103 determines that the signal is directed to the RRH 103 itself and can be controlled to perform the demodulation processing on the received uplink signal.

The base station 101 configures various parameters for all the transmission power control information relating to the uplink signal and the transmission timing information included in the system information in order to achieve configuration appropriate for the base station 101. While the base station 101 and the terminal 102 communicate after establishment of the initial connection (RRC connection establishment), the base station 101 determines which of the base station 101 and the RRH 103 the position of the terminal 102 is closer to. When it is determined that the terminal 102 is located at a position closer to the base station 101, the base station 101 does not particularly provide configuration information, or alternatively, the base station configures transmission power control information, transmission timing control information, and transmission resource control information which are more suitable for the communication with the base station 101 and provides such information to the terminal 102 via the RRC connection reconfiguration. When it is determined that the terminal 102 is located at a position closer to the RRH 103, the base station 101 configures transmission power control information, transmission timing control information, and transmission resource control information which are more suitable for the communication with the RRH 103 and provides such information to the terminal 102 via the RRC connection reconfiguration.

Fifth Embodiment

Next, description will be given of a fifth embodiment. In the fifth embodiment, the base station 101 provides, to the terminal 102, an RRC signal including a plurality of (two or more) pieces of information on the parameter configuration relating to the uplink power control (information on first parameter configuration relating to the uplink power control and information on second parameter configuration relating to the uplink power control) and provides a DCI format including an uplink signal transmission indication to the terminal 102. The terminal 102 receives the DCI format and determines the type of the DCI format, and when the received DCI format is a first DCI format, then the terminal 102 calculates pathloss and transmission power of the uplink signal based on the first parameter configuration relating to the uplink power control. When the received DCI is a second DCI format, the terminal 102 calculates pathloss and transmission power of the uplink signal based on the second parameter configuration relating to the uplink power control and transmits the uplink signal with the uplink transmission power. Here, the first DCI format may be an uplink grant, and the second DCI format may be downlink assignment. That is, the base station 101 may independently perform the uplink transmission power control on the terminal 102 depending on the type of the DCI format. In addition, the first DCI format may be the downlink assignment, and the second DCI format may be the uplink grant. That is, any first and second DCI formats are applicable as long as the first and second DCI formats are different types of DCI formats. For example, the first DCI format may be the DCI format 0, and the second DCI format may be the DCI format 1A. Moreover, the first DCI format may be the DCI format 4, and the second DCI format may be the DCI format 2B/2C.

Even if the first DCI format and the second DCI format are the same type of DCI formats (DCI format 0, for example), it is possible to regard the DCI formats as the first DCI format and the second DCI format if different values are configured for at least control information among various pieces of control information (control fields) included in the DCI formats. For example, the DCI format 0 includes control information relating to the TPC command, and the first DCI format and the second DCI format may be distinguished from each other depending on a difference in TPC command values (indexes). Although the example of the TPC command was described herein, another control information may also be employed. For example, the DCI format 0 includes information indicating cyclic shift of the UL DMRS. If the information indicating the cyclic shift of the UL DMRS is different, the DCI formats may be distinguished from each other as the first DCI format and the second DCI format. For example, the DCI format may be distinguished as the first DCI format when the information indicating the cyclic shift of the UL DMRS is a first value, and the DCI format may be distinguished as the second DCI format when the information indicating the cyclic shift of the UL DMRS is a second value.

In addition, an information field (or information bit) indicating shift of a plurality of parameter configurations relating to the uplink power control may be configured in the DCI format. That is, it is possible to shift the two parameter configurations relating to the uplink power control depending on the information indicating the shift, for example. Here, the base station 101 can configure the two parameter configurations relating to the uplink power control for different purposes. It is possible to perform more dynamic scheduling by performing the uplink power control of the terminal 102 by the DCI format. For example, appropriate uplink transmission power control differs in a case of communicating only with the RRH 103 and in a case of performing cooperative communication configured of the base station 101 and the RRH 103. The base station 101 can dynamically perform the uplink power control in the DCI format for more appropriate scheduling. Reference signals for channel measurement such as an SRS is preferably transmitted with appropriate transmission power for each reference point.

The base station 101 can selects appropriate uplink transmission power for a plurality of base stations (a base station 1, base station 2, a base station 3, . . . ) or a plurality of RRHs (an RRH 1, an RRH 2, an RRH 3, . . . ) and can suppress interference with other terminals connected between the plurality of base stations 101 (or the plurality of RRHs 103) by configuring a plurality of parameter configurations relating to the uplink power control for a single terminal 102. That is, the base station 101 (or the RRH 103) can selects the base station 101 or the RRH 103, which is located at a position closer to the terminal 102 (which has smaller pathloss), as an uplink reception point (Uplink Reception Point), and the base station 101 or the RRH 103 as the reception point can configure parameters suitable for the uplink transmission parameter of the closer one for the terminal 102. For example, the base station (RRH) as a closer one means the base station 101 (RRH 103) which transmits a pathloss reference resource with small calculated pathloss, and the base station as a further one means the base station 101 (RRH 103) which transmits a pathloss reference resource with large calculated pathloss. The terminal 102 can specify the base station 101 and the RRH 103 (a plurality of downlink transmission points and uplink reception points, a plurality of reference points) depending on a difference in the pathloss reference resources.

In addition, the base station 101 can indicate the terminal 102 to shift the plurality of parameter configurations relating to the uplink power control (first parameter configuration relating to the uplink power control and second parameter configuration relating to the uplink power control) provided via the RRC signal in accordance with the type of the DCI format. The base station 101 can appropriately perform the uplink transmission power control by various parameters configured in the cells (the base station 101 and the RRH 103) to which the terminal 102 is connected. That is, the terminal 102 which is connected to the plurality of reception points (the base station 101 and the RRH 103 herein) can obtain an optimal throughput by appropriately performing the uplink transmission power control for each reception point (reference point). Since the shift (uplink transmission power control) of the uplink transmission power can be dynamically performed, it is possible to reduce interference with other reception points and interference with a terminal 102 connected to other reception points even in a dense area of the reception points (reference points). That is, it is possible to suppress interference with terminals in communication by using the same frequency resource.

When the first parameter configuration relating to the uplink power control and the second parameter configuration relating to the uplink power control are performed, for example, the base station 101 may provides information to the terminal 102 by the RRC signal such that information indicating the shift of the configuration is added to the DCI format.

When the terminal 102 is connected to the base station 101, the uplink transmission power is calculated by using the first parameter configuration relating to the uplink power control in which the uplink physical channel (uplink signal) is configured for the base station 101. When the terminal 102 is connected to the RRH 103, the uplink transmission power is configured by using the second parameter configuration relating to the uplink power control in which the uplink physical channel is configured for the RRH 103. Alternatively, as the uplink transmission power obtained from the first parameter configuration relating to the uplink power control and the second parameter configuration relating to the uplink power control, standard PUSCH power which compensates for power attenuating in accordance with the distance between the base station 101 (or the RRH 103) and the terminal 102 may be configured in advance. That is, the terminal 102 can perform transmission while shifting the uplink signal with relatively high transmission power and the uplink signal with relatively low transmission power by shifting the first parameter configuration relating to the uplink power control and the second parameter configuration relating to the uplink power control. Here, the relatively high transmission power means transmission power in a level in which the terminal does not function as a source of interference with other terminals, or in a level in which the transmission power compensates for high pathloss. In addition, the relatively low transmission power means transmission power in a level in which the transmission signal can reach the reception point, or in a level in which the transmission power compensates for low pathloss.

In addition, the DCI format may include information (information bit) indicating the shift of the two parameter configurations relating to the uplink power control. When the information indicating the shift is a first value ('0', for example), for example, the terminal 102 calculates the uplink transmission power based on the first parameter configuration relating to the uplink control. When the information indicating the shift is a second value ('1', for example), the terminal 102 configures the uplink transmission power based on the second parameter configuration relating to the uplink control.

The information indicating the shift may be associated with the control information included in the DCI format. For example, a value of the cyclic shift index of the UL DMRS may be associated with the information indicating the shift.

In addition, the information indicating the shift may be indicated by a code point with which the terminal 102 recognizes that the information indicating the shift is included in the DCI format when at least control information included in the DCI format is a predetermined value. For example, the terminal 102 can read information included in the DCI format in another way when predetermined information (value) is configured in first control information included in the DCI format which is transmitted from the base station 101 or the RRH 103. At this time, the predetermined information configured in the first control information can be defined as the predetermined code point in the communication system configured of the terminal 102 and the base station 101 (or the RRH 103). Here, a predetermined code point in a case where the first control information is configured of virtual resource block concentrated arrangement/distributed arrangement identification information and resource block arrangement information is a code point, one bit of which indicates '0', and all five bits of which indicate '1' when the virtual resource block concentrated arrangement/distributed arrangement identification information is represented by one bit and the resource block arrangement information is represented by five bits. The terminal 102 can recognize that the DCI format includes the information indicating the shift only when the code point is detected. That is, it is not necessary to configure the predetermined code point only by the predetermined information in the single control information. That is, the terminal 102 regards a case where a plurality of pieces of control information are respectively predetermined information as the predetermined code point and recognizes that the information indicating the shift is included in the DCI format. When the information for identifying the virtual resource block concentrated/distributed arrangement and the resource block arrangement information are represented by the predetermined information, respectively, the terminal 102 recognizes that the indication information is included in the DCI format. In other cases, the terminal 102 performs resource assignment based on the information for identifying the virtual resource block concentrated/distributed arrangement and the resource block arrangement information. For example, the control information configuring the code point may be configured of predetermined information such as information relating to the cyclic shift of the UL DMRS (Cyclic shift for DM RS and OCC index) and PUSCH frequency hopping permission information. In addition, when modulation coding scheme (Modulation and Coding Scheme) information, HARQ process number (HARQ process number) information, and NDI (New Data Indicator) information included in the DCI format are respectively predetermined information, the terminal 102 recognizes the information as the predetermined code point and recognizes that the indication information is included in the DCI format. When the code point is detected, the terminal 102 can recognize a part or an entirety of control information which is not used as the code point in the DCI format as information indicating the shift. For example, the control information recognized as the information indicating the shift may be the virtual resource block concentrated/distributed arrangement identification information. In addition, the control information recognized as the information indicating the shift may be the resource block arrangement information. Moreover, the control information recognized as the information indicating the shift may be may be the SRS request. Moreover, the control information recognized as the information indicating the shift may be the CSI request. Moreover, the control information recognized as the information indicating the shift may be the information relating to the cyclic shift of the UL DMRS. The control information recognized as the information indicating the shift may be represented by using a plurality of pieces of aforementioned control information.

When only the macro base station 101 transmits the PDCCH or the RRC signal including the control information, the macro base station 101 allows the terminal 102 to indicate whether to transmit the uplink signal to the macro base station 101 or transmit the uplink signal to the RRH 103 by the DCI format. That is, the macro base station 101 can perform control so as to transmit the uplink signal to an uplink reception point at which appropriate uplink transmission power control can be performed on the assumption of the position of the terminal 102 or the loss of the transmission power.

It is also possible to configure two or more sets of parameter configurations relating to the uplink power control in relation to the various uplink physical channels (PUSCH, PUCCH, SRS, PRACH), respectively. In one example, when two sets of parameter configurations relating to the uplink power control are configured for various uplink physical channels, information indicating the shift thereof is included in the DCI format. The information may be indicated by one bit. When the received information indicating the shift indicates a first value ('0', for example), the terminal 102 calculates various kinds of uplink transmission power by using first parameter configuration relating to the uplink power control. When the information indicating the shift indicates a second value ('1', for example), the terminal 102 calculates various kinds of uplink transmission power by using second parameter configuration relating to the uplink power control.

For example, the DCI format may include control information associated with the first parameter configuration relating to the uplink power control and the second parameter configuration relating to the uplink power control. That is, when the control information indicates the terminal 102 to configure the uplink transmission power by using the first parameter configuration relating to the uplink power control, in other words, when the control information indicates the terminal 102 to perform first power control, the terminal 102 sets the uplink transmission power based on the first parameter configuration relating to the uplink power control. In addition, when the control information indicates the terminal 102 to set the uplink transmission power by using the second parameter configuration relating to the uplink power control, in other words, when the control information indicates the terminal 102 to perform second power control, the terminal 102 sets the uplink transmission power based on the second parameter configuration relating to the uplink power control. At this time, the first parameter configuration relating to the uplink power control and the second parameter configuration relating to the uplink power control are included in the RRC signal and provided to the terminal 102. Similarly, the information indicating the shift may be indicated by two bits in the DCI format. That is, the base station 101 may shift the independent uplink transmission power control for the terminal 102 based on the control information included in the DCI format. In addition, when the control information indicates the terminal 102 to set the uplink transmission power by using third parameter configuration relating to the uplink power control, in other words, when the control information indicates the terminal 102 to perform third power control, the terminal 102 may set the uplink transmission power based on the third parameter configuration relating to the uplink power control. Moreover, when the control information indicates the terminal 102 to set the uplink transmission power by using fourth parameter configuration relating to the uplink power control, in other words, when the control information indicates the terminal 102 to perform fourth power control, the terminal 102 may set the uplink transmission power based on the fourth parameter configuration relating to the uplink power control. As described above, when the control information indicates the terminal 102 to set the uplink transmission power by using a parameter relating to uplink power control selected from among a plurality of parameter configurations relating to the uplink power control, the terminal 102 may set the uplink transmission power based on the selected parameter configuration relating to the uplink power control.

In addition, a parameter set used for the A-SRS is uniquely selected from among a plurality of A-SRS parameter sets in accordance with information indicated by an SRS request (SRS indicator) which is included in the DCI format and indicates an A-SRS transmission request. Here, the parameter configuration relating to uplink power control may be included in the A-SRS parameter set associated with the SRS request. That is, the first parameter configuration relating to the uplink power control may be included in a first SRS parameter set, and the second parameter configuration relating to the uplink power control may be included in the second SRS parameter set. Similarly, the third parameter configuration relating to the uplink power control may be included in a third SRS parameter set, and the fourth parameter configuration relating to the uplink power control may be included in a fourth SRS parameter set. As described above, the plurality of parameter sets may be respectively associated with the plurality of parameter configurations relating to the uplink power control, and the number of SRS parameter sets and the number of parameter configurations relating to the uplink power control may be four or more. In addition, the SRS parameter sets include SRS cyclic shift. Moreover, the SRS parameter sets include an SRS transmission bandwidth. Moreover, the SRS parameter sets include the number of antenna ports of the SRS. Moreover, the SRS parameter sets include a transmission comb which is a frequency offset of the SRS. Moreover, the SRS parameter sets include a hopping bandwidth. Moreover, the SRS parameter sets are referred to as A-SRS parameter sets in some cases.

The base station 101 can control the shift of the uplink reception points in an implicit manner with respect to the terminal 102 by shifting the parameter configuration relating to the uplink power control of the terminal 102.

In a case of the terminal 102 which moves at a high speed or the terminal 102 which has frequently shifted transmission/reception points, it is possible to dynamically perform the uplink transmission power control and easily obtain an appropriate throughput.

In addition, the first parameter configuration relating to the uplink power control and the second parameter configuration relating to the plink power control may respectively include a pathloss reference resource. In addition, the pathloss reference resource may be the pathloss reference resource described in the third embodiment. That is, the pathloss reference resource may include the information associated with the antenna port or the information associated with the third reference signal configuration described in the second embodiment. In addition, the information associated with the antenna port may be information associated with the antenna port 0, namely information associated with the cell-specific reference signal (CRS), or may be information associated with the antenna ports 15 to 22, namely the information associated with the channel-state information reference signal (CSI-RS). Furthermore, the first parameter configuration relating to the uplink power control and the second parameter configuration relating to the uplink power control in this embodiment may be those described in the third embodiment. That is, the first parameter configuration relating to the uplink power control and the second parameter configuration relating to the uplink power control in this embodiment may be for α which is an attenuation coefficient used in the intra-cell fractional transmission power control (that is, a pathloss compensation coefficient) or may be for $P_{O\_NOMINAL\_PUSCH,c}$ or $P_{O\_UE\_PUSCH,c}$ (that is, cell-specific or terminal-specific power control parameters relating to the PUSCH standard power). Furthermore, the first parameter configuration relating to the uplink power control and the second parameter configuration relating to the uplink power control in this embodiment may be for an power offset or a filter coefficient of the sounding reference signal. The first parameter configuration relating to the uplink power control and the second parameter configuration relating to the uplink power control in this embodiment may be for $P_{O\_NOMINAL\_PUCCH,c}$ or $P_{O\_UE\_PUCCH,c}$ (that is, cell-specific or terminal-specific power control parameters relating to the PUCCH standard power).

Sixth Embodiment

Next, description will be given of a sixth embodiment. In the sixth embodiment, the base station 101 provides the RRC signal including configuration information of a plurality of pathloss measurement reference signals to the terminal 102 and transmits the DCI format (PDCCH) to the terminal 102. The terminal 102 simultaneously perform a plurality of kinds of pathloss measurement in accordance with the information included in the RRC signal, and when the detected DCI format is a first DCI format, then the terminal 102 transmits the uplink signal with uplink transmission power calculated based on a measurement result of first pathloss measurement, and when the detected DCI format is a second DCI format, then the terminal 102 transmits the uplink signal with uplink transmission power calculated based on a measurement result of second pathloss measurement.

Here, description will be given of a case where the first DCI format and the second DCI format are different DCI formats. In one example where the first DCI format is an uplink grant, the pathloss is calculated based on a pathloss reference resource which is included in uplink transmission power control configured for scheduling the PUSCH, and the uplink transmission power is calculated from the pathloss. When the second DCI format is downlink assignment, the pathloss is calculated based on a pathloss reference resource which is included in uplink transmission power control configured for performing cooperative communication, and the uplink transmission power is calculated from the pathloss. That is, the terminal 102 can perform pathloss measurement suitable for a communication condition and perform appropriate uplink transmission power control by associating the type of the DCI format with the pathloss reference resource. For the respective pathloss reference resources associated with various DCI formats, different measurement targets (pathloss measurement reference signals) may be configured. The measurement targets described herein may be the same as those described in the first embodiment and the second embodiment. In addition, the pathloss reference resource described herein may be the same as that described in the third embodiment. In addition, the pathloss reference resource described herein may be associated with a downlink antenna port. In addition, the pathloss reference resource described herein may be associated with a downlink reference signal.

Furthermore, the first DCI format and the second DCI format include an SRS request (SRS indicator) indicating an A-SRS transmission request in some cases. At this time, the transmission power of the A-SRS is calculated by using pathloss calculated based on the pathloss reference resource associated with each DCI format. That is, when the DCI format including the SRS request is an uplink grant, the pathloss is calculated based on a pathloss reference resource (first pathloss reference resource) which is included in uplink transmission power control configured for scheduling the PUSCH, and the transmission power of the A-SRS is calculated from the pathloss. In addition, when the DCI format including the SRS request is downlink assignment, the pathloss is calculated based on a pathloss reference resource (second pathloss reference resource) which is included in uplink transmission power control configured for performing cooperative communication, and the transmission power of the A-SRS is calculated from the pathloss.

The base station 101 can perform dynamic scheduling in accordance with appropriate pathloss measurement by shifting the pathloss reference resource in the DCI format.

For the P-SRS, a pathloss reference resource used in pathloss calculation is configured in the RRC signal. For the A-SRS, the pathloss reference resource may be implicitly shifted depending on the type of the DCI format. That is, information on the pathloss reference resource for transmission power of the P-SRS may be provided to the terminal 102 in accordance with the information included in the RRC signal, and the pathloss reference resource for the transmission power of the A-SRS may be determined based on the type of the DCI format. In addition, the pathloss reference resource for the A-SRS may be determined based on information indicating the pathloss reference resource of the A-SRS included in the DCI format.

In addition, the pathloss reference resource of at least one uplink physical channel from among the PUSCH, the PUCCH, the P-SRS, and the A-SRS may be independently configured.

The first DCI format and the second DCI format may have different control information (different values) included in the DCI formats even when the DCI formats are the same type of DCI formats. When the control information is represented by indexes and the indexes are assigned to different values, for example, it is possible to regard the DCI formats as different DCI formats.

When the first DCI format and the second DCI format include the SRS requests, the pathloss reference resource for the A-SRS may be determined in association with the type of the DCI format including the SRS requests.

When the terminal 102 is connected to the base station 101, the uplink transmission power is calculated by using parameter configuration relating to the uplink power control (first parameter configuration relating to the uplink power control) in which the uplink physical channel (uplink signal) is configured for the base station 101. In addition, when the terminal 102 is connected to the RRH 103, the uplink transmission power is calculated by using parameter configuration relating to the uplink power control (second parameter configuration relating to the uplink power control) in which the uplink physical channel is configured for the RRH 103. Information relating to reconfiguration of the parameters relating to the uplink power control is provided by the RRC signal.

In addition, the DCI format may include information (pathloss reference resource indication information) for providing an indication about which of the pathloss reference resources is to be used for calculating the pathloss. That is, when the indication information is configured of a first value and a second value (that is, a plurality of values) and the indication information is the first value (an index is '0', for example), the terminal 102 calculates the pathloss by using a first pathloss reference resource. When the indication information is the second value (the index is '1', for example), the terminal 102 calculates the pathloss by using a second pathloss reference resource. The indication information may be for configuring only a pathloss reference resource of the A-SRS. In addition, the indication information may be for configuration pathloss reference resources of all the uplink physical channels. That is, the indication information can provide an indication about a pathloss reference resource of at least one uplink physical channel.

The indication information may be associated with the control information included in the DCI format. For example, the cyclic shift index value of the UL DMRS and the information indicating the shift may be associated.

In addition, when at least a piece of control information included in the DCI format is a predetermined value, and the indication information is included in the DCI format, the indication information may be represented by a code point which is recognized by the terminal 102. When predetermined information (value) is configured in first control information included in the DCI format transmitted from the base station 101 or the RRH 103, for example, the terminal 102 can read in another way the information included in the DCI format. At this time, the predetermined information configured in the first control information can be defined as the predetermined code point in the communication system configured of the terminal 102 and the base station 101 (or the RRH 103). Here, the predetermined code point in the case where the first control information is configured of the virtual resource block concentrated arrangement/distributed arranged identification information and the resource block arrangement information is a code point, one bit of which indicates '0', and all five bits of which indicate '1' when the virtual resource block concentrated arrangement/distributed arrangement identification information is represented by one bit and the resource block arrangement information is represented by five bits. The terminal 102 can recognize that the indication information is included in the DCI format only when the code point is detected. That is, the predetermined code point may not be configured only by the predetermined information in a single piece of control information. That is, the terminal 102 regards a case where a plurality of pieces of control information are respective predetermined information as the predetermined code point and recognizes that the indication information is included in the DCI format. When the information for identifying the virtual resource block concentrated/distributed arrangement and the resource block arrangement information are respectively represented by predetermined information, for example, the terminal 102 recognizes that the indication information is included in the DCI format. In other cases, the terminal 102 performs resource assignment based on the information for identifying the virtual resource block concentrated/distributed arrangement and the resource block arrangement information. For example, the control information indicating the code point may be configured of predetermined information in information relating to the cyclic shift of the UL DMRS (Cyclic shift for DM RS and OCC index) and PUSCH frequency hopping permission information. In addition, when a modulation coding scheme (MCS: Modulation and Coding Scheme) information, HARQ process number (HARQ process number) information, and NDI (New Date Indicator) information included in the DCI format are respectively predetermined information, the terminal 102 recognizes the predetermined code point and recognizes that the indication information is included in the DCI format. When the code point is detected, the terminal 102 can recognize a part or an entirety of the control information which is not used as the code point in the DCI format as the information indicating the shift thereof. For example, the control information recognized as the information indicating the shift may be the virtual resource block concentrated/distributed arranged identification information. In addition, the control information recognized as the information indicating the shift may be the resource block arrangement information. In addition, the control information recognized as the information indicating the shift may be the SRS request. In addition, the control information recognized as the information indicating the shift may be the CSI request. In addition, the control information recognized as the information indicating the shift may be the information relating to the cyclic shift of the UL DMRS. The control information recognized as the information indicating the shift may be represented by using the plurality of pieces of aforementioned control information.

The base station 101 can control the shift of the uplink reception point (reference point) in the implicit manner with respect to the terminal 102 by shifting the pathloss reference resource of the terminal 102.

In addition, the SRS request (SRS indicator) included in a DCI format 4 is represented by a plurality of indexes (values, numbers). For example, it is possible to regard the DCI format 4 in which an "SRS request index 1" associated with a first A-SRS parameter set is configured as a first DCI format and to regard the DCI format 4 in which an "SRS request index 2" associated with a second A-SRS parameter set is configured as a second DCI format. That is, the SRS request index and the pathloss reference resource may be associated in the case of the A-SRS. In addition, the pathloss reference resource of the A-SRS may be configured as one of the A-SRS parameters included in the A-SRS parameter set. In addition, the base station 101 can perform appropriate shift (reconfiguration) of the reception point and appropriate resource assignment by calculating the transmission power of the A-SRS based on the pathloss for the A-SRS which is calculated from the pathloss reference resource associated with the uplink reception point for the terminal 102 and performing channel measurement based on the A-SRS at the reception point. That is, the base station 101 can dynamically perform appropriate uplink scheduling. In other words, the terminal 102 calculates the pathloss of the A-SRS based on a first pathloss reference resource when the SRS request index is a first value (an SRS request index 1, for example) and calculates the pathloss of the A_SRS based on a second pathloss reference resource when the SRS request index is a second value (an SRS request index 2, for example). At least one index among the plurality of indexes included in the SRS request may be associated with a pathloss reference resource which is configured for backhaul (backhaul) for reconnection to the base station 101 or the RRH 103. In addition, at least one index among the plurality of indexes included in the SRS request may be associated with a pathloss reference resource configured for a reference point (the base station 101 or the RRH 103) to which the terminal 102 is connected. The SRS request index and the pathloss reference resource may be associated. A pathloss reference resource for backhaul may be configured in advance in the communication system configured of the base station 101, the terminal 102, and the RRH 103.

In the case of the P-SRS, the pathloss reference resource used in pathloss calculation may be shifted by the RRC signal. In the case of the A-SRS, the pathloss reference resource may be shifted by information indicating the shift of the pathloss reference resource included in the DCI format. That is, in the terminal 102, the pathloss reference resource for the transmission power of the P-SRS is configured in accordance with the information included in the RRC signal, and the pathloss reference resource for transmission power of the A_SRS may be configured in accordance with the information included in the DCI format.

In addition, the pathloss reference resources for the uplink signals to be transmitted to a plurality of uplink reception points may be independently configured. That is, the uplink reception points (reference points) and the pathloss reference resources may be associated.

In addition, the DCI format may include control information associated with a first pathloss reference resource and a second pathloss reference resource (that is, a plurality of pathloss reference resources). When first pathloss control is configured in the control information, for example, the terminal 102 calculates the pathloss based on the first pathloss reference resource. In addition, when second pathloss control is configured in the control information, the terminal 102 calculates the pathloss based on the second pathloss reference resource. The terminal 102 can shift the first pathloss reference resource or the second pathloss reference resource based on the control information, calculate the pathloss, set the transmission power of the uplink physical channel based on the pathloss calculation result, and transmit the uplink physical channel with the transmission power. In addition, when third pathloss control is configured in the control information, the terminal 102 calculates the pathloss based on a third pathloss reference resource. Moreover, when fourth pathloss control is configured in the control information, the terminal 102 calculates the pathloss based on a fourth pathloss reference resource.

When the pathloss reference resource of the A-SRS is shifted (reconfigured) by the DCI format, the pathloss reference resource of the P-SRS may also be shifted (may be reconfigured).

Seventh Embodiment

Next, description will be given of a seventh embodiment. In the seventh embodiment, the base station 101 configures an uplink physical channel, configures a pathloss reference resource for each uplink physical channel, and provides an RRC signal including the configuration information to the terminal 102. The terminal 102 configures uplink physical channels according to the information (configuration information and control information) included in the RRC signal, configures parameters relating to uplink power control for each uplink physical channel, configures transmission power of the various uplink physical channels based on the parameters relating to uplink power control, and transmits the uplink physical channel with the transmission power.

In addition, in a case where the information of the pathloss reference resources for the various uplink physical channels is provided by using the RRC signal, a pathloss reference resource for calculating transmission power of PUSCH may be configured in terminal-specific PUSCH configuration (PUSCH-ConfigDedicated). A pathloss reference resource for calculating transmission power of PUCCH may be configured in terminal-specific PUCCH configuration (PUCCH-ConfigDedicated). A pathloss reference resource for calculating transmission power of P-SRS may be configured in terminal-specific sounding reference signal UL configuration (SoundingRS-UL-ConfigDedicated). A pathloss reference resource for calculating transmission power of A-SRS may be configured in SRS configuration aperiodic (SRS-ConfigAp). A pathloss reference resource for calculating transmission power of PRACH may be configured in PRACH configuration information (PRACH-ConfigInfo). The configuration information is provided from the base station 101 to the terminal 102 by the RRC signal. In other words, the pathloss reference resource may be configured in terminal-specific parameter configuration of various uplink physical channels. That is, the base station 101 configures the pathloss reference resource of each uplink physical channel to be assigned to the terminal 102 for each terminal 102, allows the configuration information to be included in the RRC signal, and provides the configuration information. In addition, the pathloss reference resource may include information associated with an antenna port, and may include information associated with the third reference signal configuration described in the second embodiment. Further, the association with an antenna port may be association with the antenna port 0, that is, the cell-specific reference signal (CRS), or may be association with the antenna ports 15 to 22, that is, the channel-state information reference signal (CSI-RS).

In addition, the pathloss reference resources for various uplink physical channels may be included and configured in cell-specific parameter configuration.

Further, the pathloss reference resources for the various uplink physical channels (PUSCH, PUSCH, SRS (P-SRS or A-SRS), and PRACH) may be configured in parameter configuration relating to terminal-specific uplink power control (UplinkPowerControlDedicated). The pathloss reference resources for the various uplink physical channels may be configured in parameter configuration relating to cell-specific uplink power control (UplinkPowerControlCommon). In addition, the aforementioned various uplink signals have the same meaning as that of the various uplink physical channels.

In a case where the base stations 101 (or the RRHs 103) which receive the uplink physical channels are different depending on the kinds of uplink physical channels, among the plurality of base stations, the base station 101 close to the terminal 102 (with smaller pathloss) is assumed to be a base station A, and the base station 101 separated from the terminal 102 (with larger pathloss) is assumed to be a base station B. The PUSCH is transmitted to the base station A, and the SRS is transmitted to the base station B. Since common pathloss reference resources are transmitted from different base stations, they are synthesized and received by the terminal 102. If a pathloss is calculated from the same pathloss reference resource and transmission power is calculated in any uplink physical channel, the pathloss is calculated from the synthesized pathloss reference resource received power, and thus accurate pathloss between the base station A and the terminal 102 and pathloss between the base station B and the terminal 102 cannot be obtained. For this reason, if the PUSCH is transmitted to the base station A with transmission power higher than appropriate transmission power, and the SRS is transmitted to the base station B with transmission power lower than the appropriate transmission power, in the base station A, the PUSCH transmitted from the terminal 102 serves as an interference source for other terminals, and in the base station B, an appropriate channel measurement cannot be performed from the SRS transmitted from the terminal 102, and thus appropriate scheduling cannot be performed. Particularly, the SRS is a channel which is required to perform a channel measurement between the base station 101 and the terminal 102, and uplink scheduling is performed from a channel measurement result thereof. Therefore, if appropriate channel measurement is not performed between the base station A and the terminal 102 and between the base station B and the terminal 102, the base station 101 which is the closest to the terminal 102 cannot be selected, and thus it is difficult to obtain an appropriate throughput with appropriate transmission power. In addition, at this time, a distance between the terminal 102 and the base station 101 (close to or distant from the terminal 102) is estimated by a pathloss. In other words, the base station 101 (or the RRH 103) determines that a distance from the terminal 102 is short if the pathloss is small, and determines that a distance from the terminal 102 is long if the pathloss is large. Further, a magnitude of the pathloss may be determined based on a threshold value. The base station 101 performs control so that a reception point close to the terminal 102 is connected to the terminal 102.

The terminal 102 which can calculate respective pathloss from a plurality of pathloss reference resources may use calculation results of the respective pathloss for transmission power control of the various uplink physical channels. In other words, the terminal 102 may configure transmission power of the various uplink physical channel based on the calculation results of pathloss using the pathloss reference resources configured in the respective uplink physical channels. For example, pathloss of each channel may be calculated based on a first pathloss reference resource in relation to the PUSCH, a second pathloss reference resource in relation to the PUCCH, a third pathloss reference resource in relation to the PRACH, a fourth pathloss reference resource in relation to the P-SRS, and a fifth pathloss reference resource in relation to the A-SRS. The channels and the pathloss reference resources may be a correlated with each other, and configuration information thereof may be provided by high-order layer signaling. In addition, the pathloss reference resources may be ones described in the third embodiment. Further, the pathloss reference resources may be downlink reference signals correlated with antenna ports. Furthermore, the pathloss reference resources may be designated by the antenna ports. Here, the configuration information of the pathloss reference resources may be provided to the terminal 102 by the RRC signal. Moreover, the configuration information of the pathloss reference resources may be included in a DCI format, and the information thereof may be provided to the terminal 102. Here, the configuration information of the pathloss reference resources may be included in cell-specific or terminal-specific configuration of each uplink physical channel. In addition, the configuration information of the pathloss reference resources may be included in parameter configuration relating to uplink power control which is included in configuration of each uplink physical channel. Further, the pathloss reference resources configured in the various uplink physical channels may be configured independently, and the same kind of pathloss reference resource may not necessarily be configured. In other words, information pieces correlated with the antenna ports may not the same as each other in the pathloss reference resource.

In addition, a plurality of pathloss reference resources may be configured in some of the uplink physical channels. For example, parameter sets corresponding to a value of an SRS request may be configured in the A-SRS, and a pathloss reference resource may be configured for each of the parameter sets therein. For example, as pathloss reference resources of the A-SRS, the first pathloss reference resource to the fourth pathloss reference resource may be configured. Further, the fifth pathloss reference resource may be configured in the P-SRS.

As for the PUSCH, PUCCH, PRACH, and P-SRS, pathloss may be calculated based on the same pathloss reference resource, and, as for the A-SRS, pathloss may be calculated based on a pathloss reference resource different from that. In other words, a pathloss reference resource may be configured independently in some of the uplink physical channels. In addition, as for at least one of the uplink physical channels, information of the pathloss reference resource may be sent by the RRC signal. Further, as for at least one of the uplink physical channels, information of the pathloss reference resource may be provided in a DCI format.

The same kind of pathloss reference resources transmitted by a plurality of base station 101 and RRH 103 (a plurality of reference points) are synthesized in the terminal 102. If pathloss is calculated based on the synthesized pathloss reference resource, pathloss at a reference point distant from the terminal 102 cannot be reflected. If uplink transmission power is calculated by using the pathloss, and an uplink signal is transmitted, there is a possibility that the signal may not reach the distant reference point. In addition, if pathloss is calculated based on the synthesized pathloss reference resource received power, and uplink transmission power is calculated, an uplink signal does not reach the base station 101 or the RRH 103 when uplink transmission power of the uplink signal transmitted from the terminal 102 is relatively low, and the uplink signal is an interference source for other terminals when the uplink transmission power is relatively high.

Further, a synthesized downlink signal transmitted from the base station 101 and the RRH 103 (a plurality of downlink transmission points) cannot be separated in the terminal 102, and thus pathloss based on a downlink signal transmitted from each of the base station 101 and the RRH 103 cannot be accurately measured. The base station 101 is required to configure a pathloss reference resource for each downlink transmission point in order to measure pathloss of a downlink signal transmitted from the plurality of downlink transmission points.

In a case where the terminal 102 transmits the PRACH to the base station 101 and the RRH 103 (or a plurality of reference points), pathloss reference resources used for calculation of transmission power of the transmitted PRACH may be different. In other words, transmission power control of the PRACH to the base station 101 and the RRH 103 may be performed based on pathloss reference resources which are respectively transmitted from the base station 101 and the RRH 103. In addition, in order to perform random access to the base station 101 or the RRH 103, the base station 101 may include information for indication of changing pathloss reference resources of the PRACH in the RRC signal and provide information thereof to the terminal 102, and the terminal 102 may configure (reconfigure) a pathloss reference resource of the PRACH according to the changing information included in the RRC signal.

In addition, parameters or parameter configures relating to uplink power configuration which are configured to different values for the various uplink physical channels may be configured in the terminal 102. FIG. 34 illustrates an example of parameters relating to uplink power control which is configured in each uplink physical channel. In FIG. 34, parameter configuration (UplinkPowerControl) relating to uplink power control is configured for each of terminal-specific configuration (terminal-specific PUCCH configuration-v11x0 (PUCCH-ConfigDedicated-v11x0), terminal-specific PUSCH configuration-v11x0 (PUSCH-ConfigDedicated-v11x0), terminal-specific sounding reference signal UL configuration-v11x0 (SoundingRS-UL-ConfigDedicated-v11x0), and aperiodic SRS configuration-r11 (SRS-ConfigAp-r11)) of the PUCCH, PUSCH, P-SRS, and A-SRS. In addition, power ramping step (powerRampingStep) and preamble initial received target power (preambleInitial ReceivedTargetPower) are configured in the PRACH and a random access channel (RACH). The parameter configuration relating to uplink power control may be one illustrated in FIG. 22. A pathloss reference resource may be configured in this configuration. Further, the pathloss reference resource may include information correlated with an antenna port, and may include information correlated with the third reference signal configuration described in the second embodiment. Furthermore, Further, the correlation with an antenna port may be a correlation with the antenna port 0, that is, the cell-specific reference signal (CRS), and may be a correlation with a downlink reference signal correlated with the antenna ports 15 to 22, that is, the channel-state information reference signal (CSI-RS).

For example, a set of various power control parameter (first power control parameter set) which are configured to be relatively high transmission power when pathloss is not taken into consideration, and a set of various power control parameter (second power control parameter set) which are configured to be relatively low transmission power, are configured in the terminal 102. The base station 101 allows information indicating changing between the first and second power control parameter sets to be included in the RRC signal or in the DCI format (PDCCH) and provides information thereof to the terminal 102. The terminal 102 calculates uplink transmission power for the various uplink physical channels based on the information, and transmits uplink physical channels (uplink signals). In addition, values of the various parameters included in the power control parameter set are configured by the base station 101 in consideration of a result of measurement report, a channel measurement result using the SRS, a measurement result included in power headroom reporting (PHR) for information of a power surplus value of the terminal 102, or the like.

For example, information for an indication of changing the parameter sets relating to uplink power control may be configured in each uplink physical channel. In addition, the information indicating the shift may be provided to each terminal 102 by the RRC signal. Further, the information indicating the shift may be included in the DCI format.

Two information pieces (information bits) for an indication of changing the parameter sets relating to uplink power control may be included in the DCI format. For example, in a case where the information indicating the shift has a first value (for example, "0"), the terminal 102 calculates uplink transmission power based on the first parameter configuration relating to uplink control, and, in a case where the information indicating the shift has a second value (for example, "1"), the terminal 102 configures uplink transmission power based on the second parameter configuration relating to uplink control.

The information indicating the shift may be correlated with control information included in the DCI format. For example, a value of a cyclic shift index for UL DMRS may be correlated with the information indicating the shift.

In addition, the information indicating the shift may be represented by a code point recognized by the terminal 102 when information for an indication of a change to the DCI format is included in a case where at least one piece of control information has a predetermined value. For example, in a case where predetermined information (value) is configured in first control information included in the DCI format which is transmitted from the base station 101 or the RRH 103, the terminal 102 may replace the information included in the DCI format. At this time, in a communication system constituted by the terminal 102 and the base station 101 (or the RRH 103), the predetermined information which is configured in the first control information may be defined by a predetermined code point. Here, the predetermined code point when the first control information is formed by the information for identifying resource block concentrated arrangement/distributed arrangement and resource block arrangement information corresponds to a case where, when the information for identifying resource block concentrated arrangement/distributed arrangement is represented by 1 bit, and the resource block arrangement information is represented by 5 bits, 1 bit indicates '0', and 5 bits all indicate '1'. The terminal 102 can recognize that information for an indication of changing the DCI format is included therein only when the code point is detected. In other words, the predetermined code point may not be formed by only one piece of control information. That is, only when a plurality of control information pieces are respectively predetermined information pieces, the terminal 102 regards the information as a predetermined code point, and recognizes that information indicating the shift of the DCI format is included therein. For example, when information for identifying the virtual resource block concentrated/distributed arrangement and the resource block arrangement information are respectively represented by predetermined information, the terminal 102 recognizes that the information indicating the shift is included in the DCI format. In other cases, the terminal 102 assigns a resource based on the information for identifying the virtual resource block concentrated arrangement/distributed arrangement and the resource block arrangement information. For example, the control information forming a code point may be formed by information (Cyclic shift for DMRS and OCC index) on cyclic shift for UL DMRS, and predetermined information of permission information of frequency hopping of the PUSCH. In addition, in a case where modulation and coding scheme (MCS) information, HARQ process number information, and new data indicator (NDI) information included in the DCI format are respectively predetermined information, the terminal 102 recognizes the predetermined information as a predetermined code point, and recognizes that the indication information is included in the DCI format. In a case where the code point is detected, the terminal 102 may recognize that some or all control information pieces which are not used in a code point of the DCI format as the information indicating the shift. For example, control information which is recognized as the information indicating the shift may be the information for identifying virtual resource block concentrated arrangement/distributed arrangement. In addition, control information which is recognized as the information indicating the shift may be the resource block arrangement information. Further, control information which is recognized as the information indicating the shift may be the SRS request. Furthermore, control information which is recognized as the information indicating the shift may be the CSI request. Moreover, control information which is recognized as the information indicating the shift may be the information on cyclic shift for UL DMRS. Control information which is recognized as the information indicating the shift may be represented by using the plurality of aforementioned control information pieces.

For example, a plurality of $P_{O\_NOMINAL\_PUSCH}$ or $P_{O\_UE\_PUSCH}$ are configured in the PUSCH. A plurality of $P_{O\_NOMINAL\_PUCCH}$ or $P_{O\_UE\_PUCCH}$ are configured in the PUCCH. In addition, a plurality of control information pieces may be configured for each of various power control parameters. Further, a plurality of control information pieces may be configured for each of parameter sets. Furthermore, a plurality of SRS power offsets may be configured in the SRS. A plurality of initial received power of random access preamble or power ramping steps may be configured in the PRACH. The terminal 102 configures transmission power of the uplink physical channel. In other words, a plurality of parameters relating to uplink power control may be configured in at least some of the uplink physical channels. That is, the first and second parameters relating to uplink power control may be configured in at least some of the uplink physical channels. Configuration information of the parameters relating to uplink power control may be dynamically controlled according to information indicating the shift thereof.

A single parameter relating to uplink power control is configured in each of the various uplink physical channels. The parameters relating to uplink power control may include at least one power control parameter among parameter configurations relating to the aforementioned cell-specific or terminal-specific configured uplink power control. For example, $P_{O\_NOMINAL\_PUSCH}$ or $P_{O\_UE\_PUSCH}$ may be configured. In addition, $P_{O\_NOMINAL\_PUCCH}$ or $P_{O\_UE\_PUCCH}$ may be configured. Further, the SRS power offset may be configured. Furthermore, the initial received power of random access preamble or the power ramping step may be configured. Moreover, the filter coefficient or pathloss compensation coefficient α may be configured.

In addition, the base station 101 may configure transmission power of a downlink reference signal which is transmitted to each terminal 102. The base station 101 may configure the second reference signal power (referenceSignalPower2) in the terminal-specific PDSCH configuration (PDSCH-ConfigDedicated), and may provide information thereof to the terminal 102. For example, the second reference signal power may be configured as transmission power of DL DMRS or CSI-RS. In addition, not only the second reference signal power but also reference signal power related to a downlink antenna port may be configured. Further, reference signal power for each pathloss reference resource. Furthermore, information correlated with an antenna port may be correlated with reference signal power.

In addition, the base station 101 may configure transmission power of various downlink reference signals or a downlink reference signal correlated with a downlink antenna port for each terminal 102.

Further, the base station 101 may add a pathloss reference resource to cell-specific parameter configuration of the various uplink physical channels.

Furthermore, the base station 101 may add a pathloss reference resource to terminal-specific parameter configurations of the various uplink physical channels.

A plurality of pathloss reference resources may be correlated with a plurality of parameter configurations relating to uplink power control. For example, in a case where a pathloss reference resource of the PUSCH is configured to the CRS antenna port 0, the terminal 102 may configure transmission power of the PUSCH based on a first parameter configuration relating to uplink power control. In addition, in a case where a pathloss reference resource of the PUSCH is configured to the CSI-RS antenna port 15, the terminal 102 may set transmission power of the PUSCH based on a second parameter configuration relating to uplink power control.

In addition, a plurality of pathloss reference resources may be configured in some of the uplink physical channels. For example, a first pathloss reference resource and a second pathloss reference resource include information pieces correlated with different antenna ports. Further, different downlink reference signals are configured in the first pathloss reference resource and the second pathloss reference resource. As an example, the first pathloss reference resource is the CRS, and the second pathloss reference resource may be the CSI-RS. Furthermore, as another example, the first pathloss reference resource may be a resource configured to the antenna port 15, and the first pathloss reference resource may be a resource configured to the antenna port 22. The first pathloss reference resource and the second pathloss reference resource may be one of information pieces correlated with the antenna ports.

The parameter configurations relating to uplink power control may be respectively configured in the various uplink physical channels. For example, a first parameter configuration relating to uplink power control may be configured in the PUSCH; a second parameter configuration relating to uplink power control may be configured in the PUCCH; a third parameter configuration relating to uplink power control may be configured in the PRACH; a fourth parameter configuration relating to uplink power control may be configured in the P-SRS; and a fifth parameter configuration relating to uplink power control may be configured in the A-SRS. Power control parameters which are configured in the first parameter configuration relating to uplink power control to the fifth parameter configuration relating to uplink power control may not be necessarily the same as each other.

For example, the first parameter configuration relating to uplink power control to the third parameter configuration relating to uplink power control may include only a terminal-specific configuration. In addition, the fourth parameter configuration relating to uplink power control and the fifth parameter configuration relating to uplink power control may include only cell-specific and terminal-specific configurations. Further, the first parameter configuration relating to uplink power control to the fifth parameter configuration relating to uplink power control may respectively include cell-specific and terminal-specific configurations, but values of various power control parameters may not be necessarily the same as each other. In other words, values of the various power control parameters may not be configured to the same values. That is, parameters relating to power control, which are configured to different values, may be formed by a first parameter relating to power control and a second parameter relating to power control.

In addition, a single parameter configuration relating to uplink power control may be configured in the various uplink physical channels. In other words, the same power control parameter set may be configured in the various uplink physical channels, but a value included in a power control parameter is determined for each uplink physical channel.

In addition, a plurality of parameter configurations relating to uplink power control may be configured in at least some of the uplink physical channels. For example, the parameter configurations relating to uplink power control may be respectively included in SRS parameter sets correlated with an SRS request (SRS indicator) indicating a transmission request of the A-SRS. In other words, in a case where four SRS parameter ses are configured, four parameter configurations relating to uplink power control are configured. In addition, a plurality of parameter configurations relating to uplink power control may also be in the PRACH. Further, a plurality of parameter configurations relating to uplink power control may also be in the PUSCH.

Furthermore, in a case where first and second parameters relating to uplink power control (or power control parameter sets) are configured in at least some of the uplink physical channels, the first and second parameters relating to uplink power control are configured to different parameters. Moreover, the first and second parameters relating to uplink power control are configured to different values. In addition, various parameters included in the first and second parameter sets relating to uplink power control may not be necessarily configured to the same parameter. As an example, various parameters included in the first parameter set relating to uplink power control may be configured only to the SRS power offset, and various parameters included in the second parameter set relating to uplink power control may be configured to the SRS power offset and standard PUSCH power. As another example, various parameters included in the first parameter set relating to uplink power control may be various parameters included in a cell-specific parameter configuration relating to uplink power control, and various parameters included in the second parameter set relating to uplink power control may be various parameters included in a terminal-specific parameter configuration relating to uplink power control. Further, as still another example, various parameters included in the first parameter set relating to uplink power control and the second parameter set relating to uplink power control may be configured to various parameters included in cell-specific parameter configuration relating to uplink power control and a terminal-specific parameter configuration relating to uplink power control. In other words, at least one of the parameters illustrated in FIG. 22 may be included in the parameter set relating to uplink power control. Furthermore, only a pathloss reference resource may be included in the parameter set relating to uplink power control.

If the parameter configurations relating to uplink power control or the pathloss reference resources are respectively configured in the various uplink physical channels, the terminal 102 can calculate transmission power of each uplink physical channel based on the configurations. The P-SRS or the A-SRS may be used for a channel measurement for backhaul or pre-examination in order to change reference points. The base station 101 can control the terminal 102 to constantly communicate with an appropriate reference point on the basis of a channel measurement result using the SRS.

The base station 101 can appropriately perform uplink transmission power control of the various uplink physical channels for each reference point (uplink reception point) by configuring the parameter configuration relating to uplink power control for each uplink physical channel. For example, since transmission power assigned to the PUSCH or the PUCCH is increased if the terminal 102 can communicate with a reference point with small pathloss, uplink communication can be performed by employing a modulation method of a high modulation degree such as 16QAM or 64QAM, and thus a throughput is improved.

Eighth Embodiment

Next, description will be given of an eighth embodiment. In the eighth embodiment, the base station 101 provides information of the DCI format which includes a first or second TPC command to the terminal 102. If the DCI format is detected in a first state, the terminal 102 determines that a TPC command included in the DCI format is the first TPC command, and performs a demodulation process thereon so as to acquire a power correction value. If the DCI format is detected in a second state, the terminal 102 determines that a TPC command included in the DCI format is the second TPC command, and performs a demodulation process thereon so as to acquire a power correction value. The power correction value includes a power correction value $\delta_{PUSCH,c}$ of the PUSCH or a power correction value $\delta_{PUCCH,c}$ of PUCCH. In addition, the power correction value obtained from the TPC command includes a power correction value $\delta_{SRS,c}$ of the SRS. The modulation process mentioned here indicates that a power correction value is acquired from the TPC command. Further, the state may be identified by using specific information. Furthermore, the state may be identified based on a specific parameter configured.

In a case of the first state, if the DCI format is detected, the terminal 102 determines that a TPC command included in the DCI format is the first TPC command, and performs a demodulation process thereon so as to detect a power correction value which is configured in the first TPC command. In addition, in a case of the second state, if the DCI format is detected, the terminal 102 determines that a TPC command included in the DCI format is the second TPC command, and performs a demodulation process thereon so as to detect a power correction value which is configured in the second TPC command. The power correction value is reflected in transmission power of an uplink signal, and the uplink signal is transmitted with the transmission power. Here, the first TPC command and the second TPC command are formed by a different number of bits. Further, the first TPC command and the second TPC command are different in at least one power correction value among power correction values which are managed in a table form. In other words, the first TPC command and the second TPC command may be configured in different DCI formats. Furthermore, the first TPC command and the second TPC command may be configured in the same DCI format.

FIG. 35 is a diagram illustrating an example in which the numbers of bits or indexes forming a first TPC command field and a second TPC command field are different. FIG. 35(a) illustrates the first TPC command field, and the first TPC command field is formed by 2 bits (indexes 0 to 3). FIG. 35(b) illustrates the second TPC command field, and the second TPC command field is formed by 3 bits (indexes 0 to 8). The illustrated power correction value is an example, and is not limited to this value. In addition, the power correction value of the PUSCH is illustrated, but the PUCCH or the SRS may also be illustrated in the same manner.

FIG. 36 is a diagram illustrating a case where the first TPC command field and the second TPC command field are managed based on different tables. Power correction values recorded in the first TPC command field and the second TPC command field do not completely match each other, and at least one power correction value may be configured to a different value. In other words, the first TPC command field and the second TPC command field are formed by the same number of bits, but power correction values configured therein may be configured to different values. In addition, the power correction value of the PUSCH is illustrated, but the PUCCH or the SRS may also be illustrated in the same manner.

For example, in a case of the first state, if the DCI format is detected, the terminal 102 determines that the TPC command is formed by 2 bits (a first number of bits), and performs a demodulation process thereon so as to the TPC command. In a case of the second state, if the DCI format is received, the terminal determines that the TPC command is formed by 3 bits (a second number of bits), and performs a demodulation process thereon so as to the TPC command. An index (TPC command index) and a power correction value (Accumulated, Absolute) correlated with the TPC commands in 2 bits and 3 bits between the base station 101 and the terminal 102 are managed in the table. This table is referred to as a TPC command field. In addition, a TPC command field in the second state may be formed by 4 bits. A TPC command in the second state may be formed by n bits (where n is an integer of 4 or more). The second number of bits forming a TPC command field in the second state may be m bits (where m is an integer of 3 or more). Further, here, although the first number of bits is 2 bits, and the second number of bits is 3 bits, the first number of bits may be 3 bits, and the second number of bits may be 4 bits. Furthermore, the first number of bits may be 1 bit, and the second number of bits may be 2 bits. In other words, the first number of bits and the second number of bits may be different from each other. Moreover, a TPC command whose number of bits is changed depending on a state of the terminal 102 may be only a TPC command for the PUSCH. In addition, a TPC command whose number of bits is changed depending on a state of the terminal 102 may be only a TPC command for the PUCCH.

Here, the terminal 102 in the first state indicates the terminal 102 in which only a single CSI-RS configuration (CSI-RSConfig) which is configuration information of a parameter relating to the CSI-SR is configured, and the terminal 102 in the second state is the terminal 102 in which two or more CSI-RS configurations are configured. In addition, the terminal 102 in the first state indicates the terminal 102 in which a first transmission mode is configured, and the terminal 102 in the second state indicates the terminal 102 in which a second transmission mode is configured. Further, configuration information on the first state is provided from the base station 101 to the terminal 102, and configuration information on the second state is provided from the base station 101 to the terminal 102. Furthermore, the terminal 102 in the first state indicates the terminal 102 of which the CRS is configured in a pathloss reference resource, and the terminal 102 in the second state indicates the terminal 102 of which downlink reference signals other than the CRS are configured in the pathloss reference resource. Moreover, the terminal 102 in the first state indicates the terminal 102 in which a downlink reference signal (DRS) used for RSRP measurement is the CRS, and the terminal 102 in the second state indicates the terminal 102 in which a DRS used for RSRP measurement is the CSI-RS. Furthermore, the terminal 102 in the first state indicates the terminal 102 which receives a control signal only in a first control channel region, and the terminal 102 in the second state indicates the terminal 102 which can detect a downlink control signal (a PDCCH or an X-PDCCH) in the first control channel region and/or a second control channel region.

In addition, the terminal 102 in the first state and the terminal 102 in the second state may be different in a DCI format size in relation to at least one kind of DCI format. In other words, in the first state and the second state, a size of the DCI format may be varied for the same DCI format. For example, a size of the DCI format may be the number of bits forming the DCI format. Further, the terminal 102 may recognize, as a different state, a case where a reference signal configured in the second measurement target configuration.

If the DCI format is detected in the first state, the terminal 102 determines that a TPC command included in the DCI format is the first TPC command in any downlink subframe, and performs a demodulation process thereon. In the second state, if the DCI format is detected in a downlink subframe included in a first subframe subset, the terminal 102 determines that a TPC command included in the DCI format is the first TPC command, and performs a demodulation process thereon. If the DCI format is detected in a downlink subframe included in a second subframe subset, the terminal determines that a TPC command included in the DCI format is the second TPC command, and performs a demodulation process thereon. For example, if the DCI format is detected in the first state, the terminal 102 determines that the TPC command has 2 bits in any subframe, and performs a demodulation process thereon so as to acquire a power correction value. If the DCI format is received in the second state, the terminal 102 determines that the TPC command has 2 bits in the first subframe subset, and performs a demodulation thereon, and determines that the TPC command has 3 bits in the second subframe subset, and performs a demodulation process thereon so as to acquire a power correction value.

If the DCI format is detected in a first control channel region and a second control channel region in the first state, the terminal 102 performs a demodulation process on a TPC command included in the DCI format, as the first TPC command. If the DCI format is detected in the first control channel region in the second state, the terminal 102 performs a demodulation process on a TPC command included in the DCI format, as the first TPC command. If the DCI format is detected in the second control channel region, the terminal 102 performs a demodulation process on the TPC command included in the DCI format, as a second TPC command. For example, if the DCI format is detected in the first control channel region and the second control channel region in the first state, the terminal 102 determines that the TPC command has 2 bits, and performs a demodulation process thereon. If the DCI format is received in the first control channel region in the second state, the terminal 102 determines that the TPC command has 2 bits, and performs a demodulation thereon. If the DCI format is received in the second control channel region, the terminal determines that the TPC command has 3 bits, and performs a demodulation process thereon. It is possible to obtain a power correction value by performing the demodulation process. In addition, the first control channel region or the second control channel region is the same as that described in the first embodiment or the third embodiment. For example, the first control channel region is a region (resource) to which a PDCCH is assigned, and the second control channel region is a region (resource) to which an X-PDCCH is assigned.

In the first state, the terminal 102 determines that a TPC command included in the DCI format is the first TPC command in any kind of DCI format, and performs a demodulation process thereon. In the second state, the terminal 102 may determine that a TPC command included in the DCI format is the second TPC command in any kind of DCI format, and may perform a demodulation process thereon. For example, in the first state, the terminal 102 determines that the TPC command included in the DCI format has 2 bits in any DCI format, and performs a demodulation process thereon. In the second state, the terminal 102 determines that the TPC command included in the DCI format has 3 bits in any DCI format, and performs a demodulation process thereon.

In addition, in the first state, the terminal 102 determines that a TPC command included in the DCI format is the first TPC command in any kind of DCI format, and performs a demodulation process thereon. In the second state, if the first DCI format is detected, the terminal 102 performs a demodulation process on a TPC command included in the first DCI format, as the first TPC command. If the second DCI format is detected, the terminal performs a demodulation process on a TPC command included in the second DCI format, as the second TPC command, so as to detect a power correction value. For example, in the first state, the terminal 102 determines that the TPC command has 2 bits, and performs a demodulation process thereon. If the first DCI format is received in the second state, the terminal 102 determines that the TPC command has 2 bits, and performs a demodulation thereon. If the second DCI format is received, the terminal determines that the TPC command has 3 bits, and performs a demodulation process thereon. It is possible to obtain a power correction value which is configured in the TPC command by performing the demodulation process. In other words, the terminal 102 can acquire an appropriate power correction value by performing demodulation on the TPC command based on a configured state.

In the first state, even if the DCI format is detected from any serving cell regardless of a primary cell or a secondary cell, the terminal 102 performs a demodulation process on a TPC command included in the DCI format as the first TPC command. In the second state, if the DCI format is detected in the primary cell, the terminal 102 determines that a TPC command included in the DCI format is the first TPC command, and performs a demodulation process thereon. If the DCI format is detected in the secondary cell, the terminal 102 determines that a TPC command included in the DCI format is the second TPC command, and performs a demodulation process thereon so as to detect a power correction value. For example, in the first state, even if the DCI format is detected from any serving cell regardless of a primary cell or a secondary cell, the terminal 102 determines that the TPC command included in the DCI format has 2 bits, and performs a demodulation process thereof. On the other hand, in a case where the DCI format is detected in the second state, in the primary cell, the terminal 102 may perform a demodulation process on the TPC command included in the DCI format as 2 bits, and, in the secondary cell, the terminal performs a demodulation process the TPC command included in the DCI format as 3 bits. In other words, the terminal 102 can determine the TPC command used for uplink transmission power control based on a cell in which the state and the TPC command are detected. Here, the demodulation process indicates that a power correction value correlated with an index (TPC command index) which is configured in the TPC command is detected.

If the DCI format is detected when a pathloss reference resource is configured in a first reference signal, the terminal 102 recognizes a TPC command included in the DCI format as the first TPC command, and performs a demodulation process thereon. If the DCI format is detected when a pathloss reference resource is configured in a first reference signal, the terminal 102 recognizes a TPC command included in the DCI format as the second TPC command, and performs a demodulation process thereon. For example, if the DCI format is detected when a pathloss reference resource is configured in a first reference signal, the terminal 102 determines that the TPC command has 2 bits, and performs a demodulation process thereon. When a pathloss reference resource is configured in a second reference signal, the terminal 102 determines that the TPC command has 3 bits, and performs a demodulation process thereon. In addition, the first reference signal may be the CRS, and the second reference signal may be the CSI-RS. Further, the first reference signal and the second reference signal may be configured based on information on an antenna port. Furthermore, the first reference signal may be configured based on first CSI-RSConfig, and the second reference signal may be configured based on second CSI-RSConfig.

In other words, the first state and the second state may be configured for each cell. The states may be configured for each subframe subset. The states may be identified based on a PDCCH including the DCI format.

In other words, the terminal 102 can extend a power control parameter value used to calculate transmission power of an uplink signal by using a state which is configured in the terminal 102, a timing for transmitting the uplink signal, or a resource, and thus can perform more appropriate transmission power control of the uplink signal.

If the DCI format is detected in the first state, the terminal 102 detects a first power correction value from a first index which is configured in the TPC command in any subframe. If the DCI format is received in the second state, the terminal 102 detects a first power correction value from a first index which is configured in the TPC command field in a first subframe subset, and detects a second power correction value from the first index which is configured in the TPC command field in a second subframe subset. In other words, the terminal 102 may configure even the same index as a different power correction value on the basis of a state of the terminal 102 and a transmission timing of an uplink signal.

In other words, the terminal 102 can extend a power control parameter value used to calculate transmission power of an uplink signal by using a state which is configured in the terminal 102, a timing for transmitting the uplink signal, or a resource, and thus can perform more appropriate transmission power control of the uplink signal.

If the DCI format is detected when the first state is configured, the terminal 102 detects a first power correction value from a first index which is configured in the TPC command field included in the DCI format. If the DCI format is detected when the second state is configured, the terminal obtains a second power correction value from the first index which is configured in the TPC command field included in the DCI format. In other words, indexes and power correction values which are configured in the TPC command in the first state and the second state between the base station 101 and the terminal 102 are respectively managed in a table form.

In other words, in the eighth embodiment, the terminal 102 may replace a power correction value correlated with an index which is configured in the TPC command field on the basis of a state which is configured in the terminal 102. Even in the same index, the same power correction value is not detected based on a state of the terminal 102.

Modification Example 1 of Eighth Embodiment

Next, Modification Example 1 of the eighth embodiment will be described. In Modification Example 1 of the eighth embodiment, the base station 101 provides information of the DCI format including a single TPC command to the terminal 102 in a first state, and provides the DCI format including two TPC commands to the terminal 102 in a second state. In a case where the DCI format is detected in the first state, the terminal 102 demodulates the single TPC command so as to obtain a power correction value. In addition, in a case where the DCI format is detected in the second state, the terminal 102 demodulates the two TPC commands so as to obtain respective power correction values. The two TPC commands are TPC commands for different uplink physical channels, and, for example, a TPC command of the PUCCH and a TPC command of the SRS are configured in a single DCI format. Further, a TPC command of the PUSCH and a TPC command of the SRS are configured in a single DCI format. Furthermore, a TPC command of the PUSCH and a TPC command of the PUCCH are configured in a single DCI format. Moreover, the first state and the second state are the same as those described in the eighth embodiment.

In addition, the base station 101 may configure one or two changed TPC commands in downlink assignment on the basis of a state of the terminal 102. In other words, the base station 101 may add a TPC command for a physical channel to a predetermined DCI format on the basis of a state of the terminal 102. In relation to the terminal 102 in the second state, the base station 101 may configure only a TPC command of the PUSCH in uplink grant, and may add a TPC command of the SRS as well as the TPC command of the PUCCH to downlink assignment. The terminal 102 may determine whether a power correction value is acquired from a single TPC command or a power correction value is acquired from two TPC commands, on the basis of a state and a detected kind of DCI format.

In a case where a DCI format including the SRS request is detected in the first state, and the DCI format is downlink assignment, the terminal 102 calculates transmission power of the A-SRS based on a power correction value which is configured in a TPC command of the PUSCH included in the next DCI format. In a case where a DCI format including the SRS request is detected in the second state, and the DCI format is downlink assignment, the terminal 102 sets transmission power of the A-SRS based on a power correction value of the SRS which is obtained from a TPC command of the SRS included in the DCI format. In the second state, in a case where a detected DCI format is uplink grant, transmission power of the SRS is set based on a power correction value which is configured a TPC command of the PUSCH included in the DCI format.

For example, in the second state, the terminal 102 may recognize that not only a TPC command of the PUCCH but also a TPC command of the SRS is added to a DCI format 1A, and may perform a demodulation process thereon so as to obtain a power correction value of the PUCCH and a power correction value of the SRS. In addition, in the second state, the terminal 102 may recognize that not only a TPC command of the PUSCH but also a TPC command of the SRS is added to a DCI format 4, and may perform a demodulation process thereon so as to obtain a power correction value of the PUSCH and a power correction value of the SRS. Further, in the second state, in a case where a DCI format 2B/2C is detected, the terminal 102 may detect not only a TPC command of the PUCCH but also a TPC command of the SRS from the detected DCI format 2B/2C so as to obtain respective power correction values, and may calculate uplink transmission power from the respective power correction values.

As for the terminal 102 in the first state, the base station 101 configures a single TPC command (first TPC command) included in a DCI format which is disposed in a first control channel region and a second control channel region. As for the terminal 102 in the second state, the base station 101 configures a single TPC command (first TPC command) in a DCI format which is disposed in the first control channel region, and configures two TPC commands (the first TPC command and a second TPC command) in a DCI format which is disposed in the second control channel region. If the DCI format is detected in the first control channel region and the second control channel region in the first state, the terminal 102 may recognize a TPC command included in the DCI format as the first TPC command, and may perform a demodulation process thereon so as to acquire a power correction value. If the DCI format is detected in the first control channel region in the second state, the terminal 102 may recognize a TPC command included in the DCI format as the first TPC command, and may perform a demodulation process thereon so as to acquire a power correction value. If the DCI format is detected in the second control channel region in the second state, the terminal may determine that the first TPC command and the second TPC command are included in the DCI format, and may perform a demodulation process thereon so as to acquire power correction values from the first TPC command and the second TPC command, respectively.

The base station 101 provides information of a DCI format including the first TPC command in any downlink subframe to the terminal 102 in the first state. As for the terminal 102 in the second state, the first TPC command is configured in a DCI format which is transmitted by a downlink subframe included in a first subframe subset, and the first TPC command and the second TPC command are configured in a DCI format which is transmitted by a downlink subframe included in a second subframe subset. If the DCI format is detected with the downlink subframe included in the first subframe subset and the second subframe subset in the first state, the terminal 102 may recognize a TPC command included in the DCI format as the first TPC command, and may perform a demodulation process thereon so as to acquire a power correction value. If the DCI format is detected in the downlink subframe included in the first subframe subset in the second state, the terminal 102 may recognize a TPC command included in the DCI format as the first TPC command, and may perform a demodulation process thereon so as to acquire a power correction value. If the DCI format is detected in the downlink subframe included in the second subframe subset in the second state, the terminal may determine that the first TPC command and the second TPC command are included in the DCI format, and may perform a demodulation process thereon so as to acquire power correction values from the first TPC command and the second TPC command, respectively.

The base station 101 provides information of a DCI format including the first TPC command for any serving cell to the terminal 102 in the first state. As for the terminal 102 in the second state, the first TPC command is configured in a DCI format which is transmitted to a primary cell, and the first TPC command and the second TPC command are set in a DCI format which is transmitted to a secondary cell. If the DCI format is detected in the first state, the terminal 102 may recognize a TPC command included in the DCI format as the first TPC command, and may perform a demodulation process thereon so as to acquire a power correction value. If the DCI format is detected in the primary cell in the second state, the terminal 102 may recognize a TPC command included in the DCI format as the first TPC command, and may perform a demodulation process thereon so as to acquire a power correction value. If the DCI format is detected in the secondary cell in the second state, the terminal 102 may determine that the first TPC command and the second TPC command are included in the DCI format, and may perform a demodulation process thereon so as to acquire power correction values from the first TPC command and the second TPC command, respectively.

In a case where a transmission request by the SRS request is included in a DCI format, in the first state, the terminal 102 may calculate transmission power of the SRS based on a power correction value obtained from a TPC command of the PUSCH, and, in the second state, may calculate transmission power of the SRS based on a power correction value obtained from a TPC command of the SRS.

A power correction value for the PUSCH may be obtained from the first TPC command, and a power correction value for the SRS may be obtained from the second TPC command. In addition, a power correction value for the PUSCH may be obtained from the first TPC command, and a power correction value for the SRS may be obtained from the second TPC command. Further, a power correction value for the PUSCH may be obtained from the first TPC command, and a power correction value for the PUSCH may be obtained from the second TPC command.

It is possible to appropriately and dynamically erform transmission power control of the SRS which is necessary to feedback DL CoMP in the SRS.

Based on a state of the terminal 102, it is possible to dynamically configure TPC commands for a plurality of uplink physical channels and thus to perform dynamic transmission power control.

Modification Example 2 of Eighth Embodiment

Next, Modification Example 2 of the eighth embodiment will be described. The base station 101 provides information of first terminal-specific PUSCH power to the terminal 102 in a first state, and provides information of second terminal-specific PUSCH power to the terminal 102 in a second state. The first terminal-specific PUSCH power and the second terminal-specific PUSCH power are respectively supported in different ranges, and thus the terminal 102 in the second state can configure terminal-specific PUSCH power higher and/or lower than that of the terminal 102 in the first state. In addition, the first state and the second state are the same as those described in the eighth embodiment.

The base station 101 provides information of first terminal-specific PUCCH power to the terminal 102 in the first state, and provides information of second terminal-specific PUCCH power to the terminal 102 in the second state. The first terminal-specific PUCCH power and the second terminal-specific PUCCH power are respectively supported in different ranges, and thus the terminal 102 in the second state can configure terminal-specific PUCCH power higher and/or lower than that of the terminal 102 in the first state.

The base station 101 provides information of a first SRS power offset to the terminal 102 in the first state and provides information of a second SRS power offset to the terminal 102 in the second state. The first SRS power offset and the second SRS power offset are respectively supported in different ranges, and thus the terminal 102 in the second state can configure SRS power offset higher and/or lower than that of the terminal 102 in the first state.

The base station 101 configures the first terminal-specific PUSCH power and the second terminal-specific PUSCH power. In addition, the first terminal-specific PUSCH power and the second terminal-specific PUSCH power have different ranges. A range of the first terminal-specific PUSCH power is [−8, 7] and has 1 dB as a pitch width, but, for example, a range of the second terminal-specific PUSCH power may be [−15, 10]. Further, a range of the second terminal-specific PUSCH power may be [−20, 15]. In other words, a range of the second terminal-specific PUSCH power may be configured to be wider than a range of the first terminal-specific PUSCH power. A pitch width of the second terminal-specific PUSCH power may be 1 dB, may be 2 dB, and may be n dB (where n is an integer of 2 or more).

The base station 101 configures the first terminal-specific PUCCH power and the second terminal-specific PUCCH power. In addition, the first terminal-specific PUCCH power and the second terminal-specific PUCCH power have different ranges. A range of the first terminal-specific PUCCH power is [−8, 7] and has 1 dB as a pitch width, but, for example, a range of the second terminal-specific PUCCH power may be [−15, 10]. Further, a range of the second terminal-specific PUCCH power may be [−20, 15]. In other words, a range of the second terminal-specific PUCCH power may be configured to be wider than a range of the first terminal-specific PUCCH power. A pitch width of the second terminal-specific PUCCH power may be 1 dB, may be 2 dB, and may be n dB (where n is an integer of 2 or more).

The initial received power of random access preamble and the power ramping step may be configured for each of the first state and the second state, and ranges thereof may be different.

In the terminal 102, a range of the SRS power offset in the first state may be [0, 15], and a range of the SRS power offset in the second state may be [−5, 20]. In other words, the SRS power offset in the second state may be configured to be higher than the highest value of power offset in the first state, and may be configured to be lower than the lowest value. That is, the SRS power offset in the second state may be configured to be wider than the SRS power offset in the first state.

The base station 101 provides information of a first parameter configuration relating to uplink power control and a second parameter configuration relating to uplink power control to the terminal 102. Respective power control parameters included in the first and second parameter configurations relating to uplink power control may have different ranges (levels) or pitch widths (ramp-up step/ramp-down step).

In addition, in the aforementioned respective embodiments, the description was given by using a resource element or a resource block as a mapping unit of an information data signal, a control information signal, a PDSCH, a PDCCH, and a reference signal, and by using a subframe or a radio frame as a transmission unit in a temporal direction, but the present invention is not limited thereto. Even if domain and time units formed by any frequency and time are used instead thereof, the same effect can be achieved. Further, in the aforementioned respective embodiments, the description was given of a case where demodulation is performed by using a precoded RS, and the description was given by using a port equivalent to an MIMO layer as a port corresponding to the processed RS, but the present invention is not limited thereto. Further, the same effect can be achieved by applying the present invention to ports corresponding to different reference signals. For example, an unprecoded (nonprecoded) RS may be used instead of the precoded RS, and a port equivalent to a procoded output end or a port equivalent to a physical antenna (or a combination of physical antennas) may be used as a port.

In addition, in the aforementioned respective embodiments, the uplink transmission power control is transmission power control of the uplink physical channels (the PUSCH, the PUCCH, the PRACH, and the SRS), and the transmission power control includes changing or configuring (reconfiguring) of various parameters used for calculation of transmission power of the various uplink physical channels.

Further, in the aforementioned respective embodiments, the description was given of downlink/uplink cooperative communication formed by the base station 101, the terminal 102, and the RRH 103, but the present invention is applicable to cooperative communication formed by two or more base stations 101 and the terminal 102, cooperative communication formed by two or more base stations 101, the RRH 103, and the terminal 102, cooperative communication formed by two or more base stations 101 or RRHs 103 and the terminal 102, cooperative communication formed by two or more base stations 101, two or more RRHs 103, and the terminal 102, and cooperative communication formed by two or more transmission points/reception points. Furthermore, the present invention is applicable to cooperative communication formed by the base stations 101 (a plurality of base stations) having different cell IDs. Moreover, the present invention is applicable to the base station 101 and the RRH 103 having the different cell IDs. In addition, the present invention is applicable to cooperative communication formed by the RRHs 103 (a plurality of RRHs) having different cell IDs. In other words, the aforementioned cooperative communication is applicable to a communication system formed by a plurality of base stations 101, a plurality of terminals 102, and a plurality of RRHs 103. Further, the aforementioned cooperative communication is applicable to a communication system formed by a plurality of transmission points and a plurality of reception points. Furthermore, the transmission points and the reception points may be constituted by a plurality of base stations 101, a plurality of terminals 102, and a plurality of RRHs 103. Moreover, although the description was given of a case where the terminal 102 performed uplink transmission power control suitable for the base station 101 or the RRH 103 on the closer side (with smaller pathloss) on the basis of a calculation result of pathloss in the aforementioned respective embodiments, the terminal 102 can perform the same processing for uplink transmission power control suitable for the base station 101 or the RRH 103 on the further side (with larger pathloss) on the basis of a calculation result of pathloss.

In addition, in the aforementioned respective embodiments, the base station 101 and the RRH 103 are downlink transmission points and uplink reception points. Further, the terminal 102 is a downlink reception point and an uplink transmission point.

A program executed in the base station 101 and the terminal 102 according to the present invention is a program (a program causing a computer to function) which controls a CPU and the like so as to realize the functions of the aforementioned embodiments related to the present invention. In addition, information treated in the devices is temporarily accumulated in a RAM during processing thereof so as to be then stored in various ROMs or HDDs, and is read, corrected, and written by the CPU as necessary. A recording medium storing the program may be any of a semiconductor medium (for example, a ROM, a nonvolatile memory card, or the like), an optical recording medium (for example, a DVD, an MO, an MD, a CD, a BD, or the like), and a magnetic recording medium (for example, a magnetic tape, a flexible disk, or the like). Further, the functions of the aforementioned embodiments can be realized by executing the loaded program, and there is a case where the functions of the present invention are realized through a cooperative process with an operating system, programs of other applications, or the like on the basis of an indication from the program.

In addition, in a case where the program is distributed in the market, the program may be stored on a portable recording medium and distributed, or may be transmitted to a server computer which is connected via a network such as the Internet. In this case, a storage device of the server computer is also included in the present invention. Further, a part or the whole of the base station 101 and the terminal 102 in the aforementioned respective embodiments may be typically realized by an LSI which is an integrated circuit. The respective functional blocks of the base station 101 and the terminal 102 may be produced as a chip separately, and some or all of the blocks may be integrated so as to be produced as a chip. Furthermore, a technique for producing an integrated circuit is not limited to the LSI, and may be realized by a dedicated circuit or a general purpose processor. Moreover, in a case where a technique of producing an integrated circuit replacing the LSI appears with the progress of the semiconductor technique, an integrated circuit produced by the corresponding technique may be used.

As mentioned above, although the embodiments of this invention have been described in detail with reference to the drawings, a specific configuration is not limited to the embodiments, and includes design modifications or the like in the scope without departing from the spirit of the invention. In addition, the present invention may have various modifications within the scope recited in the claims, and embodiments which can be obtained by combining the technical means disclosed in the different embodiments as appropriate are also included in the technical scope of the present invention. Further, a configuration in which the elements disclosed in the respective embodiments and achieving the same effect are replaced with each other is also included in the technical scope of the present invention. The present invention is suitably used in a radio base station apparatus, a radio terminal apparatus, a radio communication system, or a radio communication method.

REFERENCE SIGNS LIST

101, 3701: base station
102, 3702, 3703, 3804, 3904: terminal
103, 3802, 3902: RRH
104, 3803, 3903: connection
105, 107, 3704, 3705, 3805, 3806: downlink
106, 108, 3905, 3906: uplink
501: higher layer processing unit
503: control unit
505: reception unit
507: transmission unit
509: channel measurement unit
511: transmit/receive antenna
5011: radio resource control unit
5013: SRS configuration unit
5015: transmission power configuration unit
5051: decoding unit
5053: demodulation unit
5055: demultiplexing unit
5057: radio reception unit
5071: coding unit
5073: modulation unit
5075: multiplexing unit
5077: radio transmission unit
5079: downlink reference signal generation unit
601: higher layer processing unit
603: control unit
605: reception unit
607: transmission unit
609: channel measurement unit
611: transmit/receive antenna
6011: radio resource control unit
6013: SRS control unit
6015: transmission power control unit
6051: decoding unit
6053: demodulation unit
6055: demultiplexing unit
6057: radio reception unit
6071: coding unit
6073: modulation unit
6075: multiplexing unit
6077: radio transmission unit
6079: uplink reference signal generation unit
3801, 3901: macro base station

The invention claimed is:

1. A terminal comprising:
   reception circuitry that:
   receives a higher layer signal including a parameter to be used for uplink power control, the parameter indicating whether a subframe belongs to a first subframe set or a second subframe set, and the first subframe set being different from the second subframe set; and
   detects a transmission power control (TPC) command in a downlink control information (DCI) format, and obtains a power correction value from the TPC command, the TPC command including a first power correction value in a case that the subframe belongs to the first subframe set, the TPC command including a second power correction value in a case that the subframe belongs to the second subframe set, and the first power correction value being different from the second power correction value; and transmission power control circuitry that sets a transmission power of an uplink signal to be transmitted in the subframe, based on the first power correction value or the second power correction value, which is included in the TPC command detected.

2. The terminal according to claim 1, wherein
the terminal communicates with a first base station and a second base station, and
the first subframe set and the second subframe set are configured respectively for the first base station and the second base station.

3. The terminal according to claim 2, wherein
the transmission power control circuitry:
sets the transmission power of the uplink signal based on a single power control in a case that the terminal is in a first state,
sets the transmission power of the uplink signal based on one or more power controls in a case that the terminal is in a second state, and
the first state and the second state are associated with a configuration of the terminal indicated by the higher layer signal.

4. The terminal according to claim 3, wherein
the transmission power control circuitry sets the transmission power of the uplink signal using one of a first power control and a second power control, based on a timing of reception of the TPC command and a timing of transmission of the uplink signal, and
the timing of reception of the TPC command and the timing of transmission of the uplink signal are based on the configuration of the terminal indicated by the higher layer signal.

5. A base station that communicates with a terminal, the base station comprising:
transmission circuitry that:
transmits a higher layer signal including a parameter to be used for uplink power control, the parameter indicating whether a subframe belongs to a first subframe set or a second subframe set, and the first subframe set being different from the second subframe set,
transmits a downlink control information (DCI) format including a transmission power control (TPC) command, the TPC command including a first power correction value in a case that the subframe belongs to the first subframe set, the TPC command including a second power correction value in a case that the subframe belongs to the second subframe, and the first power correction value being different from the second power correction value, wherein
the first power correction value or the second power correction value, which is included in the TPC command, is used for the terminal to set a transmission power of an uplink signal to be transmitted in the subframe to the base station.

6. A method of using a terminal, the method comprising:
receiving a higher layer signal including a parameter to be used for uplink power control, the parameter indicating whether a subframe belongs to a first subframe set or a second subframe set, and the first subframe set being different from the second subframe set;
detecting a transmission power control (TPC) command in a downlink control information (DCI) format and obtaining a power correction value from the TPC command, the TPC command including a first power correction value in a case that the subframe belongs to the first subframe set, the TPC command including a second power correction value in a case that the subframe belongs to the second subframe set, and the first power correction value being different from the second power correction value; and
setting a transmission power of an uplink signal to be transmitted in the subframe, based on the first power correction value or the second power correction value, which is included in the TPC command detected.

* * * * *